US010655030B2

(12) United States Patent
Takeno et al.

(10) Patent No.: US 10,655,030 B2
(45) Date of Patent: May 19, 2020

(54) WATER-BASED INK

(71) Applicant: KAO CORPORATION, Tokyo (JP)

(72) Inventors: Hirotaka Takeno, Wakayama (JP);
Yuki Wakabayashi, Izumiotsu (JP);
Kaname Mitsuyoshi, Wakayama (JP);
Takahiro Yoshikawa, Wakayama (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 15/738,487

(22) PCT Filed: Jun. 24, 2016

(86) PCT No.: PCT/JP2016/068831
§ 371 (c)(1),
(2) Date: Dec. 20, 2017

(87) PCT Pub. No.: WO2016/208719
PCT Pub. Date: Dec. 29, 2016

(65) Prior Publication Data
US 2018/0187034 A1    Jul. 5, 2018

(30) Foreign Application Priority Data
Jun. 25, 2015  (JP) ................................ 2015-127608

(51) Int. Cl.
C09D 11/40 (2014.01)
C09D 11/30 (2014.01)
B41J 2/21 (2006.01)
C09D 11/033 (2014.01)
C09D 11/322 (2014.01)
C09D 11/102 (2014.01)
B41M 5/00 (2006.01)
C09D 11/037 (2014.01)

(52) U.S. Cl.
CPC ............ C09D 11/40 (2013.01); B41J 2/2107 (2013.01); B41M 5/00 (2013.01); B41M 5/0023 (2013.01); C09D 11/033 (2013.01); C09D 11/037 (2013.01); C09D 11/102 (2013.01); C09D 11/30 (2013.01); C09D 11/322 (2013.01)

(58) Field of Classification Search
CPC ..................................................... C09D 11/40
See application file for complete search history.

(56) References Cited

U.S. PATENT DOCUMENTS

| | | | |
|---|---|---|---|
| 6,554,891 B1 | 4/2003 | Momose et al. | |
| 6,951,376 B2 | 10/2005 | Ishikawa | |
| 8,511,811 B2 | 8/2013 | Kakino et al. | |
| 8,770,733 B2 | 7/2014 | Ohya et al. | |
| 2002/0157569 A1* | 10/2002 | Takemoto | C09D 11/30 106/31.86 |
| 2003/0177943 A1* | 9/2003 | Auweter | C09B 67/0013 106/31.28 |
| 2006/0017759 A1 | 1/2006 | Matsuzawa et al. | |
| 2006/0047013 A1* | 3/2006 | Ito | C09D 11/30 523/160 |
| 2006/0132522 A1 | 6/2006 | Baker et al. | |
| 2006/0232650 A1 | 10/2006 | Sugimoto et al. | |

(Continued)

FOREIGN PATENT DOCUMENTS

| | | |
|---|---|---|
| CN | 1662378 A | 8/2005 |
| CN | 101412865 A | 4/2009 |

(Continued)

OTHER PUBLICATIONS

International Search Report for Application No. PCT/JP2016/068832 (Form PCT/ISA/210) dated Aug. 23, 2016.

(Continued)

Primary Examiner — Shelby L Fidler
(74) Attorney, Agent, or Firm — Birch, Stewart, Kolasch & Birch, LLP

(57) ABSTRACT

The present invention relates to a water-based ink including a pigment, a water-insoluble polymer, an organic solvent and a surfactant, in which the organic solvent includes at least a glycol ether which has a viscosity of from 2.0 to 7.0 mPa·s and a vapor pressure from 0.01 to 7.0 hPa as measured at 20° C., and a content of a glycol ether having a viscosity of not less than 6.0 mPa·s as measured at 20° C. as a component of the glycol ether in the water-based ink is from 0 to 5% by mass; the surfactant includes a silicone-based surfactant and a content of the silicone-based surfactant in the water-based ink is from 0.005 to 0.3% by mass; a content of the organic solvent in the water-based ink is from 25 to 50% by mass; and a content of a high-boiling organic solvent in the water-based ink is not more than 5% by mass, an ink set for ink-jet printing including two or more kinds of water-based inks which are each constituted of the aforementioned water-based ink, and an ink-jet printing method including the steps of ejecting the aforementioned water-based ink onto a printing medium, and further ejecting the water-based ink onto the printing medium to overstrike the water-based ink onto the water-based ink that has been ejected onto the printing medium in the previous step. The water-based ink of the present invention is excellent in continuous ejection properties, and is capable of obtaining good printed materials that are free of roller transfer contamination and intercolor bleeding owing to overstriking of the inks even when printed on a non-water absorbing printing medium.

16 Claims, No Drawings

(56) References Cited

U.S. PATENT DOCUMENTS

| | | |
|---|---|---|
| 2009/0232989 A1 | 9/2009 | Tojo |
| 2009/0295847 A1* | 12/2009 | Mukai ................... B41J 2/175 347/6 |
| 2010/0028625 A1 | 2/2010 | Kagata et al. |
| 2010/0087595 A1 | 4/2010 | Koganehira et al. |
| 2010/0093900 A1 | 4/2010 | Ohya et al. |
| 2010/0253735 A1 | 10/2010 | Irita |
| 2011/0063390 A1 | 3/2011 | Takemoto |
| 2011/0281032 A1 | 11/2011 | Kagata et al. |
| 2012/0040147 A1* | 2/2012 | Komatsu ............. B41M 5/0011 428/195.1 |
| 2012/0252948 A1 | 10/2012 | King et al. |
| 2013/0215175 A1 | 8/2013 | Ozawa |
| 2013/0307899 A1 | 11/2013 | Saito et al. |
| 2014/0011928 A1 | 1/2014 | Iwasawa et al. |
| 2014/0085376 A1 | 3/2014 | Kato et al. |
| 2015/0064423 A1 | 3/2015 | Ohmoto |
| 2016/0032122 A1 | 2/2016 | Toda et al. |
| 2016/0130453 A1 | 5/2016 | Eguchi et al. |
| 2017/0022379 A1* | 1/2017 | Loccufier ............. C09D 11/102 |
| 2017/0247556 A1 | 8/2017 | Yokohama et al. |
| 2018/0002554 A1* | 1/2018 | Selmeczy ............. C09D 11/00 |

FOREIGN PATENT DOCUMENTS

| | | |
|---|---|---|
| CN | 101426657 A | 5/2009 |
| CN | 3 023 464 A2 | 5/2016 |
| CN | 105602344 A | 5/2016 |
| EP | 0 386 349 A1 | 9/1990 |
| EP | 2230281 A1 | 9/2010 |
| EP | 3088481 A1 | 11/2016 |
| EP | 3 239 255 A1 | 11/2017 |
| EP | 3275949 A1 | 1/2018 |
| JP | 2-248474 A | 10/1990 |
| JP | 10-53741 A | 2/1998 |
| JP | 2002-60662 A | 2/2002 |
| JP | 2006-56234 A | 3/2006 |
| JP | 2006-298978 A | 11/2006 |
| JP | 2007-91905 A | 4/2007 |
| JP | 2007-91906 A | 4/2007 |
| JP | 2008-238485 A | 10/2008 |
| JP | 2009-197166 A | 9/2009 |
| JP | 2010-53328 A | 3/2010 |
| JP | 2010-240862 A | 10/2010 |
| JP | 2011-63630 A | 3/2011 |
| JP | 2011-74336 A | 4/2011 |
| JP | 2012-31246 A | 2/2012 |
| JP | 2012-140611 A | 7/2012 |
| JP | 2012-184376 A | 9/2012 |
| JP | 2013-59989 A | 4/2013 |
| JP | 2013-112801 A | 6/2013 |
| JP | 2013-202956 A | 10/2013 |
| JP | 2014-205770 A | 10/2014 |
| JP | 2015-13990 A | 1/2015 |
| JP | 2015-48435 A | 3/2015 |
| JP | 2015-85568 A | 5/2015 |
| WO | WO 00/71628 A1 | 11/2000 |
| WO | WO 2010/038457 A1 | 4/2010 |
| WO | WO 2012/070243 A1 | 5/2012 |
| WO | WO 2012/133752 A1 | 10/2012 |
| WO | WO 2014/119769 A1 | 8/2014 |
| WO | WO 2016/104294 A1 | 6/2016 |

OTHER PUBLICATIONS

International Search Report for Application No. PCT/JP2016/068833 (Form PCT/ISA/210) dated Aug. 23, 2016.
Glycol Ethers E.O. Type P.O. Type Dialkyl, 6th edition, Nippon Nyukazai Co., Ltd., 2008, pp. 1-16, total 17 pages.
International Search Report for PCT/JP2016/068831 dated Jul. 26, 2016.
Extended European Search Report for European Application No. 16814488.9, dated Nov. 12, 2018.
Extended European Search Report for European Application No. 16814489.7, dated Dec. 3, 2018.
Extended European Search Report for European Application No. 16814490.5, dated Nov. 26, 2018.
U.S. Office Action for U.S. Appl. No. 15/738,766, dated Jun. 19, 2019.
U.S. Appl. No. 15/738,766, filed Dec. 21, 2017.
U.S. Appl. No. 15/738,480, filed Dec. 20, 2017.

\* cited by examiner

WATER-BASED INK

FIELD OF THE INVENTION

The present invention relates to a water-based ink, an ink set for ink-jet printing and an ink-jet printing method using the ink set.

BACKGROUND OF THE INVENTION

In ink-jet printing methods, droplets of ink are directly projected onto a printing medium from very fine nozzles and allowed to adhere to the printing medium to form characters or images thereon. The ink-jet printing methods have now been employed not only in printing applications for ordinary consumers but also recently in commercial and industrial printing applications because of various advantages such as easiness of full coloration, low cost, capability of using a plain paper as the printing medium, non-contact with printed characters or images, etc.

In addition, it has been required to print characters or images on a printing medium for commercial printing purposes such as a low-water absorbing coated paper such as an offset coated paper or a non-water absorbing resin film such as a polyvinyl chloride resin film, a polypropylene resin film and a polyester resin film.

In the commercial and industrial printing applications, it has been demanded to obtain printed materials with high productivity as compared to the printing applications for consumers. For example, there has been proposed the high-speed printing method in which a printing roll paper is scanned using a stationary print head of a ling head printing type.

For example, JP 2008-238485A (Patent Literature 1) discloses an ink-jet printing method capable of improving ejection stability of fine droplets of a water-based ink having a high content of a high-boiling aqueous solvent, in which the water-based ink includes a pigment and an organic solvent such as dipropylene glycol monomethyl ether and is ejected in the form of droplets each having a volume of not more than 3 pL from funnel-shaped nozzles arranged in a line print head.

JP 2006-298978A (Patent Literature 2) discloses a water-based ink set for ink-jet printing which is capable of forming black images by overstriking two different color inks as a water-based ink that is capable of clearly expressing black characters or line images with a high density and forming high-quality black gradation images, and is excellent in drying properties.

JP 2015-13990A (Patent Literature 3) discloses a water-based ink for ink-jet printing which includes specific water-insoluble polymer particles containing a pigment, another water-insoluble polymer particles and an organic solvent having a specific boiling point, in which a content of the organic solvent in the water-based ink is not less than 20% by mass, as a water-based ink which is excellent in optical density even when printed on any of a high-water absorbing printing medium and a low-water absorbing printing medium, spreading of a dot size of the ink on the low-water absorbing printing medium, and rub fastness.

In addition, JP 2015-85568A (Patent Literature 4) discloses as a printing method of obtaining good images that are free of bleeding and ensure solid image uniformity and rub fastness, an image printing method which includes a printing step of allowing an ink to adhere onto a non-porous printing medium whose printing side surface is adjusted to a temperature of 40 to 60° C., and a drying step of drying the ink adhered onto the printing medium, in which the aforementioned ink includes at least water, a water-soluble organic solvent containing no solvent having a boiling point of higher than 250° C., a colorant and fine resin particles, and in the printing step, a temperature of the surface of the printing medium is reduced as the number of scanning of the printing is increased.

SUMMARY OF THE INVENTION

The present invention relates to a water-based ink including a pigment (A), a water-insoluble polymer (B), an organic solvent (C), a surfactant (D) and water, in which:

the organic solvent (C) includes at least a glycol ether (c-1) which has a viscosity of not less than 2.0 mPa·s and not more than 7.0 mPa·s as measured at 20° C. and a vapor pressure of not less than 0.01 hPa and not more than 7.0 hPa as measured at 20° C., and a content of a glycol ether having a viscosity of not less than 6.0 mPa·s as measured at 20° C. as a component of the glycol ether (c-1) in the water-based ink is not less than 0% by mass and not more than 5% by mass;

the surfactant (D) includes a silicone-based surfactant (d-1), and a content of the silicone-based surfactant (d-1) in the water-based ink is not less than 0.005% by mass and not more than 0.3% by mass;

a content of the organic solvent (C) in the water-based ink is not less than 25% by mass and not more than 50% by mass; and a content of a high-boiling organic solvent having a boiling point of not lower than 250° C. in the water-based ink is not more than 5% by mass.

DETAILED DESCRIPTION OF THE INVENTION

In the line head printing methods, a printing paper is caused to pass through the print head only one time, so that even if only one of nozzles in the print head suffers from defective ejection of the ink, the printed characters or images tend to instantly undergo deterioration in image quality thereof. For this reason, in the line head printing methods, it has been required higher-level properties of continuous ejection of the ink. In the technology described in Patent Literature 1, the properties of continuous ejection of the ink can be improved by selecting a suitable combination of a composition of the ink and a structure of ejection nozzles. However, from the viewpoint of attaining a high degree of freedom of designing of the apparatus, it is desirable to improve the properties of the continuous ejection of the ink only by adjusting a composition of the ink. Moreover, in the high-speed printing using a roll paper, a drying velocity of the ink tends to be inferior to a velocity of transportation of the roll paper, so that the ink tends to be hardly dried sufficiently, whereby defects such as roller transfer contamination between the transportation roller and the printed surface as well as intercolor bleeding owing to overstriking of the inks tend to be caused.

However, in the technologies described in Patent Literatures 1 to 4, when printing characters or images on a printing medium used in commercial printing applications such as a low-water absorbing coated paper or a non-water absorbing resin film, the inks used therein tend to fail to satisfy continuous ejection properties, and it also tends to be insufficient to suppress occurrence of roller transfer contamination or intercolor bleeding owing to overstriking of the inks.

The present invention relates to a water-based ink capable of exhibiting excellent continuous ejection properties even upon high-speed printing, and obtaining good printed materials that are free of roller transfer contamination and intercolor bleeding owing to overstriking of the inks even when printed on a non-water absorbing printing medium; an ink set for ink-jet printing; and an ink-jet printing method using the ink set.

Meanwhile, the term "low-water absorbing printing medium" as used in the present specification is intended to include both concepts of a low-water absorbing printing medium and a non-water absorbing printing medium, and means a printing medium having a water absorption of not less than 0 g/m$^2$ and not more than 10 g/m$^2$ as measured under the condition that a contact time between the printing medium and pure water is 100 milliseconds.

In addition, the term "printing" as used in the present specification is a concept that includes printing or typing for printing characters or images, and the term "printed material" as used in the present specification is a concept that includes printed matters or typed materials on which characters or images are printed.

The present inventors have found that even in the high-speed printing required in commercial printing applications, by using a water-based ink including a glycol ether having specific viscosity and vapor pressure and a silicone-based surfactant, it is possible to attain excellent continuous ejection properties of the ink and obtain good printed materials that are free of roller transfer contamination and intercolor bleeding.

That is, the present invention relates to the following aspects [1] to [3].

[1] A water-based ink including a pigment (A), a water-insoluble polymer (B), an organic solvent (C), a surfactant (D) and water, in which:

the organic solvent (C) includes at least a glycol ether (c-1) which has a viscosity of not less than 2.0 mPa·s and not more than 7.0 mPa·s as measured at 20° C. and a vapor pressure of not less than 0.01 hPa and not more than 7.0 hPa as measured at 20° C., and a content of a glycol ether having a viscosity of not less than 6.0 mPa·s as measured at 20° C. as a component of the glycol ether (c-1) in the water-based ink is not less than 0% by mass and not more than 5% by mass;

the surfactant (D) includes a silicone-based surfactant (d-1), and a content of the silicone-based surfactant (d-1) in the water-based ink is not less than 0.005% by mass and not more than 0.3% by mass;

a content of the organic solvent (C) in the water-based ink is not less than 25% by mass and not more than 50% by mass; and a content of a high-boiling organic solvent having a boiling point of not lower than 250° C. in the water-based ink is not more than 5% by mass.

[2] An ink set for ink-jet printing including two or more kinds of water-based inks which are each constituted of the water-based ink according to the aforementioned aspect [1].

[3] An ink-jet printing method for printing characters or images on a printing medium using an ink-jet printing apparatus equipped with the ink set for ink-jet printing according to the aforementioned aspect [2], said method including the following steps 1 and 2:

Step 1: ejecting the water-based ink according to the aforementioned aspect [1] onto the printing medium; and Step 2: further ejecting the water-based ink according to the aforementioned aspect [1] onto the printing medium to overstrike the water-based ink onto the water-based ink that has been ejected onto the printing medium in the step 1.

According to the present invention, there are provided a water-based ink capable of exhibiting excellent continuous ejection properties even upon high-speed printing, and obtaining good printed materials that are free of roller transfer contamination and intercolor bleeding owing to overstriking of the inks even when printed on a non-water absorbing printing medium, an ink set for ink-jet printing, and an ink-jet printing method using the ink set.

[Water-Based Ink]

The water-based ink of the present invention (hereinafter also referred to merely as an "ink") includes a pigment (A), a water-insoluble polymer (B), an organic solvent (C), a surfactant (D) and water, in which the organic solvent (C) includes at least a glycol ether (c-1) which has a viscosity of not less than 2.0 mPa·s and not more than 7.0 mPa·s as measured at 20° C. and a vapor pressure of not less than 0.01 hPa and not more than 7.0 hPa as measured at 20° C., and a content of a glycol ether having a viscosity of not less than 6.0 mPa·s as measured at 20° C. as a component of the glycol ether (c-1) in the water-based ink is not less than 0% by mass and not more than 5% by mass; the surfactant (D) includes a silicone-based surfactant (d-1), and a content of the silicone-based surfactant (d-1) in the water-based ink is not less than 0.005% by mass and not more than 0.3% by mass; a content of the organic solvent (C) in the water-based ink is not less than 25% by mass and not more than 50% by mass; and a content of a high-boiling organic solvent having a boiling point of not lower than 250° C. in the water-based ink is not more than 5% by mass.

Meanwhile, the term "water-based" as used in the present specification means that water has a largest content among components of a medium contained in the ink.

When conducting high-speed printing using the water-based ink of the present invention, in particular, when conducting the high-speed printing on a roll paper using the water-based ink for ink-jet printing, there can be obtained such an advantageous effect that the ink is excellent in continuous ejection properties, and it is possible to obtain good printed materials that are free of roller transfer contamination and intercolor bleeding. The reason why the aforementioned advantageous effect can be attained by the present invention is considered as follows, though it is not clearly determined yet.

That is, the water-based ink is usually compounded with a polymer dispersant. However, in such a case, there tends to occur such a problem that the dispersant particles are aggregated and deposited within the ejection nozzles owing to drying of the ink in the nozzles, so that the ink is likely to suffer from ejection defects upon the high-speed printing.

In the present invention, the organic solvent (C) contains a glycol ether having specific viscosity and vapor pressure. Since the glycol ether has adequate viscosity and is excellent in flow characteristics at a high drive frequency of a print head, and the content of a component of the glycol ether which has a viscosity of not less than 6.0 mPa·s as measured at 20° C. in the water-based ink is not more than 5% by mass, it is considered that the glycol ether contributes to improvement in continuous ejection properties of the ink upon the high-speed printing. In addition, since the glycol ether has an adequate vapor pressure, it is considered that drying of the ink in the nozzles and therefore occurrence of deposition of aggregates of the ink in the nozzles can be suppressed, and in the drying treatment immediately after the printing, the glycol ether having a relatively low boiling point can exhibit the effect of improving drying properties of the ink on the printing medium. Furthermore, since the silicone-based surfactant (d-1) having a content of not more than 0.3% by mass serves for reducing a surface tension of the ink while suppressing increase in viscosity of the ink, the difference in surface tension between the inks used can be reduced, and occurrence of intercolor bleeding between the inks can be suppressed. For this reason, it is considered that the silicone-based surfactant contributes to production of good printed materials that are free of intercolor bleeding even upon the high-speed printing.

<Water-Based Ink>

The water-based ink of the present invention includes a pigment (A), a water-insoluble polymer (B), an organic solvent (C), a surfactant (D) and water.

The water-based ink of the present invention is capable of obtaining good printed materials that are free of roller transfer contamination and intercolor bleeding owing to overstriking of the inks even when printed on a non-water absorbing printing medium, and therefore can be suitably used as a water-based ink for flexo printing, gravure printing or ink-jet printing. In particular, the water-based ink of the present invention is excellent in continuous ejection properties even upon high-speed printing, and therefore can be preferably used as a water-based ink for ink-jet printing.

The water-based ink of the present invention may be produced by mixing the pigment (A), the water-insoluble polymer (B), the organic solvent (C), the surfactant (D) and water, if required, together with the other components, and then stirring the resulting mixture. However, the water-based ink of the present invention is preferably produced by any of the following methods (I) and (II).

Method (I): mixing a water dispersion of the water-insoluble polymer (B) particles containing the pigment (A), water, the organic solvent (C) and the surfactant (D), if required, together with various additives, etc., and then stirring the resulting mixture.

Method (II): mixing a water dispersion of the water-insoluble polymer (B) particles containing the pigment (A), a water dispersion of the water-insoluble polymer (B) particles containing no pigment (A), water, the organic solvent (C) and the surfactant (D), if required, together with various additives, etc., and then stirring the resulting mixture.

<Pigment (A)>

The pigment (A) is advantageously used from the viewpoint of improving water resistance and weathering resistance of the resulting printed materials, as compared to dyes.

The pigment (A) used in the present invention may be either an inorganic pigment or an organic pigment. The inorganic or organic pigment may also be used in combination with an extender pigment, if required.

Specific examples of the inorganic pigment include carbon blacks, metal oxides and the like. Of these inorganic pigments, in particular, carbon blacks are preferably used for black inks. The carbon blacks may include furnace blacks, thermal lamp blacks, acetylene blacks and channel blacks.

Specific examples of the organic pigment include azo pigments, diazo pigments, phthalocyanine pigments, quinacridone pigments, isoindolinone pigments, dioxazine pigments, perylene pigments, perinone pigments, thioindigo pigments, anthraquinone pigments and quinophthalone pigments.

The hue of the organic pigment used in the present invention is not particularly limited, and there may be used any chromatic color pigment having a yellow color, a magenta color, a cyan color, a blue color, a red color, an orange color, a green color, etc.

Specific examples of the preferred organic pigments include one or more pigments selected from the group consisting of commercially available products marketed under the tradenames of C.I. Pigment Yellow, C.I. Pigment Red, C.I. Pigment Orange, C.I. Pigment Violet, C.I. Pigment Blue and C.I. Pigment Green with various product numbers.

Examples of the extender pigment include silica, calcium carbonate and talc.

The pigment (A) may be included in the water-based ink in the form of a self-dispersible pigment, a pigment dispersed in the water-based ink with the water-insoluble polymer (B), or pigment-containing water-insoluble polymer (B) particles (refer to the aforementioned methods (I) and (II)).

Among them, the pigment (A) to be included in the water-based ink is preferably in the form of the pigment (A)-containing water-insoluble polymer (B) particles (hereinafter also referred to merely as "pigment-containing polymer particles") from the viewpoint of obtaining good printed materials that are free of roller transfer contamination to a non-water absorbing printing medium and intercolor bleeding.

<Water-Insoluble Polymer (B)>

The water-insoluble polymer (B) (hereinafter also referred to merely as a "component (B)") has not only a function as a pigment dispersant capable of exhibiting the effect of dispersing the pigment in the water-based ink, but also a function as a fusing agent for fusing the resulting ink on a printing medium.

The term "water-insoluble" as used herein means that when a polymer is dried to a constant weight at 105° C. for 2 hours and then dissolved in 100 g of water at 25° C., the solubility in water of the polymer is not more than 10 g. The solubility in water of the polymer is preferably not more than 5 g and more preferably not more than 1 g. In the case where the water-insoluble polymer (B) is in the form of an anionic polymer, the solubility means a solubility of the polymer whose anionic groups are neutralized completely (i.e., 100%) with sodium hydroxide. On the other hand, in the case where the water-insoluble polymer (B) is in the form of a cationic polymer, the solubility means a solubility of the polymer whose cationic groups are neutralized completely (i.e., 100%) with hydrochloric acid.

Examples of the water-insoluble polymer (B) used in the present invention include polyesters, polyurethanes and vinyl-based polymers. In addition, as the water-insoluble polymer (B), there may also be used commercially available dispersions of water-insoluble polymer particles.

Examples of the commercially available dispersions of water-insoluble polymer particles include dispersions of particles constituted of acrylic resins, styrene-based resins, urethane-based resins, polyester-based resins, styrene-acrylic resins, butadiene-based resins, styrene-butadiene-based resins, vinyl chloride-based resins, vinyl acetate-based resins, acrylic-silicone-based resins, etc. Among these commercially available dispersions of water-insoluble polymer particles, from the same viewpoints as described above, preferred are dispersions of particles constituted of acrylic resins, urethane resins, styrene-butadiene resins, styrene-acrylic resins and vinyl chloride-based resins. Specific examples of the commercially available dispersions of water-insoluble polymer particles include dispersions of acrylic resins such as "Neocryl A1127" (anionic self-cross-linkable aqueous acrylic resin) available from DSM Neo-Resins, Inc., and "JONCRYL 390" available from BASF Japan, Ltd.; dispersions of urethane resins such as "WBR-2018" and "WBR-2000U" both available from Taisei Fine Chemical Co., Ltd.; dispersions of styrene-butadiene resins such as "SR-100" and "SR102" both available from Nippon A & L Inc.; dispersions of styrene-acrylic resins such as "JONCRYL 7100", "JONCRYL 734" and "JONCRYL 538" all available from BASF Japan, Ltd.; and dispersions of vinyl chloride-based resins such as "VINYBLAN 701" available from Nissin Chemical Industry Co., Ltd., etc.

As the water-insoluble polymer (B), from the viewpoint of improving storage stability of the resulting ink, preferred are vinyl-based polymers obtained by addition-polymerizing a vinyl monomer (such as vinyl compounds, vinylidene compounds and vinylene compounds).

The vinyl-based polymer used in the present invention is preferably a vinyl-based polymer that is produced by copolymerizing a monomer mixture containing (b-1) an ionic monomer (hereinafter also referred to merely as a "component (b-1)") and (b-2) a hydrophobic monomer (hereinafter also referred to merely as a "component (b-2)") (such a mixture is hereinafter also referred to merely as a "monomer mixture"). The vinyl-based polymer contains a constitutional unit derived from the component (b-1) and a constitutional unit derived from the component (b-2). Among them, the vinyl-based polymer preferably further contains a constitutional unit derived from (b-3) a macromonomer (hereinafter also referred to merely as a "component (b-3)").

The ionic monomer (b-1) is preferably used as a monomer component of the water-insoluble polymer (B) from the viewpoint of improving dispersion stability of the pigment-containing polymer particles in the ink. Examples of the ionic monomer include anionic monomers and cationic monomers. Among these monomers, preferred are anionic monomers. Meanwhile, the ionic monomer may also include those monomers that have no ionicity under neutral conditions, such as acids and amines, but are rendered ionic under acid or alkaline conditions.

Examples of the anionic monomers include carboxylic acid monomers, sulfonic acid monomers and phosphoric acid monomers.

Specific examples of the carboxylic acid monomers include acrylic acid, methacrylic acid, crotonic acid, itaconic acid, maleic acid, fumaric acid, citraconic acid and 2-methacryloyloxymethylsuccinic acid.

Among the anionic monomers, from the viewpoint of improving dispersion stability of the pigment-containing polymer particles in the ink, preferred are the carboxylic acid monomers, and more preferred are acrylic acid and methacrylic acid.

Examples of the cationic monomers include N,N-dimethylaminoethyl methacrylate and N,N-dimethylaminoethyl acrylamide.

[(b-2) Hydrophobic Monomer]

The hydrophobic monomer (b-2) is preferably used as a monomer component of the water-insoluble polymer (B) from the viewpoint of improving dispersion stability of the pigment-containing polymer particles in the ink. Examples of the hydrophobic monomer include alkyl (meth)acrylic acid esters and aromatic group-containing monomers.

The alkyl (meth)acrylic acid esters are preferably those alkyl (meth)acrylic acid esters containing an alkyl group having 1 to 22 carbon atoms and preferably 6 to 18 carbon atoms. Examples of the alkyl (meth)acrylic acid esters include methyl (meth)acrylate, ethyl (meth)acrylate, (iso) propyl (meth)acrylate, (iso- or tertiary-)butyl (meth)acrylate, (iso)amyl (meth)acrylate, cyclohexyl (meth)acrylate, 2-ethylhexyl (meth)acrylate, (iso)octyl (meth)acrylate, (iso) decyl (meth)acrylate, (iso)dodecyl (meth)acrylate and (iso) stearyl (meth)acrylate.

Meanwhile, the terms "(iso- or tertiary-)" and "(iso)" as used herein mean both the structure in which any of the groups expressed by "iso or tertiary" and "iso" is present, and the structure in which any of these groups is not present (i.e., normal). In addition, the term "(meth)acrylic acid" means at least one compound selected from the group consisting of acrylic acid and methacrylic acid, and the term "(meth)acrylic acid ester" means at least one compound selected from the group consisting of an acrylic acid ester and a methacrylic acid ester. Therefore, the term "(meth) acrylate" means at least one compound selected from the group consisting of an acrylate and a methacrylate. These terms are hereinafter defined in the same way.

The aromatic group-containing monomer is preferably a vinyl monomer containing an aromatic group having 6 to 22 carbon atoms which may contain a substituent group having a hetero atom, and more preferably a styrene-based monomer or an aromatic group-containing (meth)acrylic acid ester.

Specific examples of the preferred styrene-based monomer include styrene, 2-methyl styrene and divinyl benzene. Among these styrene-based monomers, more preferred is styrene.

Specific examples of the preferred aromatic group-containing (meth)acrylic acid esters include benzyl (meth)acrylate and phenoxyethyl (meth)acrylate. Among these aromatic group-containing (meth)acrylic acid esters, more preferred is benzyl (meth)acrylate.

As the hydrophobic monomer (b-2), two or more kinds of monomers described above may be used, and a combination of the styrene-based monomer and the aromatic group-containing (meth)acrylic acid ester may also be used.

[(b-3) Macromonomer]

The macromonomer (b-3) is in the form of a compound containing a polymerizable functional group at one terminal end thereof and having a number-average molecular weight of not less than 500 and not more than 100,000, and is preferably used as a monomer component of the water-insoluble polymer (B) from the viewpoint of improving dispersion stability of the pigment-containing polymer particles in the ink. The polymerizable functional group bonded to one terminal end of the macromonomer is preferably an acryloyloxy group or a methacryloyloxy group, and more preferably a methacryloyloxy group.

The macromonomer (b-3) preferably has a number-average molecular weight of not less than 1,000 and not more than 10,000. Meanwhile, the number-average molecular weight of the macromonomer may be measured by gel permeation chromatography using chloroform containing 1 mmol/L of dodecyl dimethylamine as a solvent and using a polystyrene as a reference standard substance.

As the macromonomer (b-3), from the viewpoint of improving dispersion stability of the pigment-containing polymer particles in the ink, there are preferably used an aromatic group-containing monomer-based macromonomer and a silicone-based macromonomer. Among these macromonomers, more preferred is the aromatic group-containing monomer-based macromonomer.

Examples of an aromatic group-containing monomer constituting the aromatic group-containing monomer-based macromonomer include those aromatic group-containing monomers as described with respect to the above hydrophobic monomer (b-2). Among these aromatic group-containing monomers, preferred are styrene and benzyl (meth)acrylate, and more preferred is styrene.

Specific examples of the styrene-based macromonomer include "AS-6(S)", "AN-6(S)" and "HS-6(S)" (tradenames all available from Toagosei Co., Ltd.), etc.

Examples of the silicone-based macromonomer include organopolysiloxanes containing a polymerizable functional group bonded to one terminal end thereof, etc.

[(b-4) Nonionic Monomer]

From the viewpoint of improving dispersion stability of the pigment-containing polymer particles in the ink, it is preferred that a nonionic monomer (b-4) (hereinafter also referred to merely as a "component (b-4)") is further used as a monomer component of the water-insoluble polymer (B).

Examples of the component (b-4) include 2-hydroxyethyl (meth)acrylate, 3-hydroxypropyl (meth)acrylate, polyalkylene glycol (meth)acrylates such as polypropylene glycol (n=2 to 30 wherein n represents an average molar number of addition of oxyalkylene groups: hereinafter defined in the same way) (meth)acrylate and polyethylene glycol (n=2 to 30) (meth) acrylate, alkoxy polyalkylene glycol (meth) acrylates such as methoxy polyethylene glycol (n=1 to 30) (meth)acrylate, and phenoxy (ethylene glycol/propylene glycol copolymer) (n=1 to 30 in which n for ethylene glycol: 1 to 29) (meth)acrylate, etc.

Specific examples of commercially available products of the component (b-4) include "NK ESTER M-20G", "NK ESTER M-40G", "NK ESTER M-90G", "NK ESTER M-230G" and the like all available from Shin-Nakamura Chemical Co., Ltd.; and "BLEMMER PE-90", "BLEMMER PE-200", "BLEMMER PE-350" and the like, "BLEMMER PME-100", "BLEMMER PME-200", "BLEMMER PME-400" and the like, "BLEMMER PP-500", "BLEMMER PP-800", "BLEMMER PP-1000" and the like, "BLEMMER AP-150", "BLEMMER AP-400", "BLEMMER AP-550" and the like, "BLEMMER 50PEP-300", "BLEMMER 50POEP-800B", "BLEMMER 43PAPE-600B" and the like all available from NOF Corporation.

These components (b-1) to (b-4) may be respectively used alone or in the form of a mixture of any two or more thereof.

(Contents of Respective Components or Constitutional Units in Monomer Mixture or Water-Insoluble Polymer)

Upon production of the water-insoluble polymer (B), the contents of the above components (b-1) and (b-2) in the monomer mixture (contents of non-neutralized components; hereinafter defined in the same way) or the contents of the constitutional units derived from the components (b-1) and (b-2) in the water-insoluble polymer are as follows from the viewpoint of improving dispersion stability of the pigment-containing polymer particles in the ink.

The content of the component (b-1) is preferably not less than 5% by mass, more preferably not less than 8% by mass and even more preferably not less than 10% by mass, and is also preferably not more than 45% by mass, more preferably not more than 35% by mass and even more preferably not more than 30% by mass.

The content of the component (b-2) is preferably not less than 35% by mass, more preferably not less than 40% by mass and even more preferably not less than 43% by mass, and is also preferably not more than 90% by mass, more preferably not more than 80% by mass and even more preferably not more than 75% by mass.

In the case where the component (b-3) and/or the component (b-4) are further included in addition to the aforementioned components (b-1) and (b-2), upon production of the water-insoluble polymer (B), the contents of the components (b-1) to (b-4) in the monomer mixture or the contents of the constitutional units derived from the components (b-1) to (b-4) in the water-insoluble polymer (B) are as follows from the viewpoint of improving dispersion stability of the pigment-containing polymer particles in the ink.

The content of the component (b-1) is preferably not less than 3% by mass, more preferably not less than 5% by mass and even more preferably not less than 7% by mass, and is also preferably not more than 40% by mass, more preferably not more than 30% by mass and even more preferably not more than 20% by mass.

The content of the component (b-2) is preferably not less than 25% by mass, more preferably not less than 30% by mass and even more preferably not less than 35% by mass, and is also preferably not more than 60% by mass, more preferably not more than 55% by mass and even more preferably not more than 50% by mass.

In the case where the component (b-3) is further included, the content of the component (b-3) is preferably not less than 5% by mass, more preferably not less than 8% by mass and even more preferably not less than 10% by mass, and is also preferably not more than 30% by mass, more preferably not more than 25% by mass and even more preferably not more than 20% by mass.

In the case where the component (b-4) is further included, the content of the component (b-4) is preferably not less than 5% by mass, more preferably not less than 10% by mass and even more preferably not less than 15% by mass, and is also preferably not more than 50% by mass, more preferably not more than 45% by mass and even more preferably not more than 40% by mass.

The mass ratio of the component (b-1) to the component (b-2) [component (b-1)/component (b-2)] is preferably not less than 0.05, more preferably not less than 0.15 and even more preferably not less than 0.25, and is also preferably not more than 1.2, more preferably not more than 0.80 and even more preferably not more than 0.50.

In addition, in the case where the component (b-3) is further included, the mass ratio of the component (b-1) to a sum of the component (b-2) and the component (b-3) [component (b-1)/[component (b-2)+component (b-3)]] is preferably not less than 0.01, more preferably not less than 0.05 and even more preferably not less than 0.10, and is also preferably not more than 1, more preferably not more than 0.60 and even more preferably not more than 0.40.

(Production of Water-Insoluble Polymer (B))

The water-insoluble polymer (B) may be produced by copolymerizing the aforementioned monomer mixture by known polymerization methods such as a bulk polymerization method, a solution polymerization method, a suspension polymerization method and an emulsion polymerization method. Among these polymerization methods, preferred is the solution polymerization method.

The solvent used in the solution polymerization method is not particularly limited, and is preferably a polar organic solvent such as aliphatic alcohols having 1 to 3 carbon atoms, ketones, ethers and esters. Specific examples of the solvent include methanol, ethanol, acetone and methyl ethyl ketone. Of these solvents, preferred is methyl ethyl ketone.

The polymerization may be carried out in the presence of a polymerization initiator or a chain transfer agent. As the polymerization initiator, preferred are azo compounds, and more preferred is 2,2'-azobis(2,4-dimethylvaleronitrile). As the chain transfer agent, preferred are mercaptans, and more preferred is 2-mercaptoethanol.

The preferred polymerization conditions may vary depending upon the kind of polymerization initiator used, etc. The polymerization temperature is preferably not lower than 50° C. and not higher than 90° C., and the polymerization time is preferably not less than 1 hour and not more than 20 hours. In addition, the polymerization is preferably conducted in a nitrogen gas atmosphere or an atmosphere of an inert gas such as argon.

After completion of the polymerization reaction, the polymer thus produced may be isolated from the reaction solution by conventionally known methods such as reprecipitation and removal of the solvent by distillation. In addition, the thus obtained polymer may be subjected to reprecipitation, membrane separation, chromatography, extraction, etc., for removing unreacted monomers, etc., therefrom.

The water-insoluble polymer (B) is preferably used as such in the form of a water-insoluble polymer solution without removing the solvent used in the polymerization reaction therefrom in order to use the organic solvent contained therein as an organic solvent in the below-mentioned step I from the viewpoint of enhancing productivity of the below-mentioned water dispersion of the pigment-containing polymer particles.

The solid content of the water-insoluble polymer (B) solution is preferably not less than 25% by mass and more preferably not less than 30% by mass, and is also preferably not more than 60% by mass and more preferably not more than 55% by mass, from the viewpoint of enhancing productivity of the water dispersion of the pigment-containing polymer particles.

The weight-average molecular weight of the water-insoluble polymer (B) used in the present invention is preferably not less than 5,000, more preferably not less than 10,000 and even more preferably not less than 20,000, and is also preferably not more than 500,000, more preferably not more than 400,000, even more preferably not more than 300,000 and further even more preferably not more than 200,000, from the viewpoint of improving dispersion stability of the pigment-containing polymer particles in the ink as well as from the viewpoint of obtaining good printed materials that are free of roller transfer contamination and intercolor bleeding.

Meanwhile, the weight-average molecular weight may be measured by the method described in Examples below.

Examples of the configuration of the water-insoluble polymer (B) being present in the water-based ink include the particle configuration in which the pigment (A) is enclosed (encapsulated) in the water-insoluble polymer (B), the particle configuration in which the pigment (A) is uniformly dispersed in the water-insoluble polymer, the particle configuration in which the pigment (A) is exposed onto a surface of respective particles of the water-insoluble polymer (B), the configuration in which the water-insoluble polymer (B) is adsorbed onto the pigment (A), and the configuration in which the water-insoluble polymer (B) is not adsorbed onto the pigment (A), as well as a mixture of these configurations. In the present invention, from the viewpoint of improving dispersion stability of the pigment, among these configurations, preferred is the configuration of the pigment-containing polymer particles, and more preferred is the pigment-enclosing configuration in which the pigment (A) is incorporated in the water-insoluble polymer (B).

[Particles of Water-Insoluble Polymer (B) Containing Pigment (A)]
(Pigment-Containing Polymer Particles)]
[Production of Pigment-Containing Polymer Particles]

The water-based ink of the present invention may include particles of the water-insoluble polymer (B) containing the pigment (A) (pigment-containing polymer particles).

The pigment-containing polymer particles can be efficiently produced in the form of a water dispersion thereof by the process including the following steps I and II.

Step I: subjecting a mixture containing the water-insoluble polymer (B), an organic solvent, the pigment (A) and water (hereinafter also referred to merely as a "pigment mixture") to dispersion treatment to thereby obtain a dispersion of the pigment-containing polymer particles; and Step II: removing the aforementioned organic solvent from the dispersion obtained in the step I to thereby obtain a water dispersion of the pigment-containing polymer particles (hereinafter also referred to merely as a "pigment water dispersion").

In addition, the above process may further include the following step III as an optional step.

Step III: mixing the water dispersion obtained in the step II with a crosslinking agent to subject the polymer particles to crosslinking treatment, thereby obtaining a water dispersion of the crosslinked polymer particles.

(Step I)

The step I is preferably conducted by the method in which the water-insoluble polymer (B) is first dissolved in the organic solvent, and then the pigment (A) and water, if required, together with a neutralizing agent, a surfactant and the like, are added and mixed in the resulting organic solvent solution to obtain a dispersion of an oil-in-water type. The order of addition of the respective components added to the organic solvent solution of the water-insoluble polymer (B) is not particularly limited, and it is preferred that water, the neutralizing agent and the pigment (A) are successively added in this order.

The organic solvent in which the water-insoluble polymer (B) can be dissolved is not particularly limited. Examples of the preferred organic solvent include aliphatic alcohols having 1 to 3 carbon atoms, ketones, ethers, esters and the like. Of these organic solvents, from the viewpoint of improving wettability to the pigment (A), solubility of the water-insoluble polymer (B) therein and adsorptivity of the water-insoluble polymer (B) to the pigment (A), more preferred are ketones having not less than 4 and not more than 8 carbon atoms, even more preferred are methyl ethyl ketone and methyl isobutyl ketone, and further even more preferred is methyl ethyl ketone.

When the water-insoluble polymer is synthesized by the solution polymerization method, the solvent used in the polymerization method may be used as such in the step I.

(Neutralization)

In the case where the water-insoluble polymer (B) is an anionic polymer, an anionic group contained in the water-insoluble polymer may be neutralized using a neutralizing agent. When using the neutralizing agent, the pH value of the dispersion of the water-insoluble polymer after being neutralized with the neutralizing agent is preferably controlled to not less than 7 and not more than 11.

Examples of the neutralizing agent include hydroxides of alkali metals, ammonia and organic amines. Specific examples of the hydroxides of alkali metals include lithium hydroxide, sodium hydroxide, potassium hydroxide and cesium hydroxide. Among these hydroxides of alkali metals, preferred is sodium hydroxide. Specific examples of the organic amines include trimethylamine, ethylamine, diethylamine, triethylamine and triethanolamine.

As the neutralizing agent, from the viewpoint of improving continuous ejection properties and storage stability of the ink, preferred are the hydroxides of alkali metals and ammonia, and more preferred is a combination of sodium hydroxide and ammonia. In addition, the water-insoluble polymer (B) may be previously neutralized.

The neutralizing agent is preferably used in the form of an aqueous neutralizing agent solution from the viewpoint of accelerating neutralization of the polymer in a sufficient and uniform manner. From the same viewpoint as described above, the concentration of the aqueous neutralizing agent solution is preferably not less than 3% by mass, more preferably not less than 10% by mass and even more preferably not less than 15% by mass, and is also preferably not more than 30% by mass and more preferably not more than 25% by mass.

The degree of neutralization of the anionic group in the water-insoluble polymer (B) is preferably not less than 30 mol %, more preferably not less than 40 mol % and even more preferably not less than 50 mol %, and is also preferably not more than 300 mol %, more preferably not more than 200 mol % and even more preferably not more than 150 mol %, from the viewpoint of improving dispersion stability and storage stability of the pigment-containing polymer particles in the pigment water dispersion and the ink.

The degree of neutralization as described herein means the value obtained by dividing a mole equivalent of the neutralizing agent by a molar amount of the anionic group in the water-insoluble polymer (B).

(Contents of Respective Components in Pigment Mixture)

The content of the pigment (A) in the pigment mixture used in the step I is preferably not less than 10% by mass, more preferably not less than 12% by mass and even more preferably not less than 14% by mass, and is also preferably not more than 30% by mass, more preferably not more than 25% by mass and even more preferably not more than 20% by mass, from the viewpoint of improving dispersion stability of the pigment water dispersion as well as from the viewpoint of obtaining good printed materials that are free of roller transfer contamination and intercolor bleeding.

The content of the water-insoluble polymer (B) in the pigment mixture is preferably not less than 2.0% by mass, more preferably not less than 4.0% by mass and even more preferably not less than 5.0% by mass, and is also preferably not more than 15% by mass, more preferably not more than 12% by mass and even more preferably not more than 10% by mass, from the viewpoint of improving dispersion stability of the pigment water dispersion as well as from the viewpoint of obtaining good printed materials that are free of roller transfer contamination and intercolor bleeding.

The content of the organic solvent in the pigment mixture is preferably not less than 10% by mass, more preferably not less than 12% by mass and even more preferably not less than 15% by mass, and is also preferably not more than 35% by mass, more preferably not more than 30% by mass and even more preferably not more than 25% by mass, from the viewpoint of improving wettability to the pigment (A) and adsorptivity of the water-insoluble polymer to the pigment.

The content of water in the pigment mixture is preferably not less than 40% by mass, more preferably not less than 45% by mass and even more preferably not less than 50% by mass, and is also preferably not more than 70% by mass, more preferably not more than 65% by mass and even more preferably not more than 60% by mass, from the viewpoint of improving dispersion stability of the pigment water dispersion as well as from the viewpoint of enhancing productivity of the pigment water dispersion.

The mass ratio of the pigment (A) to the water-insoluble polymer (B) [(A)/(B)] in the pigment mixture is preferably not less than 30/70, more preferably not less than 40/60 and even more preferably not less than 50/50, and is also preferably not more than 90/10, more preferably not more than 80/20 and even more preferably not more than 75/25, from the viewpoint of improving dispersion stability of the pigment water dispersion as well as from the viewpoint of obtaining good printed materials that are free of roller transfer contamination and intercolor bleeding.

(Dispersion Treatment of Pigment Mixture)

In the step I, the pigment mixture is subjected to dispersion treatment to obtain a dispersion of the pigment-containing polymer particles. The dispersing method used for obtaining the aforementioned dispersion is not particularly limited. The pigment particles may be atomized into fine particles having a desired average particle size only by a substantial dispersion treatment. However, it is preferred that the pigment mixture is first subjected to a preliminary dispersion treatment, and then to the substantial dispersion treatment by applying a shear stress thereto so as to control the average particle size of the obtained pigment particles to a desired value.

The temperature used in the preliminary dispersion treatment in the step I is preferably not lower than 0° C., and is also preferably not higher than 40° C., more preferably not higher than 30° C. and even more preferably not higher than 25° C. The dispersing time is preferably not less than 0.5 hour and more preferably not less than 0.8 hour, and is also preferably not more than 30 hours, more preferably not more than 10 hours and even more preferably not more than 5 hours.

When subjecting the pigment mixture to the preliminary dispersion treatment, there may be used ordinary mixing and stirring devices such as anchor blades and disper blades. Of these devices, preferred are high-speed stirring mixers.

As the means for applying a shear stress to the pigment mixture in the substantial dispersion treatment, there may be used, for example, kneading machines such as roll mills and kneaders, high-pressure homogenizers such as "Microfluidizer" available from Microfluidics Corporation, and media-type dispersers such as paint shakers and beads mills. Examples of the commercially available media-type dispersers include "Ultra Apex Mill" available from Kotobuki Industries Co., Ltd., and "Pico Mill" available from Asada Iron Works Co., Ltd. These devices may be used in combination of any two or more thereof. Among these devices, the high-pressure homogenizers are preferably used from the viewpoint of reducing the particle size of the pigment.

When conducting the substantial dispersion treatment using the high-pressure homogenizers, it is possible to adjust the particle size of the pigment to a desired value by controlling the pressure used in the substantial dispersion treatment or the frequency of passing the dispersion through the dispersing devices.

The pressure used in the substantial dispersion treatment is preferably not less than 60 MPa, more preferably not less than 100 MPa and even more preferably not less than 130 MPa, and is also preferably not more than 200 MPa and more preferably not more than 180 MPa, from the viewpoint of enhancing productivity and cost efficiency.

The frequency of passing the dispersion through the dispersing devices is preferably not less than 3 and more preferably not less than 10, and is also preferably not more than 30 and more preferably not more than 25.

(Step II)

In the step II, the organic solvent is removed from the dispersion obtained in the step I by any conventionally known methods to obtain a water dispersion of the pigment-containing polymer particles (pigment water dispersion).

The organic solvent is preferably substantially completely removed from the thus obtained pigment water dispersion. However, the residual organic solvent may be present in the pigment water dispersion unless the objects and advantageous effects of the present invention are adversely affected by the residual organic solvent. The content of the residual organic solvent in the pigment water dispersion is preferably not more than 0.1% by weight and more preferably not more than 0.01% by weight.

In addition, if required, the pigment water dispersion may be subjected to heating and stirring treatments before removing the organic solvent therefrom by distillation.

In the thus-obtained pigment water dispersion, the solid water-insoluble polymer (B) particles containing the pigment (A) are dispersed in a dispersing medium containing water as a main medium. The configuration of the pigment-containing polymer particles is not particularly limited, and the pigment-containing polymer particles may have any configuration as long as the particles are formed from at least the pigment (A) and the water-insoluble polymer (B). However, as described hereinbefore, preferred is the pigment-enclosing configuration in which the pigment (A) is incorporated in the water-insoluble polymer (B).

(Step III)

The step III is an optional step. In the step III, the water dispersion obtained in the step II is mixed with a crosslinking agent to subject the polymer particles to crosslinking treatment, thereby obtaining a water dispersion of the crosslinked polymer particles. The step III is preferably carried out from the viewpoint of enhancing storage stability of the pigment water dispersion and the ink.

In the case where the water-insoluble polymer (B) is an anionic water-insoluble polymer containing an anionic group, the crosslinking agent used in this step is preferably in the form of a compound containing a functional group capable of reacting with the anionic group of the polymer, more preferably a compound containing the two or more functional groups in a molecule thereof, and even more preferably a compound containing the 2 to 6 functional groups in a molecule thereof.

Suitable examples of the crosslinking agent include compounds containing two or more epoxy groups in a molecule thereof, compounds containing two or more oxazoline groups in a molecule thereof, and compounds containing two or more isocyanate groups in a molecule thereof. Among these crosslinking agents, preferred are compounds containing two or more epoxy groups in a molecule thereof, and more preferred is trimethylolpropane polyglycidyl ether.

The concentration of the non-volatile components (solid content) in the resulting pigment water dispersion is preferably not less than 10% by mass and more preferably not less than 15% by mass, and is also preferably not more than 35% by mass and more preferably not more than 30% by mass, from the viewpoint of improving dispersion stability of the pigment water dispersion as well as from the viewpoint of facilitating production of the water-based ink.

Meanwhile, the solid content of the pigment water dispersion may be measured by the method described in Examples below.

The average particle size of the pigment-containing polymer particles in the pigment water dispersion is preferably not less than 40 nm, more preferably not less than 60 nm, even more preferably not less than 80 nm and even more preferably not less than 85 nm, and is also preferably not more than 150 nm, more preferably not more than 130 nm and even more preferably not more than 125 nm, from the viewpoint of suppressing formation of coarse particles and improving continuous ejection properties of the water-based ink.

Meanwhile, the average particle size of the pigment-containing polymer particles may be measured by the method described in Examples below.

In addition, the average particle size of the pigment-containing polymer particles in the water-based ink is the same as the average particle size of the pigment-containing polymer particles in pigment water dispersion, and the preferred range of the average particle size of the pigment-containing polymer particles in the water-based ink is also the same as that of the average particle size of the pigment-containing polymer particles in pigment water dispersion.

[Pigment-Free Water-Insoluble Polymer (B) Particles]

The water-based ink of the present invention may include the water-insoluble polymer (B) in the form of pigment-free water-insoluble polymer particles. From the viewpoint of promoting drying of the water-based ink on an ink-jet printing medium (on a surface of a printing paper) and improving uniformity of printed characters or images as well as storage stability and continuous ejection properties of the water-based ink, in the aforementioned method (II), the water-based ink of the present invention includes the water-insoluble polymer of the pigment (A)-containing water-insoluble polymer (B) particles and the pigment-free water-insoluble polymer (B) particles.

The water-insoluble polymer of the pigment (A)-containing water-insoluble polymer (B) particles and the pigment-free water-insoluble polymer (B) particles may be the same or different from each other as long as both the polymers are in the form of a water-insoluble polymer. As the configuration of the water-insoluble polymer, there may be mentioned a dispersion prepared by dispersing the water-insoluble polymer particles as a continuous phase in water, which may also contain a dispersant such as a surfactant, if required. The water-insoluble polymer particles may also act as a fusing emulsion for fusing droplets of the ink on a printing medium to thereby enhance optical density, gloss and rub fastness of the resulting ink.

The pigment-free water-insoluble polymer (B) particles are preferably used in the form of a dispersion containing the water-insoluble polymer (B) particles from the viewpoint of enhancing productivity of the water-based ink.

From the same viewpoint as described above, the content of the pigment-free water-insoluble polymer (B) particles in the water-based ink is preferably not less than 0.5% by mass, more preferably not less than 1.0% by mass and even more preferably not less than 1.2% by mass, and is also preferably not more than 10% by mass, more preferably not more than 6% by mass and even more preferably not more than 3% by mass.

In addition, from the same viewpoint as described above, the average particle size of the pigment-free water-insoluble polymer (B) particles in the water-based ink is preferably not less than 10 nm, more preferably not less than 30 nm and even more preferably not less than 50 nm, and is also preferably not more than 300 nm, more preferably not more than 200 nm and even more preferably not more than 150 nm. Meanwhile, the average particle size of the water-insoluble polymer (B) particles may be measured by the method described in Examples below.

<Organic Solvent (C)>

From the viewpoint of improving continuous ejection properties of the water-based ink, the organic solvent (C) contains at least a glycol ether (c-1). The glycol ether (c-1) used in the organic solvent (C) has a viscosity of not less than 2.0 mPa·s and not more than 7.0 mPa·s as measured at 20° C. and a vapor pressure of not less than 0.01 hPa and not more than 7.0 hPa as measured at 20° C., and the content of a glycol ether having a viscosity of not less than 6.0 mPa·s as measured at 20° C. as a component of the glycol ether (c-1) in the water-based ink is not less than 0% by mass and not more than 5% by mass. Thus, since the glycol ether (c-1) has an adequate viscosity, is excellent in flow characteristics at a high drive frequency of a print head and further exhibit an adequate vapor pressure, it is possible to suppress drying of the ink and prevent deposition of aggregates of the ink in nozzles. For this reason, it is considered that the glycol ether (c-1) contributes to improvement in continuous ejection properties of the ink upon high-speed printing.

(Glycol Ether (c-1))

The viscosity of the glycol ether (c-1) as measured at 20° C. is preferably not less than 2.2 mPa·s, more preferably not less than 2.4 mPa·s and even more preferably not less than 2.6 mPa·s, and is also preferably not more than 6.8 mPa·s, more preferably not more than 6.0 mPa·s and even more preferably not more than 5.5 mPa·s, from the viewpoint of imparting adequate viscosity to the water-based ink and improving continuous ejection properties of the water-based ink. The content of a glycol ether having a viscosity of not less than 6.0 mPa·s as measured at 20° C. as a component of the glycol ether (c-1) in the water-based ink is not less than 0% by mass, and is also not more than 5% by mass, preferably not more than 3% by mass and more preferably not more than 1% by mass from the viewpoint of obtaining good printed materials that are free of roller transfer contamination.

The vapor pressure of the glycol ether (c-1) as measured at 20° C. is preferably not less than 0.04 hPa, more preferably not less than 0.06 hPa and even more preferably not less than 0.07 hPa from the viewpoint of imparting adequate drying properties to the water-based ink as well as from the viewpoint of obtaining good printed materials that are free of roller transfer contamination and intercolor bleeding, and is also preferably not more than 6.0 hPa, more preferably not more than 5.5 hPa and even more preferably not more than 4.0 hPa from the viewpoint of suppressing formation of dry-thickened products of the ink within a line print head as well as deterioration in continuous ejection properties of the water-based ink.

From the same viewpoint as described above, the boiling point of the glycol ether (c-1) is preferably not lower than 130° C., more preferably not lower than 135° C. and even more preferably not lower than 138° C., and is also preferably not higher than 240° C., more preferably not higher than 230° C. and even more preferably not higher than 225° C.

Specific examples of the glycol ether (c-1) include alkylene glycol monoalkyl ethers and alkylene glycol dialkyl ethers. Among these compounds, from the viewpoint of improving continuous ejection properties of the water-based ink as well as from the viewpoint of obtaining good printed materials that are free of roller transfer contamination and intercolor bleeding, preferred are alkylene glycol monoalkyl ethers. The number of carbon atoms in an alkyl group of the alkylene glycol monoalkyl ethers is preferably not less than 1, more preferably not less than 2 and even more preferably not less than 3, and is also preferably not more than 6 and more preferably not more than 4. The alkyl group of the alkylene glycol monoalkyl ethers may be in the form of either a straight chain or a branched chain.

Specific examples of the alkylene glycol monoalkyl ethers include ethylene glycol ethyl ether, ethylene glycol isopropyl ether, ethylene glycol propyl ether, ethylene glycol butyl ether, diethylene glycol methyl ether, diethylene glycol ethyl ether, diethylene glycol isopropyl ether, diethylene glycol propyl ether, diethylene glycol isobutyl ether, diethylene glycol butyl ether, triethylene glycol methyl ether, triethylene glycol isobutyl ether, tetraethylene glycol methyl ether, propylene glycol ethyl ether, dipropylene glycol butyl ether, dipropylene glycol methyl ether, tripropylene glycol methyl ether and tripropylene glycol butyl ether.

Of these alkylene glycol monoalkyl ethers, preferred is at least one compound selected from the group consisting of ethylene glycol isopropyl ether, ethylene glycol propyl ether, diethylene glycol methyl ether, diethylene glycol isopropyl ether and diethylene glycol isobutyl ether, and more preferred is at least one compound selected from the group consisting of ethylene glycol isopropyl ether, diethylene glycol isopropyl ether and diethylene glycol isobutyl ether.

(Organic Solvent (c-2) Other than Glycol Ether (c-1))

Examples of an organic solvent (c-2) other than the glycol ether (c-1) include glycol ethers other than the glycol ether (c-1), alcohols, alkyl ethers of the alcohols, nitrogen-containing heterocyclic compounds such as N-methyl-2-pyrrolidone, amides, amines and sulfur-containing compounds. From the viewpoint of improving storage stability and continuous ejection properties of the ink, as the organic solvent (c-2) other than the glycol ether (c-1), preferred is at least one compound selected from the group consisting of alcohols and alkyl ethers of the alcohols which both have a boiling point of not lower than 90° C., and more preferred are polyhydric alcohols having a boiling point of not lower than 90° C. The organic solvent (b-2) other than the glycol ether (c-1) may be used alone or in the form of a mixture of any two or more kinds thereof.

Examples of the glycol ethers other than the glycol ether (c-1) include triethylene glycol butyl ether and dipropylene glycol methyl ether.

The polyhydric alcohols having a boiling point of not lower than 90° C. are preferably in the form of a compound having a boiling point of lower than 250° C. Examples of the polyhydric alcohols having a boiling point of not lower than 90° C. and lower than 250° C. include 1,2-alkanediols such as ethylene glycol (boiling point (b.p.) 197° C.), propylene glycol (b.p. 188° C.), 1,2-butanediol (b.p. 193° C.), 1,2-pentanediol (b.p. 206° C.) and 1,2-hexanediol (b.p. 223° C.). Further examples of the polyhydric alcohols having a boiling point of not lower than 90° C. include diethylene glycol (b.p. 245° C.), polyethylene glycol, propylene glycol (b.p. 188° C.), dipropylene glycol (b.p. 232° C.), 1,3-propanediol (b.p. 210° C.), 1,3-butanediol (b.p. 208° C.), 1,4-butanediol (b.p. 230° C.), 3-methyl-1,3-butanediol (b.p. 203° C.), 1,5-pentanediol (b.p. 242° C.), 2-methyl-2,4-pentanediol (b.p. 196° C.), 1,2,6-hexanetriol (b.p. 178° C.), 1,2,4-butanetriol (b.p. 190° C.), 1,2,3-butanetriol (b.p. 175° C.) and petriol (b.p. 216° C.).

In addition, the compound having a boiling point of not lower than 250° C. such as 1,6-hexanediol (b.p. 250° C.), triethylene glycol (b.p. 285° C.), tripropylene glycol (b.p. 273° C.), polypropylene glycols (b.p. not lower than 250° C.) and glycerin (b.p. 290° C.) may be used in combination with the compound having a boiling point of lower than 250° C. Among these compounds, from the viewpoint of improving storage stability and continuous ejection properties of the ink, preferred is at least one compound selected from the group consisting of alkanediols having not less than 2 and not more than 6 carbon atoms, such as propylene glycol, diethylene glycol and 1,2-hexanediol, polypropylene glycols having a molecular weight of 500 to 1000, and glycerin, more preferred is at least one compound selected from the group consisting of 1,2-alkanediols having not less than 3 and not more than 4 carbon atoms, such as propylene glycol and diethylene glycol, and the aforementioned polypropylene glycols, and even more preferred is a combination of the 1,2-alkanediol selected from the group consisting of propylene glycol and diethylene glycol, and the polypropylene glycol.

<Surfactant (D)>

The water-based ink used in the present invention also contains a surfactant (D) from the viewpoint of suppressing increase in viscosity of the ink, improving continuous ejection properties of the ink and obtaining good printed materials that are free of roller transfer contamination and intercolor bleeding. As the surfactant (D), there may be used those surfactants containing a silicone-based surfactant (d-1).

The silicone-based surfactant (d-1) is not particularly limited, and any suitable silicone-based surfactant may be appropriately used as the silicone-based surfactant (d-1) according to the objects and applications of the water-based ink. Among these silicone-based surfactants, from the viewpoint of suppressing increase in viscosity of the ink, improving continuous ejection properties of the ink and obtaining good printed materials that are free of roller transfer contamination and intercolor bleeding, a polyether-modified silicone-based surfactant is preferably used.

(Polyether-Modified Silicone-Based Surfactant)

The polyether-modified silicone-based surfactant is capable of suppressing increase in viscosity of the ink and occurrence of intercolor bleeding between the inks. Therefore, it is considered that the polyether-modified silicone-based surfactant contributes to obtaining good printed materials that are free of intercolor bleeding upon high-speed printing.

The polyether-modified silicone-based surfactant has such a structure that a hydrocarbon group bonded to a side chain and/or a terminal end of a silicone oil is substituted with a polyether group. Examples of the suitable polyether group of the polyether-modified silicone-based surfactant include a polyethyleneoxy group, a polypropyleneoxy group and a polyalkyleneoxy group formed by addition-bonding an ethyleneoxy group (EO) and a propyleneoxy group (a trimethyleneoxy group or a propane-1,2-diyloxy group; PO) to each other in a block form or a random form. More specifically, as the polyether-modified silicone-based surfactant, there may be used a compound formed by grafting a polyether group to a main chain of a silicone, a compound formed by bonding a silicone and a polyether group to each other in a block form, etc.

Examples of the suitable polyether-modified silicone-based surfactant include those compounds represented by the following general formula (1).

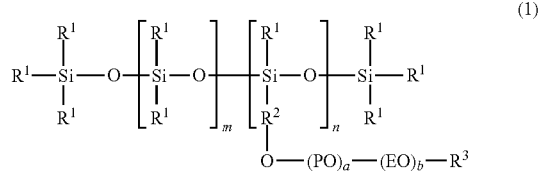

wherein $R^1$ is an alkyl group having 1 to 3 carbon atoms or a hydroxy group; $R^2$ is an alkanediyl group having 2 to 5 carbon atoms; $R^3$ is a hydrogen atom, an alkyl group having 1 to 3 carbon atoms or a hydroxy group; PO is a propyleneoxy group; EO is an ethyleneoxy group; a, b, m and n each represent an average molar number of addition of respective constitutional units in which a is a number of 0 to 10, b is a number of 1 to 50, m is a number of 1 to 500 and n is a number of 1 to 50; and a plurality of the $R^1$ groups may be the same or different from each other.

In the general formula (1), $R^1$ is preferably an alkyl group having 1 to 3 carbon atoms and more preferably a methyl group; $R^2$ is preferably an alkanediyl group having 3 or 4 carbon atoms and more preferably a trimethylene group; $R^3$ is preferably an alkyl group having 1 to 3 carbon atoms and more preferably a methyl group.

The propyleneoxy group as PO is preferably a propane-1,2-diyloxy group.

In the general formula (1), a is preferably a number of 0 to 5 and more preferably 0 to 3; b is preferably a number of 1 to 30 and more preferably 1 to 20; m is preferably a number of 3 to 400 and more preferably 5 to 300; and n is preferably a number of 1 to 40 and more preferably 1 to 30. The constitutional units in the number of each of a, b, m and n may be the same or different from each other.

In the aforementioned general formula (1), it is preferred that the average molar numbers of addition a, b, m and n satisfy the following formula (2).

$$[a+b]/[m/n]=0.5 \text{ to } 8.0 \quad (2)$$

The polyether-modified silicone-based surfactant (d-1) is required to diffuse into a gas-liquid interface of the ink and exhibit a sufficient surface activating performance from the viewpoint of improving continuous ejection properties of the ink and obtaining good printed materials that are free of roller transfer contamination and intercolor bleeding. For this reason, it is preferred that the polyether-modified silicone-based surfactant has an adequate solubility in the ink and an adequate velocity of adsorption into the gas-liquid interface of the ink.

With respect to the surface activating performance of the polyether-modified silicone-based surfactant, it is considered that the solubility of the polyether-modified silicone-based surfactant in the ink and the velocity of adsorption of the polyether-modified silicone-based surfactant into the gas-liquid interface of the ink can be controlled by the ratio [m/n] and the chain lengths of EO and PO therein. More specifically, when the molar number of addition of EO or PO (modification rate) is excessively small, the solubility of the polyether-modified silicone-based surfactant in the aqueous vehicle tends to be reduced, so that the surfactant tends to be considerably deteriorated in surface activating performance owing to occurrence of layer separation, etc. On the other hand, when the molar number of addition of EO or PO is excessively large, the solubility of the polyether-modified silicone-based surfactant in the aqueous vehicle tends to be increased, so that the velocity of adsorption of the polyether-modified silicone-based surfactant into a gas-liquid interface of the ink tends to be reduced, and the surfactant also tends to be deteriorated in surface activating performance.

From the same viewpoint as described above, the aforementioned sum [a+b] is preferably not less than 5, more preferably not less than 8 and even more preferably not less than 10, and is also preferably not more than 35, more preferably not more than 30 and even more preferably not more than 25. In addition, the aforementioned ratio [m/n] is preferably not less than 2, more preferably not less than 3 and even more preferably not less than 4, and is also preferably not more than 20, more preferably not more than 18 and even more preferably not more than 16.

Furthermore, the aforementioned ratio [a+b]/[m/n] is preferably not less than 0.5, more preferably not less than 0.63 and even more preferably not less than 0.7, and is also preferably not more than 7, more preferably not more than 6 and even more preferably not more than 5.

Meanwhile, the ratio [a+b]/[m/n] may be calculated by the method described in Examples below.

From the same viewpoint as described above, the kinematic viscosity of the polyether-modified silicone-based surfactant as measured at 25° C. is preferably not less than 40 mm$^2$/s and more preferably not less than 50 mm$^2$/s, and is also preferably not more than 1000 mm$^2$/s and more preferably not more than 950 mm$^2$/s. Meanwhile, the kinematic viscosity may be measured using a Ubbellohde viscometer.

In addition, the HLB value of the polyether-modified silicone-based surfactant is preferably not less than 2.0, more preferably not less than 2.5 and even more preferably not less than 3.0 from the viewpoint of improving solubility of the polyether-modified silicone-based surfactant in the water-based ink. The term "HLB" (hydrophile-lypophile balance) as used herein means the value indicating an affinity of the surfactant to water and an oil, and can be calculated according to the following formula by Griffin method. Meanwhile, as the "hydrophilic group contained in surfactant" shown in the following formula, there may be mentioned, for example, a hydroxy group and an ethyleneoxy group.

HLB=20×[(molecular weight of hydrophilic group contained in surfactant)/(molecular weight of surfactant)]

Specific examples of the polyether-modified silicone-based surfactant include KF series products available from Shin-Etsu Chemical Industry Co., Ltd., such as "KF-351A", "KF-352A", "KF-353", "KF-354L", "KF-355A", "KF-615A", "KF-945", "KF-640", "KF-642", "KF-643", "KF-644", "KF-6020" and the like; "SILFACE SAG 005" available from Nissin Chemical Industry Co., Ltd.; "FZ-2191" available from NUC Corporation; and "BYK-348" available from BYK Chemie Japan K.K. Among these polyether-modified silicone-based surfactants, preferred are those compounds represented by the aforementioned formula (1) which are capable of satisfying the relationship of [a+b]/[m/n]=0.5 to 8.0, more specifically, "KF-353", "KF-355A", "KF-642", etc., "SILFACE SAG 005" available from Nissin Chemical Industry Co., Ltd., "FZ-2191" available from NUC Corporation, and "BYK-348" available from BYK Chemie Japan K.K., etc.

These polyether-modified silicone-based surfactants may be used alone or in combination of any two or more of the aforementioned surfactants.

(Surfactant Other than Silicone-Based Surfactant (d-1))

In the present invention, as the surfactant (D), the surfactant other than the silicone-based surfactant (d-1) may be used in combination therewith. Among the surfactants other than the silicone-based surfactant (d-1), from the viewpoint of applicability to the water-based ink, preferred is a nonionic surfactant (d-2).

Examples of the nonionic surfactant (d-2) include (1) alkyl ethers, alkenyl ethers, alkynyl ethers or aryl ethers of polyoxyalkylenes which are produced by adding ethyleneoxide, propyleneoxide or butyleneoxide (hereinafter collectively referred to as an "alkyleneoxide") to a saturated or unsaturated, linear or branched higher alcohol having 8 to 22 carbon atoms, a polyhydric alcohol or an aromatic alcohol, (2) esters of a higher alcohol containing a saturated or unsaturated, linear or branched hydrocarbon group having 8 to 22 carbon atoms, and a polyvalent fatty acid, (3) polyoxyalkylene fatty acid amines containing a linear or branched alkyl group or alkenyl group having 8 to 20 carbon atoms, and (4) ester compounds of a higher fatty acid having 8 to 22 carbon atoms and a polyhydric alcohol, or compounds produced by adding an alkyleneoxide to the ester compounds.

The nonionic surfactant (d-2) is preferably an acetylene glycol-based surfactant. Specific examples of the acetylene glycol-based surfactant include at least one compound selected from the group consisting of 2,4,7,9-tetramethyl-5-decyne-4,7-diol, 3,6-dimethyl-4-octyne-3,6-diol, 2,5-dimethyl-3-hexyne-2,5-diol, 2,5,8,11-tetramethyl-6-dodecyne-5,8-diol, 3,5-dimethyl-1-hexyne-3-ol and EO adducts of these compounds, more preferably at least one compound selected from the group consisting of 2,4,7,9-tetramethyl-5-decyne-4,7-diol, 3,6-dimethyl-4-octyne-3,6-diol, 2,5-dimethyl-3-hexyne-2,5-diol and EO adducts of these compounds, and even more preferably at least one compound selected from the group consisting of 2,4,7,9-tetramethyl-5-decyne-4,7-diol and EO adducts of the compound.

Examples of commercially available products of the nonionic surfactant (d-2) include "SURFYNOL 104P G50" (a propylene glycol solution of 2,4,7,9-tetramethyl-5-decyne-4,7-diol; active ingredient content: 50%), "SURFYNOL 465" (EO adduct of 2,4,7,9-tetramethyl-5-decyne-4,7-diol; average molar number of addition of EO: 10) and "SURFYNOL 485" (EO adduct of 2,4,7,9-tetramethyl-5-decyne-4,7-diol; average molar number of addition of EO: 30) all available from Nissin Chemical Industry Co., Ltd., and Air Products & Chemicals, Inc., "ACETYLENOL E81" (average molar number of addition of EO: 8.1), "ACETYLENOL E100" (average molar number of addition of EO: 10) and "ACETYLENOL E200" (average molar number of addition of EO: 20) all available from Kawaken Fine Chemicals Co., Ltd., and "EMULGEN 120" (polyoxyethylene lauryl ether) available from Kao Corporation.

[Contents of Respective Components and Properties of Water-Based Ink]

The contents of the respective components in the water-based ink, in particular, the water-based ink for ink-jet printing, according to the present invention as well as various properties of the water-based ink are as follows.

(Content of Pigment (A))

The content of the pigment (A) in the water-based ink is preferably not less than 1.0% by mass, more preferably not less than 2.0% by mass and even more preferably not less than 2.5% by mass from the viewpoint of enhancing printing density (optical density) of the water-based ink. Also, the content of the pigment (A) in the water-based ink is preferably not more than 15.0% by mass, more preferably not more than 10.0% by mass, even more preferably not more than 7.0% by mass and further even more preferably not more than 5.0% by mass from the viewpoint of reducing viscosity of the water-based ink upon evaporating the solvent therefrom as well as from the viewpoint of improving continuous ejection properties of the water-based ink and obtaining good printed materials that are free of roller transfer contamination and intercolor bleeding.

(Content of Water-Insoluble Polymer (B))

The content of the water-insoluble polymer (B) in the water-based ink is preferably not less than 2.0% by mass, more preferably not less than 2.5% by mass, even more preferably not less than 3.0% by mass and further even more preferably not less than 3.5% by mass, and is also preferably not less than 8.0% by mass, more preferably not more than 7.0% by mass, even more preferably not more than 6.0% by mass and further even more preferably not more than 5.0% by mass, from the viewpoint of reducing viscosity of the water-based ink upon evaporating the solvent therefrom as well as from the viewpoint of improving storage stability and continuous ejection properties of the water-based ink and obtaining good printed materials that are free of roller transfer contamination and intercolor bleeding.

Meanwhile, the content of the water-insoluble polymer (B) as used herein means a total content of the water-insoluble polymer (B) contained in the pigment-containing polymer particles and the water-insoluble polymer (B) contained in the pigment-free water-insoluble polymer (B) particles.

(Content of Organic Solvent (C))

The content of the organic solvent (C) in the water-based ink is not less than 25% by mass, preferably not less than 26% by mass, more preferably not less than 28% by mass and even more preferably not less than 30% by mass, and is also not more than 50% by mass, preferably not more than 45% by mass and more preferably not more than 40% by mass, from the viewpoint of improving continuous ejection properties of the water-based ink.

The content of the glycol ether (c-1) in the water-based ink is preferably not less than 1% by mass, more preferably not less than 2% by mass, even more preferably not less than 4% by mass and further even more preferably not less than 6% by mass, and is also preferably not more than 45% by mass, more preferably not more than 40% by mass, even more preferably not more than 30% by mass and further even more preferably not more than 25% by mass, from the viewpoint of improving storage stability and continuous ejection properties of the water-based ink.

The content of the organic solvent (c-2) in the water-based ink, preferably the total content of propylene glycol and polypropylene glycols in the water-based ink, is preferably not less than 10% by mass, more preferably not less than 12% by mass and even more preferably not less than 15% by mass, and is also preferably not more than 45% by mass, more preferably not more than 40% by mass and even more preferably not more than 35% by mass, from the viewpoint of improving storage stability and continuous ejection properties of the water-based ink.

In addition, the content of propylene glycol in the water-based ink is preferably not less than 12% by mass and more preferably not less than 16% by mass, and is also preferably not more than 43% by mass, more preferably not more than 37% by mass and even more preferably not more than 35% by mass, from the viewpoint of improving storage stability and continuous ejection properties of the water-based ink.

The content of a high-boiling organic solvent having a boiling point of not lower than 250° C. in the water-based ink used in the present invention is not more than 5% by mass, preferably not more than 4.5% by mass, more preferably not more than 4% by mass, even more preferably not more than 3.5% by mass and further even more preferably not more than 3% by mass from the viewpoint of imparting adequate drying properties to the water-based ink and inhibiting occurrence of roller transfer contamination upon high-speed printing, and is also preferably not less than 0.2% by mass and more preferably not less than 0.5% by mass from the viewpoint of improving continuous ejection properties of the water-based ink.

In the case where at least one compound selected from the group consisting of polypropylene glycols having a molecular weight of 500 to 1000 and glycerin is used in combination as the organic solvent (c-2), the total content of these compounds as the organic solvent (c-2) in the water-based ink is preferably not more than 5% by mass, more preferably not more than 4.5% by mass, even more preferably not more than 4% by mass, further even more preferably not more than 3.5% by mass and still further even more preferably not more than 3% by mass from the viewpoint of suppressing increase in viscosity of the water-based ink and improving continuous ejection properties of the water-based ink.

(Content of Surfactant (D))

The content of the surfactant (D) in the water-based ink is preferably not less than 0.1% by mass, more preferably not less than 0.2% by mass and even more preferably not less than 0.5% by mass, and is also preferably not more than 5% by mass, more preferably not more than 4% by mass, even more preferably not more than 3% by mass and further even more preferably not more than 2.5% by mass, from the viewpoint of suppressing increase in viscosity of the water-based ink and improving continuous ejection properties of the water-based ink as well as from the viewpoint of obtaining good printed materials that are free of roller transfer contamination and intercolor bleeding.

The content of the silicone-based surfactant (d-1) in the water-based ink is not less than 0.005% by mass from the same viewpoint as described above. Furthermore, from the viewpoint of improving continuous ejection properties of the water-based ink, the content of the silicone-based surfactant (d-1) in the water-based ink is preferably not less than 0.03% by mass and more preferably not less than 0.04% by mass, and is also preferably not more than 0.3% by mass, more preferably not more than 0.2% by mass, even more preferably not more than 0.15% by mass and further even more preferably not more than 0.12% by mass.

From the same viewpoint as described above, the content of the polyether-modified silicone-based surfactant in the water-based ink is preferably not less than 0.01% by mass, more preferably not less than 0.02% by mass and even more preferably not less than 0.03% by mass, and is also preferably not more than 0.5% by mass, more preferably not more than 0.4% by mass, even more preferably not more than 0.2% by mass and further even more preferably not more than 0.1% by mass.

The content of the nonionic surfactant (d-2) in the water-based ink is preferably not less than 0.1% by mass, more preferably not less than 0.8% by mass and even more preferably not less than 1.5% by mass, and is also preferably not more than 5% by mass, more preferably not more than 3.5% by mass and even more preferably not more than 2.5% by mass, from the viewpoint of suppressing increase in viscosity of the water-based ink and improving continuous ejection properties of the water-based ink as well as from the viewpoint of obtaining good printed materials that are free of roller transfer contamination and intercolor bleeding.

(Content of Water)

The content of water in the water-based ink is preferably not less than 20% by mass, more preferably not less than 30% by mass and even more preferably not less than 40% by mass, and is also preferably not more than 85% by mass, more preferably not more than 80% by mass and even more preferably not more than 75% by mass, from the viewpoint of improving continuous ejection properties and storage stability of the water-based ink as well as from the viewpoint of obtaining good printed materials that are free of roller transfer contamination and intercolor bleeding.

(Other Components)

The water-based ink of the present invention may also contain, in addition to the aforementioned components, various ordinary additives such as a humectant, a wetting agent, a penetrant, a dispersant, a viscosity controller, a defoaming agent, an antiseptic agent, a mildew-proof agent and a rust preventive.

(Properties of Water-Based Ink)

From the viewpoint of improving ejection durability of the water-based ink, the static surface tension of the water-based ink as measured at 20° C. is preferably not less than 22 mN/m, more preferably not less than 24 mN/m and even more preferably not less than 25 mN/m, and is also preferably not more than 45 mN/m, more preferably not more than 40 mN/m and even more preferably not more than 35 mN/m.

Meanwhile, the static surface tension of the water-based ink may be measured by the method described in Examples below.

The viscosity of the water-based ink as measured at 32° C. is preferably not less than 2.0 mPa·s, more preferably not less than 3.0 mPa·s and even more preferably not less than 5.0 mPa·s, and is also preferably not more than 12 mPa·s, more preferably not more than 9.0 mPa·s and even more preferably not more than 7.0 mPa·s, from the viewpoint of improving continuous ejection properties of the water-based ink.

Meanwhile, the viscosity of the water-based ink may be measured by the method described in Examples below.

The pH value of the water-based ink is preferably not less than 7.0, more preferably not less than 8.0, even more preferably not less than 8.5 and further even more preferably not less than 9.0 from the viewpoint of improving storage stability and continuous ejection properties of the water-based ink as well as from the viewpoint of obtaining good printed materials that are free of roller transfer contamination and intercolor bleeding, and is also preferably not more than 11.0 and more preferably not more than 10.0 from the viewpoint of improving resistance of members to the water-based ink and suppressing skin irritation.

Meanwhile, the pH value of the water-based ink may be measured by the method described in Examples below.

[Ink Set for Ink-Jet Printing]

The ink set for ink-jet printing according to the present invention includes two or more kinds of water-based inks which are each constituted of the water-based ink according to the present invention. By using the ink set of the present invention, it is possible to obtain good printed materials that are free of intercolor bleeding owing to overstriking of the two or more kinds of water-based inks.

In the present invention, the ink set including two or more kinds of water-based inks which are each constituted of the water-based ink according to the present invention is mounted to ink cartridges for respective colors in an ink-jet printer to eject droplets of each of the inks from ejection nozzles corresponding to the respective ink cartridges so that it is possible to print characters or images on a printing medium such as a roll paper.

The ink set of the present invention preferably includes at least one colored ink selected from the group consisting of inks having chromatic colors, and may be in the form of any of a two-color ink set, a three-color ink set, a four-color ink set, a five-color ink set, a six-color ink set and a seven or more-color ink set. Since the water-based ink of the present invention is capable of obtaining printed materials that are free of intercolor bleeding owing to overstriking of the inks, it is preferred that the ink set of the present invention is used in the form of a three or more-color ink set.

The ink set of the present invention may further include a black ink, and may also include a clear ink in combination with these colored inks.

[Ink-Jet Printing Method]

In the ink-jet printing method of the present invention, the ink set for ink-jet printing according to the present invention is mounted to an ink-jet printer, and the process including the following steps 1 and 2 and, if required, further including the following step 3, is carried out to print characters or images on a printing medium.

Step 1: ejecting the water-based ink of the present invention onto the printing medium;

Step 2: further ejecting the water-based ink of the present invention onto the printing medium to overstrike the water-based ink on the water-based ink that has been ejected onto the printing medium in the step 1; and Step 3: bringing the overstruck water-based inks obtained on the printing medium in the step 2 into contact with a transportation roller.

In the ink-jet printing method of the present invention, any of a serial head printing method, a line head printing method and the like may be used. However, the ink-jet printing method of the present invention is preferably carried out using an ink-jet printing apparatus equipped with a print head of a line head printing type. The print head of a line head printing type is a print head of an elongated shape having a length near a width of the printing medium. In the ink-jet printing method using the print head of a line head printing type, while keeping the print head stationery and moving the printing medium along a transporting direction thereof, ink droplets are ejected from openings of nozzles of the print head in association with the movement of the printing medium, whereby it is possible to allow the ink droplets to adhere onto the printing medium to print characters or images, etc., thereon.

Examples of the printing medium include a water absorbing printing medium such as a plain paper and a wood-free paper, a low-water absorbing printing medium such as an art paper and a coated paper, a non-water absorbing printing medium such as a synthetic resin film, etc. The printing medium is preferably in the form of a roll paper.

The water absorption of the printing medium as measured in a pure water contact time of 100 milliseconds is not less than 0 g/m$^2$, and is also preferably not more than 10 g/m$^2$ and more preferably not more than 5 g/m$^2$. The water absorption of the printing medium may be measured using an automatic scanning liquid absorptiometer by the method described in Examples below.

In addition, the transportation speed of the printing medium is preferably not less than 20 m/min, more preferably not less than 70 m/min and even more preferably not less than 100 m/min from the viewpoint of exhibiting the effect of obtaining good printed materials that are free of roller transfer contamination and intercolor bleeding. Also, from the viewpoint of reducing load required upon drying the printed materials obtained after ejecting the water-based ink, the transportation speed of the printing medium is preferably not more than 200 m/min, more preferably not more than 150 m/min and even more preferably not more than 120 m/min. The transportation speed of the printing medium means a velocity of movement of the printing medium in the direction along which the printing medium is transported upon the printing.

The method of ejecting the ink droplets is preferably a piezoelectric method using a piezoelectric-type print head. In the piezoelectric method, the ink droplets are ejected from a number of nozzles communicated with respective pressure chambers by vibrating a wall surface of the respective pressure chambers by means of a piezoelectric element. Meanwhile, in the present invention, there may also be used a thermal method using a thermal-type print head.

The voltage applied to the print head is preferably not less than 5 V, more preferably not less than 10 V and even more preferably not, less than 15 V, and is also preferably not more than 40 V, more preferably not more than 35 V and even more preferably not more than 30 V, from the viewpoint of conducting the high-speed printing with a high efficiency, etc.

The drive frequency of the print head is preferably not less than 10 kHz, more preferably not less than 20 kHz and even more preferably not less than 30 kHz, and is also preferably not more than 90 kHz, more preferably not more than 80 kHz and even more preferably not more than 70 kHz, from the viewpoint of conducting the high-speed printing with a high efficiency, etc.

The amount of droplets of the ink ejected is preferably not less than 0.5 pL, more preferably not less than 1.0 pL, even more preferably not less than 1.5 pL and further even more preferably not less than 1.8 pL, and is also preferably not more than 30 pL, more preferably not more than 10 pL and even more preferably not more than 5 pL, as calculated per one droplet of the ink ejected, from the viewpoint of maintaining accuracy of an impact position of the ink droplets and improving image quality of the characters or images printed.

The print resolution of the characters or images printed is preferably not less than 1000 dpi, more preferably not less than 1500 dpi and even more preferably not less than 1800 dpi. For example, in the case where the number of nozzle pores arranged per a length of a nozzle row in a line print head is 1200 dpi (dot/inch), when ejecting the ink onto a printing medium, a row of dots of the ink with a resolution of 1200 dpi which corresponds to the nozzle row is formed thereon. When ejecting the ink droplets while moving the printing medium, the dots with a resolution of 1200 dpi are formed along the direction of the nozzle row on the printing medium.

From the viewpoint of reducing viscosity of the water-based ink and improving continuous ejection properties of the water-based ink, the inside temperature of a print head, preferably, a line print head, upon the printing, is preferably controlled to not lower than 20° C., more preferably not lower than 25° C. and even more preferably not lower than 30° C., and is also preferably controlled to not higher than 45° C., more preferably not higher than 40° C. and even more preferably not higher than 38° C.

The temperature of the surface of the printing medium opposed to an ink-ejection region of the print head, preferably the line print head, is preferably controlled to not lower than 28° C., more preferably not lower than 30° C. and even more preferably not lower than 31° C., and is also preferably controlled to not higher than 45° C., more preferably not higher than 40° C. and even more preferably not higher than 38° C.

The amount of the water-based ink deposited on the printing medium is preferably not less than 0.1 g/m$^2$, and is also preferably not more than 25 g/m$^2$ and more preferably not more than 20 g/m$^2$, in terms of a solid content thereof, from the viewpoint of improving image quality of the resulting printed materials and increasing the printing speed.

In the ink-jet printing method of the present invention, it is preferred that after further ejecting the droplets of the water-based ink onto the printing medium to overstrike the water-based ink on the water-based ink that has been ejected onto the printing medium in the step 1, the step of transporting the printing medium by the transportation roller and drying the droplets of the water-based ink impacted and deposited on the printing medium is further conducted.

In the drying step, the temperature of the surface of the printing medium is preferably controlled to not lower than 40° C., more preferably not lower than 50° C., even more preferably not lower than 60° C., further even more preferably not lower than 70° C. and still further even more preferably not lower than 80° C. from the viewpoint of obtaining good printed materials that are free of intercolor bleeding, and is also preferably controlled to not higher than 200° C., more preferably not higher than 150° C. and even more preferably not higher than 120° C. from the viewpoint of suppressing deformation of the printing medium owing to heat applied thereto and saving energy consumed.

With respect to the aforementioned embodiments, the present invention further provides the following aspects relating to the water-based ink, the ink set for ink-jet printing and the ink-jet printing method.

<1> A water-based ink including a pigment (A), a water-insoluble polymer (B), an organic solvent (C), a surfactant (D) and water, in which:

the organic solvent (C) includes at least a glycol ether (c-1) which has a viscosity of not less than 2.0 mPa·s and not more than 7.0 mPa·s as measured at 20° C. and a vapor pressure of not less than 0.01 hPa and not more than 7.0 hPa as measured at 20° C., and a content of a glycol ether having a viscosity of not less than 6.0 mPa·s as measured at 20° C. as a component of the glycol ether (c-1) in the water-based ink is not less than 0% by mass and not more than 5% by mass;

the surfactant (D) includes a silicone-based surfactant (d-1), and a content of the silicone-based surfactant (d-1) in the water-based ink is not less than 0.005% by mass and not more than 0.3% by mass;

a content of the organic solvent (C) in the water-based ink is not less than 25% by mass and not more than 50% by mass; and a content of a high-boiling organic solvent having a boiling point of not lower than 250° C. in the water-based ink is not more than 5% by mass.

<2> The water-based ink according to the aspect <1>, wherein the pigment (A) is present in the form of pigment-containing water-insoluble polymer particles in the water-based ink.

<3> The water-based ink according to the aspect <1> or <2>, wherein the water-insoluble polymer (B) is a vinyl-based polymer that contains a constitutional unit derived from (b-1) an ionic monomer and a constitutional unit derived from (b-2) a hydrophobic monomer.

<4> The water-based ink according to the aspect <3>, wherein the water-insoluble polymer (B) further contains a constitutional unit derived from (b-3) a macromonomer.

<5> The water-based ink according to the aspect <3> or <4>, wherein the water-insoluble polymer (B) further contains a constitutional unit derived from (b-4) a nonionic monomer.

<6> The water-based ink according to any one of the aspects <3> to <5>, wherein a content of the constitutional unit derived from the ionic monomer (b-1) in the water-insoluble polymer (B) is preferably not less than 5% by mass, more preferably not less than 8% by mass and even more preferably not less than 10% by mass, and is also preferably not more than 45% by mass, more preferably not more than 35% by mass and even more preferably not more than 30% by mass.

<7> The water-based ink according to any one of the aspects <3> to <6>, wherein a content of the constitutional unit derived from the hydrophobic monomer (b-2) in the water-insoluble polymer (B) is preferably not less than 35% by mass, more preferably not less than 40% by mass and even more preferably not less than 43% by mass, and is also preferably not more than 90% by mass, more preferably not more than 80% by mass and even more preferably not more than 75% by mass.

<8> The water-based ink according to any one of the aspects <1> to <7>, wherein a weight-average molecular weight of the water-insoluble polymer (B) is preferably not less than 5,000, more preferably not less than 10,000 and even more preferably not less than 20,000, and is also preferably not more than 500,000, more preferably not more than 400,000, even more preferably not more than 300,000 and further even more preferably not more than 200,000.

<9> The water-based ink according to any one of the aspects <1> to <8>, wherein a mass ratio of the pigment (A) to the water-insoluble polymer (B) [(A)/(B)] in the pigment mixture is preferably not less than 30/70, more preferably not less than 40/60 and even more preferably not less than 50/50, and is preferably not more than 90/10, more preferably not more than 80/20 and even more preferably not more than 75/25.

<10> The water-based ink according to any one of the aspects <1> to <9>, wherein a viscosity of the glycol ether (c-1) as measured at 20° C. is preferably not less than 2.2 mPa·s, more preferably not less than 2.4 mPa·s and even more preferably not less than 2.6 mPa·s, and is also preferably not more than 6.8 mPa·s, more preferably not more than 6.0 mPa·s and even more preferably not more than 5.5 mPa·s.

<11> The water-based ink according to any one of the aspects <1> to <10>, wherein a vapor pressure of the glycol ether (c-1) as measured at 20° C. is preferably not less than 0.04 hPa, more preferably not less than 0.06 hPa and even more preferably not less than 0.07 hPa, and is also preferably not more than 6.0 hPa, more preferably not more than 5.5 hPa and even more preferably not more than 4.0 hPa.

<12> The water-based ink according to any one of the aspects <1> to <11>, wherein a boiling point of the glycol ether (c-1) is preferably not lower than 130° C., more preferably not lower than 135° C. and even more preferably not lower than 138° C., and is also preferably not higher than 240° C., more preferably not higher than 230° C. and even more preferably not higher than 225° C.

<13> The water-based ink according to any one of the aspects <1> to <12>, wherein the glycol ether (c-1) is at least one compound selected from the group consisting of ethylene glycol isopropyl ether, ethylene glycol propyl ether, diethylene glycol methyl ether, diethylene glycol isopropyl ether and diethylene glycol isobutyl ether.

<14> The water-based ink according to any one of the aspects <1> to <13>, wherein the organic solvent (C) further includes a polyhydric alcohol having a boiling point of not lower than 90° C.

<15> The water-based ink according to the aspect <14>, wherein the polyhydric alcohol having a boiling point of not lower than 90° C. is an alkanediol having not less than 2 and not more than 6 carbon atoms.

<16> The water-based ink according to any one of the aspects <1> to <15>, wherein a content of the glycol ether (c-1) in the organic solvent (C) is preferably not less than 30% by mass, more preferably not less than 35% by mass and even more preferably not less than 45% by mass, and is also preferably not more than 90% by mass, more preferably not more than 80% by mass and even more preferably not more than 70% by mass.

<17> The water-based ink according to any one of the aspects <1> to <16>, wherein the silicone-based surfactant (d-1) is a polyether-modified silicone-based surfactant represented by the following general formula (1):

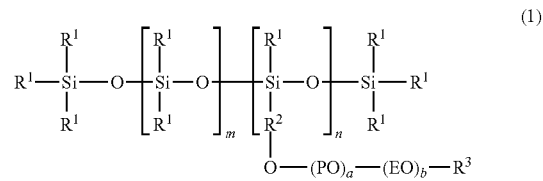

wherein $R^1$ is an alkyl group having 1 to 3 carbon atoms or a hydroxy group; $R^2$ is an alkanediyl group having 2 to 5 carbon atoms; $R^3$ is a hydrogen atom, an alkyl group having 1 to 3 carbon atoms or a hydroxy group; PO is a propyleneoxy group; EO is an ethyleneoxy group; a, b, m and n each represent an average molar number of addition of respective constitutional units in which a is a number of 0 to 10, b is a number of 1 to 50, m is a number of 1 to 500 and n is a number of 1 to 50; and a plurality of the $R^1$ groups may be the same or different from each other.

<18> The water-based ink according to the aspect <17>, wherein in the general formula (1), a, b, m and n satisfy the following formula (2):

$$[a+b]/[m/n]=0.01 \text{ to } 8.00 \quad (2)$$

<19> The water-based ink according to the aspect <18>, wherein the ratio [a+b]/[m/n] is preferably not less than 0.5, more preferably not less than 0.63 and even more preferably not less than 0.7, and is also preferably not more than 7, more preferably not more than 6 and even more preferably not more than 5.

<20> The water-based ink according to any one of the aspects <17> to <19>, wherein a kinematic viscosity of the polyether-modified silicone-based surfactant as measured at 25° C. is preferably not less than 40 mm²/s and more preferably not less than 50 mm²/s, and is also preferably not more than 1000 mm²/s and more preferably not more than 950 mm²/s.

<21> The water-based ink according to any one of the aspects <17> to <20>, wherein a HLB value of the polyether-modified silicone-based surfactant is preferably not less than 2.0, more preferably not less than 2.5 and even more preferably not less than 3.0.

<22> The water-based ink according to any one of the aspects <1> to <21>, wherein the surfactant (D) further includes a nonionic surfactant.

<23> The water-based ink according to any one of the aspects <1> to <22>, wherein a content of the pigment (A) in the water-based ink is preferably not less than 1.0% by mass, more preferably not less than 2.0% by mass and even more preferably not less than 2.5% by mass, and is also preferably not more than 15.0% by mass, more preferably not more than 10.0% by mass, even more preferably not more than 7.0% by mass and further even more preferably not more than 5.0% by mass.

<24> The water-based ink according to any one of the aspects <1> to <23>, wherein a content of the water-insoluble polymer (B) in the water-based ink (a total content of the water-insoluble polymer (B) contained in the pigment-containing polymer particles and the water-insoluble polymer (B) contained in the pigment-free water-insoluble polymer (B) particles in the water-based ink) is preferably not less than 2.0% by mass, more preferably not less than 2.5% by mass, even more preferably not less than 3.0% by mass and further even more preferably not less than 3.5% by mass, and is also preferably not more than 8.0% by mass, more preferably not more than 7.0% by mass, even more preferably not more than 6.0% by mass and further even more preferably not more than 5.0% by mass.

<25> The water-based ink according to any one of the aspects <1> to <24>, wherein a content of the organic solvent (C) in the water-based ink is preferably not less than 26% by mass, more preferably not less than 28% by mass and even more preferably not less than 30% by mass, and is also preferably not more than 45% by mass and more preferably not more than 40% by mass.

<26> The water-based ink according to any one of the aspects <1> to <25>, wherein a content of the glycol ether (c-1) in the water-based ink is preferably not less than 1% by mass, more preferably not less than 2% by mass, even more preferably not less than 4% by mass and further even more preferably not less than 6% by mass, and is also preferably not more than 45% by mass, more preferably not more than 40% by mass, even more preferably not more than 30% by mass and further even more preferably not more than 25% by mass.

<27> The water-based ink according to any one of the aspects <1> to <26>, wherein a content of the surfactant (D) in the water-based ink is preferably not less than 0.1% by mass, more preferably not less than 0.2% by mass and even more preferably not less than 0.5% by mass, and is also preferably not more than 5% by mass, more preferably not more than 4% by mass, even more preferably not more than 3% by mass and further even more preferably not more than 2.5% by mass.

<28> The water-based ink according to any one of the aspects <1> to <27>, wherein a content of the silicone-based surfactant (d-1) in the water-based ink is not less than 0.005% by mass, preferably not less than 0.03% by mass and more preferably not less than 0.04% by mass, and is also preferably not more than 0.3% by mass, more preferably not more than 0.2% by mass, even more preferably not more than 0.15% by mass and further even more preferably not more than 0.12% by mass.

<29> The water-based ink according to any one of the aspects <1> to <28>, wherein a content of the polyether-modified silicone-based surfactant in the water-based ink is preferably not less than 0.01% by mass, more preferably not less than 0.02% by mass and even more preferably not less than 0.03% by mass, and is also preferably not more than 0.5% by mass, more preferably not more than 0.4% by mass, even more preferably not more than 0.2% by mass and further even more preferably not more than 0.1% by mass.

<30> The water-based ink according to any one of the aspects <22> to <24>, wherein a content of the nonionic surfactant (d-2) in the water-based ink is preferably not less than 0.1% by mass, more preferably not less than 0.8% by mass and even more preferably not less than 1.5% by mass, and is also preferably not more than 5% by mass, more preferably not more than 3.5% by mass and even more preferably not more than 2.5% by mass.

<31> An ink set for ink-jet printing including two or more kinds of water-based inks which are each constituted of the water-based ink according to any one of the aspects <1> to <30>.

<32> An ink-jet printing method for printing characters or images on a printing medium using an ink-jet printing apparatus equipped with the ink set for ink-jet printing according to the aspect <31>, said method including the following steps 1 and 2:

Step 1: ejecting the water-based ink according to any one of the aspects <1> to <30> onto the printing medium; and Step 2: further ejecting the water-based ink according to any one of the aspects <1> to <30> onto the printing medium to overstrike the water-based ink onto the water-based ink that has been ejected onto the printing medium in the step 1.

<33> The ink-jet printing method according to the aspect <32>, further including the following step 3:

Step 3: bringing the overstruck water-based inks obtained on the printing medium in the step 2 into contact with a transportation roller.

<34> The ink-jet printing method according to the aspect <32> or <33>, wherein the printing medium has a water absorption of not less than 0 $g/m^2$ and not more than 10 $g/m^2$ and preferably not less than 0 $g/m^2$ and not more than 5 $g/m^2$ as measured in a pure water contact time of 100 milliseconds.

<35> The ink-jet printing method according to any one of the aspect <32> to <34>, wherein a printing speed upon printing characters or images on the printing medium is preferably not less than 20 m/min, more preferably not less than 70 m/min and even more preferably not less than 100 m/min in terms of a transportation speed of the printing medium.

<36> The ink-jet printing method according to any one of the aspect <32> to <35>, wherein a printing speed upon printing characters or images on the printing medium is preferably not more than 200 m/min, more preferably not more than 150 m/min and even more preferably not more than 120 m/min in terms of a transportation speed of the printing medium.

<37> The ink-jet printing method according to any one of the aspects <32> to <36>, wherein a drive frequency of the ink-jet printing apparatus is not less than 10 kHz and not more than 90 kHz.

<38> The ink-jet printing method according to any one of the aspects <32> to <37>, wherein an amount of droplets of the water-based ink ejected is not less than 0.5 pL and not more than 30 pL, as calculated per one droplet of the water-based ink ejected.

<39> The ink-jet printing method according to any one of the aspects <32> to <38>, wherein the printing medium is a roll paper.

<40> A use of the water-based ink according to any one of the aspects <1> to <30> for ink-jet printing.

EXAMPLES

In the following Production Examples, Examples and Comparative Examples, the "part(s)" and "%" indicate "part(s) by mass" and "% by mass", respectively, unless otherwise specified.

(1) Measurement of Weight-Average Molecular Weight of Water-Insoluble Polymer

The weight-average molecular weight of the water-insoluble polymer was measured by gel permeation chromatography [GPC apparatus: "HLC-8120GPC" available from Tosoh Corporation; columns: "TSK-GEL, α-M"×2 available from Tosoh Corporation; flow rate: 1 mL/min)] using N,N-dimethyl formamide in which phosphoric acid and lithium bromide were dissolved in amounts of 60 mmol/L and 50 mmol/L, respectively, as an eluent, and using a monodisperse polystyrene having a known molecular weight as a reference standard substance.

(2) Measurement of Average Particle Sizes of Pigment-Containing Polymer Particles and Water-Insoluble Polymer Particles The particles were subjected to cumulant analysis using a laser particle analyzing system "ELS-8000" available from Otsuka Electrics Co., Ltd., to measure an average particle size thereof. The above measurement was conducted under the conditions including a temperature of 25° C., an angle between incident light and detector of 90° and a cumulative number of 100 times, and a refractive index of water (1.333) was input to the analyzing system as a refractive index of the dispersing medium. The measurement was conducted by adjusting a concentration of the dispersion to be measured to $5 \times 10^{-3}$% by mass in terms of a solid content thereof.

(3) Measurement of Solid Content of Water Dispersion

Sodium sulfate dried to constant weight in a desiccator was weighed and charged in an amount of 10.0 g into a 30 mL polypropylene reaction vessel ((V 40 mm; height: 30 mm), and about 1.0 g of a sample to be measured was added to the reaction vessel. The contents of the reaction vessel were mixed and then accurately weighed. The resulting mixture was maintained in the reaction vessel at 105° C. for 2 hours to remove volatile components therefrom, and further allowed to stand in a desiccator for 15 minutes to measure a mass thereof. The mass of the sample after removing the volatile components therefrom, was regarded as a mass of solids therein. The solid content of the sample was calculated by dividing the mass of the solids by the mass of the sample added.

(4) Static Surface Tension of Water-Based Ink

A platinum plate was dipped in 5 g of the water-based ink filled in a cylindrical polyethylene vessel (3.6 cm in diameter×1.2 cm in depth), and the static surface tension of the water-based ink was measured at 20° C. using a surface tension meter "CBVP-Z" (tradename) available from Kyowa Interface Science Co., Ltd.

(5) Viscosity of Water-Based Ink

The viscosity of the water-based ink was measured at 32° C. using an E-type viscometer "TV-25" (equipped with a standard cone rotor (1° 34'×R24); rotating speed: 50 rpm) available from Toki Sangyo Co., Ltd.

(6) Measurement of pH of Water-Based Ink

The pH value of the water-based ink was measured at 25° C. using a bench-top pH meter "F-71" available from Horiba Ltd., equipped with a pH electrode "6337-10D" available from Horiba Ltd.

(7) Water Absorption of Printing Medium

The water absorption of the printing medium as measured by contacting the printing medium with pure water for 100 milliseconds was determined as follows. That is, using an automatic scanning absorptometer "KM500win" available from Kumagai Riki Kogyo Co., Ltd., an amount of pure water transferred to the printing medium when allowing the printing medium to contact with pure water at 23° C. under a relative humidity of 50% RH for 100 milliseconds was measured. The thus measured amount of pure water transferred to the printing medium was determined as the water absorption of the printing medium as measured in a pure water contact time of 100 milliseconds. The measuring conditions are as follows.

"Spiral Method"
Contact time: 0.010 to 1.0 (sec)
Pitch (mm): 7
Length Per Sampling (degree): 86.29
Start Radius (mm): 20
End Radius (mm): 60
Min Contact Time (ms): 10
Max Contact Time (ms): 1000
Sampling Pattern (1-50): 50
Number of Sampling Points (>0): 19
"Square Head"
Split Span (mm): 1
Split Width (mm): 5

Production Example 1 (Production of Water Dispersion of Pigment-Containing Polymer Particles)

(1) Synthesis of Water-Insoluble Polymer

Sixteen (16) parts of methacrylic acid available from Wako Pure Chemical Industries, Ltd., 44 parts of styrene available from Wako Pure Chemical Industries, Ltd., 30 parts of a styrene macromonomer "AS-6S" (number-average molecular weight: 6,000; solid content: 50%) available from Toagosei Co., Ltd., and 25 parts of methoxypolyethylene glycol methacrylate "BLEMMER PME-200" available from NOF Corporation were mixed with each other to prepare 115 parts of a monomer mixture solution.

Eighteen (18) parts of methyl ethyl ketone and 0.03 part of 2-mercaptoethanol as a chain transfer agent as well as 10% (11.5 parts) of the monomer mixture solution prepared above were charged into a reaction vessel and mixed with each other, and then an inside atmosphere of the reaction vessel was fully replaced with a nitrogen gas.

Separately, a mixed solution prepared by mixing remaining 90% (103.5 parts) of the monomer mixture solution, 0.27 part of the aforementioned chain transfer agent, 42 parts of methyl ethyl ketone and 3 parts of 2,2'-azobis(2,4-dimethylvaleronitrile) "V-65" as a polymerization initiator available from Wako Pure Chemical Industries, Ltd., was charged into a dropping funnel. In a nitrogen atmosphere, the mixed solution in the reaction vessel was heated to 75° C. while stirring, and then the mixed solution in the dropping funnel was added dropwise thereinto over 3 hours. After the elapse of 2 hours from completion of the dropwise addition while maintaining the resulting mixed solution at a temperature of 75° C., a solution prepared by dissolving 3 parts of the aforementioned polymerization initiator in 5 parts of methyl ethyl ketone was added to the mixed solution, and the resulting reaction solution was further aged at 75° C. for 2 hours and at 80° C. for 2 hours, followed by further adding 50 parts of methyl ethyl ketone thereto, thereby obtaining a solution of a water-insoluble polymer (having a weight-average molecular weight of 50,000). The solid content of the thus obtained water-insoluble polymer solution was 45% by mass.

(2) Production of Water Dispersion of Chromatic Color Pigment-Containing Polymer Particles Added into a solution prepared by dissolving 95.2 parts of the water-insoluble polymer solution obtained in the above (1) in 53.7 parts of methyl ethyl ketone were 13.7 parts of a 5N sodium hydroxide aqueous solution and 0.5 part of a 25% ammonia aqueous solution both acting as a neutralizing agent as well as 341.8 parts of ion-exchanged water. Then, 100 parts of "C.I. Pigment Yellow 74 (P.Y. 74)" as a yellow pigment available from Dainichiseika Color & Chemicals Mfg. Co., Ltd., was further added to the resulting mixture to prepare a pigment mixed solution. The degree of neutralization of the thus prepared pigment mixed solution was 72 mol %. The pigment mixed solution was mixed at 20° C. for 1 hour using a disper blade operated at 7000 rpm. The resulting dispersion was dispersed under a pressure of 180

MPa using a Microfluidizer "High-Pressure Homogenizer M-140K" available from Microfluidics Corporation by passing the dispersion through the device 15 times.

The thus obtained dispersion of the pigment-containing polymer particles was held at 60° C. under reduced pressure to remove methyl ethyl ketone therefrom, followed by further removing a part of water therefrom. The resulting dispersion was subjected to centrifugal separation, and a liquid layer portion separated therefrom was filtered through a filter "Minisart Syringe Filter" (pore diameter: 5 μm; material: cellulose acetate) available from Sartorius Inc., to remove coarse particles therefrom, thereby obtaining a water dispersion of pigment-containing polymer particles. The solid content of the thus obtained water dispersion was 25% by mass. Then, 0.54 part of "DENACOL EX 321L" available from Nagase ChemteX Corporation and 15.55 parts of ion-exchanged water were added to 100 parts of the resulting water dispersion of the pigment-containing polymer particles, and the resulting mixture was subjected to heat treatment at 70° C. for 3 hours while stirring (solid content: 22% by mass). After cooling the mixture to room temperature, a liquid layer portion separated therefrom was filtered through a filter "Minisart Syringe Filter" (pore diameter: 5 μm; material: cellulose acetate) available from Sartorius Inc., to remove coarse particles therefrom, thereby obtaining a water dispersion of pigment-containing polymer particles. The average particle size of the pigment-containing polymer particles was 115 nm.

(3) Production of Water Dispersion of Black Pigment-Containing Polymer Particles Added into a solution prepared by dissolving 95.2 parts of the water-insoluble polymer solution obtained in the above (1) in 53.9 parts of methyl ethyl ketone were 15.0 parts of a 5N sodium hydroxide aqueous solution and 0.5 part of a 25% ammonia aqueous solution both acting as a neutralizing agent as well as 341.3 parts of ion-exchanged water. Then, 100 parts of "C.I. Pigment Black 7 (P.B. 7)" as a carbon black pigment available from Cabot Corporation was further added to the resulting mixture to prepare a pigment mixed solution. The degree of neutralization of the thus prepared pigment mixed solution was 78.8 mol %. The pigment mixed solution was mixed at 20° C. for 1 hour using a disper blade operated at 7000 rpm. The resulting dispersion was dispersed under a pressure of 180 MPa using a Microfluidizer "High-Pressure Homogenizer M-140K" available from Microfluidics Corporation by passing the dispersion through the device 15 times.

The thus obtained dispersion of the pigment-containing polymer particles was held at 60° C. under reduced pressure to remove methyl ethyl ketone therefrom, followed by further removing a part of water therefrom. The resulting dispersion was subjected to centrifugal separation, and a liquid layer portion separated therefrom was filtered through a filter "Minisart Syringe Filter" (pore diameter: 5 μm; material: cellulose acetate) available from Sartorius Inc., to remove coarse particles therefrom, thereby obtaining a water dispersion of pigment-containing polymer particles. The solid content of the thus obtained water dispersion was 25% by mass. Then, 0.45 part of "DENACOL EX 321L" available from Nagase ChemteX Corporation and 15.23 parts of ion-exchanged water were added to 100 parts of the resulting water dispersion of the pigment-containing polymer particles, and the resulting mixture was subjected to heat treatment at 70° C. for 3 hours while stirring (solid content: 22% by mass). After cooling the mixture to room temperature, a liquid layer portion separated therefrom was filtered through a filter "Minisart Syringe Filter" (pore diameter: 5 μm; material: cellulose acetate) available from Sartorius Inc., to remove coarse particles therefrom, thereby obtaining a water dispersion of pigment-containing polymer particles. The average particle size of the pigment-containing polymer particles was 100 nm.

In addition, the same procedure as in Production Example 1(2) was repeated except for using a magenta pigment and a cyan pigment, respectively, in place of the yellow pigment to thereby produce water dispersions of polymer particles containing the magenta pigment and the cyan pigment, respectively. The results are shown in Table 4.

The details of the pigments (A) shown in Table 4 are as follows.

<Pigment (A)>

Y: Yellow pigment "P.Y. 74" available from Dainichiseika Color & Chemicals Mfg. Co., Ltd.

M: Magenta pigment "P.R. 122" available from Dainichiseika Color & Chemicals Mfg. Co., Ltd.

C: Cyan pigment "P.B. 15:3" available from DIC Corporation

B: Carbon black pigment "P.B. 7" available from Cabot Corporation

TABLE 1

| | Symbol | Y | M | C | B |
|---|---|---|---|---|---|
| Pigment-containing particles | Kind of pigment | Yellow P.Y.74 | Magenta P.R.122 | Cyan P.B.15:3 | Black P.B.7 |
| | Solid content (%) | 22.00 | 22.00 | 22.00 | 22.00 |
| | Introduction rate of pigment (%) | 68.52 | 68.52 | 68.52 | 68.76 |
| Composition | Pigment | 15.08 | 15.08 | 15.08 | 15.13 |
| | Dispersing polymer | 6.46 | 6.46 | 6.46 | 6.48 |
| | DENACOL EX 321L | 0.46 | 0.46 | 0.46 | 0.39 |
| | Ion-exchanged water | 78.00 | 78.00 | 78.00 | 78.00 |
| | Total | 100.00 | 100.00 | 100.00 | 100.00 |
| Properties | Viscosity (mPa · s) | 4 | 4.2 | 3.9 | 4.2 |
| | Surface tension (mN/m) | 42 | 42 | 42 | 42 |
| | pH | 9.9 | 9.8 | 9.8 | 9.9 |
| | Average particle size (nm) | 115 | 110 | 100 | 100 |

Production Example 2 (Production of Water Dispersion of Pigment-Free Water-Insoluble Polymer Particles)

A 1000 mL separable flask was charged with 145 parts of methyl methacrylate available from Wako Pure Chemical Industries, Ltd., 50 parts of 2-ethylhexyl acrylate available from Wako Pure Chemical Industries, Ltd., 5 parts of methacrylic acid available from Wako Pure Chemical Industries, Ltd., 18.5 parts of "LATEMUL E118B" (emulsifier; active ingredient content: 26%) available from Kao Corporation, 96 parts of ion-exchanged water and potassium persulfate available from Wako Pure Chemical Industries, Ltd., and the content of the flask were stirred using a agitation blade (300 rpm), thereby obtaining a monomer emulsion.

A reaction vessel was charged with 4.6 parts of "LATEMUL E118B", 186 parts of ion-exchanged water and 0.08 part of potassium persulfate, and an inside atmosphere of the reaction vessel was fully replaced with a nitrogen gas. In a nitrogen atmosphere, the contents of the reaction vessel were heated to 80° C. while stirring with an agitation blade (200 rpm), and then the aforementioned monomer emulsion was charged into a dropping funnel and added dropwise into the reaction vessel over 3 hours to allow the emulsion to react with the contents of the reaction vessel. Ion-exchanged water was added to the resulting reaction solution to adjust a content of the active ingredient in the reaction solution to 20%, thereby obtaining a water dispersion of the water-insoluble polymer particles. The average particle size of the water-insoluble polymer particles was 100 nm.

Example 1 (Production of Water-Based Ink and Ink Set)

A mixture containing 26.54 parts of the water dispersion of the pigment-containing polymer particles (solid content: 22% by mass; pigment: 4.0 parts; water-insoluble polymer: 1.84 parts) obtained in Production Example 1, 9.27 parts of the water dispersion of the water-insoluble polymer particles (solid content: 20% by mass; water-insoluble polymer: 1.85 parts) obtained in Production Example 2, 10.0 parts of ethylene glycol isopropyl ether (iPG), 25.0 parts of propylene glycol, 1.0 part of polypropylene glycol (molecular weight: 700; PPG), 0.05 part of a silicone-based surfactant "SILFACE SAG 005" available from Nissin Chemical Industry Co., Ltd., 1.20 parts of a polyoxyethylene lauryl ether "EMULGEN 120" available from Kao Corporation and 1.20 parts of an acetylene glycol "SURFYNOL 104PG50 (5-104PG50)" (a 50% propylene glycol solution) available from Nissin Chemical Industry Co., Ltd., both serving as a nonionic surfactant, and 0.5 part of a neutralizing agent (1N—NaOH) was mixed with ion-exchanged water to adjust a total volume of the resulting mixed solution to 100 parts. The thus obtained mixed solution was filtered through a filter "Minisart Syringe Filter" (pore diameter: 1.2 μm; material: cellulose acetate) available from Sartorius Inc., to thereby obtain a water-based ink having a pH value of 9.5.

In addition, the same procedure as in Production Example 1 was repeated except that the pigment used in the water dispersion of the pigment-containing polymer particles produced in Production Example 1 was replaced with a magenta pigment, a cyan pigment and a carbon black pigment, respectively, thereby producing various water dispersions of pigment-containing polymer particles. Furthermore, the same procedure as described above was conducted under the conditions shown in Table 4 except for using the thus produced respective water dispersions of the pigment-containing polymer particles to thereby produce water-based inks and an ink set. The results are shown in Table 4.

Examples 2 to 24 and Comparative Examples 1 to 7 (Production of Water-Based Inks and Ink Sets)

The same procedure as in Example 1 was repeated except that the ink composition was replaced with those shown in Tables 4 to 9, thereby obtaining water-based inks. The results are shown in Tables 4 to 9. Example 4 and Example 21 were conducted as Reference Examples.

Meanwhile, the details of the organic solvents (C) shown in Tables 4 to 9 are shown in Table 2.

TABLE 2

| | Abbreviation | Viscosity (cP) | Vapor pressure (hPa) | Boiling point (° C.) |
|---|---|---|---|---|
| Glycol ether (c-1) | | | | |
| Ethylene glycol isopropyl ether | iPG | 2.8 | 3.10 | 142 |
| Diethylene glycol isopropyl ether | iPDG | 4.9 | 0.07 | 207 |
| Diethylene glycol isobutyl ether | iBDG | 5.2 | 0.01 | 220 |
| Diethylene glycol butyl ether | BDG | 6.5 | 0.01 | 231 |
| Glycol ether (c-2) other than (c-1) | | | | |
| Triethylene glycol butyl ether | BTG | 8.20 | <0.01 | 274 |
| Dipropylene glycol methyl ether | DPGME | 1.90 | 8.90 | 121 |
| Polyhydric alcohols (c-2) | | | | |
| Propylene glycol | PG | 56.0 | 0.11 | 188 |
| Diethylene glycol | DEG | 36.0 | 0.03 | 245 |
| Polypropylene glycol (molecular weight: 700) | PPG | 128.1 | <0.01 | >250 |
| 1,2-Hexanediol | 1,2-HD | 80.0 | 0.03 | 223 |
| Glycerin | Gly | >1000 | <0.01 | 290 |

In addition, the details of the surfactants (D) shown in Tables 4 to 9 are as follows.
(Silicone-Based Surfactants Used in Examples)
SAG005: "SILFACE SAG 005" available from Nissin Chemical Industry Co., Ltd.
KF-353: "KF-353" available from Shin-Etsu Chemical Industry Co., Ltd.
KF-355A: "KF-355A" available from Shin-Etsu Chemical Industry Co., Ltd.
KF-642: "KF-642" available from Shin-Etsu Chemical Industry Co., Ltd.
FZ-2191: "FZ-2191" available from NUC Corporation
BYK-348: "BYK-348" available from BYK Chemie Japan K.K.
KF-351A: "KF-351A" available from Shin-Etsu Chemical Industry Co., Ltd.
KF-6020: "KF-6020" available from Shin-Etsu Chemical Industry Co., Ltd.
Examples of calculation of the ratio [a+b]/[m/n] of the respective surfactants by NMR measuring method as well as results thereof are shown in Table 3.
(Other Surfactants)
"EMULGEN 120": Polyoxyethylene lauryl ether available from Kao Corporation
S-104PG50: Acetylene-based nonionic surfactant "SURFYNOL 104PG50" (a propylene glycol solution of 2,4,7,9-tetramethyl-5-decyne-4,7-diol; active ingredient content: 50%) available from Nissin Chemical Industry Co., Ltd.
<NMR Measurement of Silicone-Based Surfactant>
<Conditions of $^1$H-NMR Measurement>
One hundred milligrams (100 mg) of a sample to be measured were diluted with 2.0 mL of trimethylsilyl-free heavy chloroform "Chloroform-dl for NMR" (deuteration ratio: 99.8%) available from Kanto Chemical Co., Inc., and the thus obtained dilute solution was subjected to NMR measurement using a tube for $^1$H-NMR having a diameter of 5.0 mm by means of "Agilent-NMR-vnmrs400" (400 MHz) available from Varian Inc., under the measuring conditions of pulse width: 45 μs (45° pulse); swatch width: 6410 Hz; wait time: 10 seconds; cumulative number: 8; measuring temperature: room temperature.

The results of the $^1$H-NMR measurement for the silicone are as follows.

$^1$H-NMR (CDCl$_3$, 400 MHz); δ (ppm): 0-0.5 (67H, m), 0.50 (2H, m), 1.15 (17H, m), 1.55 (21-1, m), 3.30-3.80 (92H, m)

Meanwhile, assignments of the respective chemical shift values in the NMR measurement are as follows.

δ (ppm): 0-0.5; protons (H) of methyl group (CH$_3$) directly bonded to Si element δ (ppm): 0.3-0.6; protons (H) of methylene group (CH$_2$) directly bonded to Si element δ (ppm): 1.0-1.2; protons (H) of methyl group (CH$_3$) of propyleneoxy group (PO)

δ (ppm): 1.5-1.7; protons (H) of methylene group (CH$_2$) directly bonded to (Si—CH$_2$)

δ (ppm): 3.0-3.8; protons (H) of methylene group (CH$_2$) of ethyleneoxy group (EO), protons (H) of (CH$_2$, CH) of PO, and protons (H) directly bonded to oxygen element of EO or PO <Calculation of [a+b]/[m/n]>

The method for calculation of [a+b]/[m/n] is explained below by referring to an exemplary case where "SILFACE SAG 005" available from Nissin Chemical Industry Co., Ltd., was used as the silicone-based surfactant.

The peak area value of δ (ppm): 0.3-0.6 was set to 2 (2H: fixed value). As a result, since the ratio of an EO- or PO-modified Si element in a molecule of the surfactant to be measured became 1, the aforementioned value was used to determine the ratio [m/n] between the modified and unmodified Si elements.

(1) Calculation of m/n

The value (area value 3) of protons of a methyl group (CH$_3$) directly bonded to EO- or PO-modified Si element is subtracted from the peak area value of δ (ppm): 0-0.5, and further the obtained value is divided by the value (area value 6) of protons of the two methyl groups (CH$_3$) directly bonded to EO- or PO-unmodified Si element to thereby determine the ratio [m/n] between the modified and unmodified Si elements.

$m/n$={[peak area value of 0-0.5]−[methyl group 3H directly bonded to modified Si element]}÷[methyl group 6H directly bonded to unmodified Si element]=(67−3)÷6=10.67

(2) Calculation of a (Average Molar Number of Addition of PO in Molecule)

The average molar number a of addition of PO is calculated by dividing the peak area value of δ=1.0-1.2 by the value of 3H of the methyl group (CH$_3$) of PO.

$a$=[peak area value of 1.0-1.2]÷[methyl group (3H) of PO chain]=17÷3=5.67

(3) Calculation of b (Average Molar Number of Addition of EO in Molecule)

The peak area value of δ=3.0-3.8 is a total peak area value of a methylene group (CH$_2$/2H) directly bonded to oxygen element of EO or PO, hydrogen of (CH, CH$_2$) of PO (3H×average molar number of addition of PO) and EO (CH$_2$—CH$_2$/4H×average molar number of addition EO).

$b$={[peak area value of δ=3.0-3.8]−[hydrogen(3H) of (CH,CH$_2$) of PO×$a$]−[methylene group(CH$_2$/ 2H)directly bonded to oxygen element of EO or PO]}÷[hydrogen(4H) of EO(CH$_2$—CH$_2$)]=(92−3×(5.67)−2)÷4=18.25

From the values of a, b and [m/n] obtained above, the value of [a+b]/[m/n] of "SILFACE SAG 005" was calculated to be 2.24 as follows.

[a+b]/[m/n]=(18.25+5.67)/10.67=2.24

In the case where the other silicone-based surfactants were used, the value of [a+b]/[m/n] thereof was calculated in the same method as described above. The results are shown together with the kinematic viscosity and HLB values in Table 3.

TABLE 3

| Silicone-based surfactant | Kinematic viscosity (mm$^2$/s) | HLB (—) | [a + b] | [m/n] | [a + b]/[m/n] |
|---|---|---|---|---|---|
| SAG-005 | 170 | 7 | 23.92 | 10.67 | 2.24 |
| KF-353 | 430 | 10 | 11.56 | 7.83 | 1.48 |
| KF-642 | 50 | 12 | 14.97 | 4.56 | 3.28 |
| KF-355A | 150 | 12 | 16.40 | 3.02 | 5.43 |
| FZ-2191 | 900 | 5 | 11.37 | 15.30 | 0.74 |
| BYK-348 | — | — | 11.97 | 2.88 | 4.16 |
| KF-351A | 70 | 12 | 23.91 | 2.84 | 8.42 |
| KF-6020 | 180 | 4 | 11.47 | 25.90 | 0.44 |

Using the ink set constituted of the water-based inks obtained above, the ink-jet printed materials were produced in the following manner, and evaluated for their continuous ejection properties, roller transfer contamination and inter-color bleeding by the following methods. The results are shown in Tables 4 to 9.

<Preparation and Evaluation Tests of Ink-Jet Printed Materials)

The ink set constituted of the water-based inks produced in the respective Production Examples was loaded to a roll paper printing test apparatus available from Kyocera Corporation equipped with an ink-jet line print head "KJ4B-HDO6MHG-STDV" available from Kyocera Corporation under the environmental conditions of a temperature of 25±1° C. and a relative humidity of 25° C.±5% to conduct printing.

As a roll paper, there was used a coated paper "OK Topcoat" (water absorption: 4.9 g/m$^2$) available from Oji Paper Co., Ltd., which was cut into 150 mm in width, and printing was conducted on the roll paper under the following printing conditions to evaluate various properties.

The printing test apparatus was equipped with a heating dryer for drying the resulting printed materials immediately after being printed, and the surface of the respective printed materials was dried under the following heating and drying conditions.

(Printing Conditions)
Transporting mechanism: roll to roll
Line head temperature: 32° C.
Head resolution: 1200 dpi (available from Kyocera Corporation)
Number of ejection heads: 4 heads (equipped with one head per one color)
Amount of droplets of ink ejected: 2 pL
Drive frequency: 60 kHz Applied voltage: 26 V
Negative pressure: −4.0 kPa Head gap: 350 mm
Maximum transportation speed: 200 m/min Evaluation printing speed: 25 m/min
Roll paper tension upon transportation: 60 N (Heating and Drying Conditions)

Heating method: air-cooling short wave infrared heater "NIR120" available from AdPhos GmbH Heating length: 200 mm Output: 1500 W/230 V Temperature of surface of printing paper upon operation: 100 to 120° C.

<Evaluation of Continuous Ejection Properties>

Using the aforementioned roll paper printing test apparatus, solid image printing with 100% Duty (printing area ratio) was continuously carried out on 5000 m of a printing paper, and then a nozzle check pattern was printed to evaluate the number of missing nozzles.

(Evaluation Ratings)

5: No missing nozzles were present;
4: Number of missing nozzles was from 1 to 3;
3: Number of missing nozzles was from 4 to 10;
2: Number of missing nozzles was from 11 to 20; and
1: Number of missing nozzles was not less than 21.

The term "missing nozzle" as used herein means such a phenomenon that white streaks are formed on the nozzle check pattern owing to failure of ejecting the ink from the nozzle. When an average value of the evaluation rating scores of four nozzles is not less than "3.5", the water-based inks and ink sets tested can be suitably used in the practical applications.

<Evaluation of Roller Transfer Contamination>

Transfer contamination on a surface of a stainless steel metal transportation roller disposed on the roll paper printing test apparatus was evaluated according to the following evaluation ratings. Specifically, within one second after conducting the solid image printing (1C) with a cyan ink on a printing medium, the solid image printing (2C) with a magenta ink was conducted on a portion of the printing medium where the cyan ink solid image was formed. In the respective solid image printing operations, the monochrome duty of each solid image printing was varied from 50% to 100% every printing region. Furthermore, the two-color combination of the cyan ink and the magenta ink was repladed with each of a two-color combination of the cyan ink and a yellow ink and a two-color combination of the magenta ink and the yellow ink to conduct the same solid image printing operation as described above for each combination. The worst value of the evaluation results among those obtained from the solid image printing operations using the different three combinations of the inks was regarded as the evaluation value of the roller transfer contamination.

In addition, within one second after conducting the solid image printing (1C) with a cyan ink on a printing medium, the solid image printing (2C) with a magenta ink was conducted on a portion of the printing medium where the cyan ink solid image was formed. Furthermore, within one second after the solid image printing (2C), the solid image printing (3C) with a yellow ink was conducted on a portion of the printing medium where the magenta ink solid image was formed. In the respective solid image printing operations, the monochrome duty of each solid image was varied from 50% to 100% every printing region.

(Evaluation Ratings of Roller Transfer (2C))

5: Printing with a duty of 180% (monochrome 90%×2 colors) was free of transfer contamination of a transportation roller from the printed portion.

4: Printing with a duty of 160% (monochrome 80%×2 colors) was free of transfer contamination of a transportation roller from the printed portion, but printing with a duty of 180% (monochrome 90%×2 colors) suffered from transfer contamination of a transportation roller from the printed portion.

3: Printing with a duty of 140% (monochrome 70%×2 colors) was free of transfer contamination of a transportation roller from the printed portion, but printing with a duty of 160% (monochrome 80%×2 colors) suffered from transfer contamination of a transportation roller from the printed portion.

2: Printing with a duty of 120% (monochrome 60%×2 colors) was free of transfer contamination of a transportation roller from the printed portion, but printing with a duty of 140% (monochrome 70%×2 colors) suffered from transfer contamination of a transportation roller from the printed portion.

1: Printing with a duty of 120% (monochrome 60%×2 colors) suffered from transfer contamination of a transportation roller from the printed portion.

Meanwhile, the 2 colors as described above mean each of a combination of the yellow ink and the cyan ink, a combination of the yellow ink and the magenta ink and a combination of the magenta ink and the cyan ink.

The evaluation rating "4" or "5" indicates that the water-based inks and ink set can be suitably used in practical applications.

(Evaluation Ratings of Roller Transfer (3C))

10: Printing with a duty of 270% (monochrome 90%×3 colors) was free of transfer contamination of a transportation roller from the printed portion.

9: Printing with a duty of 255% (monochrome 85%×3 colors) was free of transfer contamination of a transportation roller from the printed portion, but printing with a duty of 270% (monochrome 90%×3 colors) suffered from transfer contamination of a transportation roller from the printed portion.

8: Printing with a duty of 240% (monochrome 80%×3 colors) was free of transfer contamination of a transportation roller from the printed portion, but printing with a duty of 255% (monochrome 85%×3 colors) suffered from transfer contamination of a transportation roller from the printed portion.

7: Printing with a duty of 225% (monochrome 75%×3 colors) was free of transfer contamination of a transportation roller from the printed portion, but printing with a duty of 240% (monochrome 80%×3 colors) suffered from transfer contamination of a transportation roller from the printed portion.

6: Printing with a duty of 210% (monochrome 70%×3 colors) was free of transfer contamination of a transportation roller from the printed portion, but printing with a duty of 225% (monochrome 75%×3 colors) suffered from transfer contamination of a transportation roller from the printed portion.

5: Printing with a duty of 195% (monochrome 65%×3 colors) was free of transfer contamination of a transportation roller from the printed portion, but printing with a duty of 210% (monochrome 70%×3 colors) suffered from transfer contamination of a transportation roller from the printed portion.

4: Printing with a duty of 180% (monochrome 60%×3 colors) was free of transfer contamination of a transportation roller from the printed portion, but printing with a duty of 195% (monochrome 65%×3 colors) suffered from transfer contamination of a transportation roller from the printed portion.

3: Printing with a duty of 165% (monochrome 55%×3 colors) was free of transfer contamination of a transportation roller from the printed portion, but printing with a duty of 180% (monochrome 60%×3 colors) suffered from transfer contamination of a transportation roller from the printed portion.

2: Printing with a duty of 150% (monochrome 50%×3 colors) was free of transfer contamination of a transportation roller from the printed portion, but printing with a duty of 165% (monochrome 55%×3 colors) suffered from transfer contamination of a transportation roller from the printed portion.

1: Printing with a duty of 150% (monochrome 50%×3 colors) suffered from transfer contamination of a transportation roller from the printed portion.

Meanwhile, the 3 colors as described above mean the yellow ink, the magenta ink and the cyan ink.

The evaluation rating "5", "6", "7", "8", "9" or "10" indicates that the water-based inks and ink set can be suitably used in practical applications.

<Evaluation of Intercolor Bleeding>

A character "a" was printed on a printing medium using a black ink, and then within one second after printing the character "a", 100% duty solid image printing (1C) with a cyan ink was conducted on the printing medium. Successively, within one second after conducting the 100% duty solid image printing (1C) with the cyan ink, 100% duty solid image printing (2C; 200% duty in total) with a magenta ink was conducted on the portion of the printing medium where the solid image was printed using the cyan ink. Furthermore, within one second after the solid image printing (2C), printing was conducted to examine whether or not the character "a" printed was clearly recognized, thereby evaluating intercolor bleeding of the inks and ink set according to the following evaluation ratings. The two-color combination of the cyan ink and the magenta ink was replaced with each of a two-color combination of the cyan ink and a yellow ink and a two-color combination of the magenta ink and the yellow ink to conduct the same printing and evaluation procedures as described above for each combination. The worst value of the evaluation results among those obtained using the three different combinations of the inks was regarded as the evaluation value of intercolor bleeding of the water-based inks and ink set.

(Evaluation Ratings)

5: 200% Duty portion of the solid image printing (2C) was free of bleeding of the black ink, and the character was readable.

4: 200% Duty portion of the solid image printing (2C) suffered from slight bleeding of the black ink, but the character was still readable.

3: 200% Duty portion of the solid image printing (2C) suffered from bleeding of the black ink and the character printed was deteriorated in printing quality, but the character was still readable.

2: 200% Duty portion of the solid image printing (2C) suffered from bleeding of the black ink, and the character printed was considerably deteriorated in printing quality, but the character was still readable.

1: 200% Duty portion of the solid image printing (2C) suffered from severe bleeding to such an extent that the character printed was no longer readable.

TABLE 4

| | | | Ink set 1 (Example 1) | | | | Ink set 2 (Example 2) | |
|---|---|---|---|---|---|---|---|---|
| | | | Y | M | C | B | Y | M |
| Ink composition (%) | Pigment-containing polymer particles (A) | Pigment | 4.00 | 5.60 | 4.00 | 5.00 | 4.00 | 5.60 |
| | | Polymer (B) | 1.84 | 2.57 | 1.84 | 2.28 | 1.84 | 2.57 |
| | | Subtotal | 5.84 | 8.17 | 5.84 | 7.28 | 5.84 | 8.17 |
| | Water-insoluble polymer (B) particles | | 1.85 | 1.85 | 1.85 | 1.85 | 1.85 | 1.85 |
| | Organic solvent (c-1) | iPG | 10.00 | 10.00 | 10.00 | 10.00 | — | — |
| | | iPDG | — | — | — | — | 10.00 | 10.00 |
| | | iBDG | — | — | — | — | — | — |
| | | BDG | — | — | — | — | — | — |
| | | Subtotal | 10.00 | 10.00 | 10.00 | 10.00 | 10.00 | 10.00 |
| | Organic solvent (c-2) | PG | 25.00 | 20.00 | 25.00 | 20.00 | 25.00 | 20.00 |
| | | PPG | 1.00 | 1.00 | 1.00 | 1.00 | 1.00 | 1.00 |
| | | Subtotal | 26.00 | 21.00 | 26.00 | 21.00 | 26.00 | 21.00 |
| | Silicone-based surfactant (d-1) | SAG-005 | 0.05 | 0.05 | 0.05 | 0.05 | 0.05 | 0.05 |
| | | Subtotal | 0.05 | 0.05 | 0.05 | 0.05 | 0.05 | 0.05 |
| | | [a + b]/[m/n] | 2.24 | 2.24 | 2.24 | 2.24 | 2.24 | 2.24 |
| | Nonionic surfactant (d-2) | EMULGEN 120 | 1.20 | 1.20 | 1.20 | 1.20 | 1.20 | 1.20 |
| | | S-104PG50 | 0.80 | 0.80 | 0.80 | 0.80 | 0.80 | 0.80 |
| | | Subtotal | 2.00 | 2.00 | 2.00 | 2.00 | 2.00 | 2.00 |
| | Neutralizing agent | 1N-NaOH | 0.50 | 0.50 | 0.50 | 0.50 | 0.50 | 0.50 |
| | Water | | 53.76 | 56.43 | 53.76 | 57.32 | 53.76 | 56.43 |
| | Total | | 100 | 100 | 100 | 100 | 100 | 100 |
| Properties | Static surface tension (mN/m, 20° C.) | | 29 | 29 | 29 | 29 | 29 | 29 |
| | Viscosity (mPa · s, 32° C.) | | 6.2 | 6.3 | 6.2 | 6.3 | 6.3 | 6.4 |
| | Average particle size of polymer particles (A) (nm) | | 120 | 110 | 100 | 100 | 120 | 114 |
| Evaluation results | Continuous ejection properties | | 5 | 5 | 5 | 5 | 5 | 5 |
| | Roller transfer properties (2C) | | 5 | | | | 5 | |
| | Roller transfer properties (3C) | | 10 | | | | 9 | |
| | Intercolor bleeding | | 5 | | | | 5 | |

TABLE 4-continued

|  |  |  | Ink set 2 (Example 2) | | | Ink set 3 (Example 3) | | | |
|---|---|---|---|---|---|---|---|---|---|
|  |  |  | C | B | Y | M | C | B |
| Ink composition (%) | Pigment-containing polymer particles | Pigment | 4.00 | 5.00 | 4.00 | 5.60 | 4.00 | 5.00 |
|  |  | Polymer (B) | 1.84 | 2.28 | 1.84 | 2.57 | 1.84 | 2.28 |
|  | (A) | Subtotal | 5.84 | 7.28 | 5.84 | 8.17 | 5.84 | 7.28 |
|  | Water-insoluble polymer (B) particles |  | 1.85 | 1.85 | 1.85 | 1.85 | 1.85 | 1.85 |
|  | Organic solvent (c-1) | iPG | — | — | — | — | — | — |
|  |  | iPDG | 10.00 | 10.00 | — | — | — | — |
|  |  | iBDG | — | — | 10.00 | 10.00 | 10.00 | 10.00 |
|  |  | BDG | — | — | — | — | — | — |
|  |  | Subtotal | 10.00 | 10.00 | 10.00 | 10.00 | 10.00 | 10.00 |
|  | Organic solvent (c-2) | PG | 25.00 | 20.00 | 22.00 | 19.00 | 23.00 | 19.00 |
|  |  | PPG | 1.00 | 1.00 | 1.00 | 1.00 | 1.00 | 1.00 |
|  |  | Subtotal | 26.00 | 21.00 | 23.00 | 20.00 | 24.00 | 20.00 |
|  | Silicone-based surfactant (d-1) | SAG-005 | 0.05 | 0.05 | 0.05 | 0.05 | 0.05 | 0.05 |
|  |  | Subtotal | 0.05 | 0.05 | 0.05 | 0.05 | 0.05 | 0.05 |
|  |  | [a + b]/[m/n] | 2.24 | 2.24 | 2.24 | 2.24 | 2.24 | 2.24 |
|  | Nonionic surfactant (d-2) | EMULGEN 120 | 1.20 | 1.20 | 1.20 | 1.20 | 1.20 | 1.20 |
|  |  | S-104PG50 | 0.80 | 0.80 | 0.80 | 0.80 | 0.80 | 0.80 |
|  |  | Subtotal | 2.00 | 2.00 | 2.00 | 2.00 | 2.00 | 2.00 |
|  | Neutralizing agent | 1N-NaOH | 0.50 | 0.50 | 0.50 | 0.50 | 0.50 | 0.50 |
|  | Water |  | 53.76 | 57.32 | 56.76 | 57.43 | 55.76 | 58.32 |
|  | Total |  | 100 | 100 | 100 | 100 | 100 | 100 |
| Properties | Static surface tension (mN/m, 20° C.) |  | 29 | 29 | 29 | 29 | 29 | 29 |
|  | Viscosity (mPa · s, 32° C.) |  | 6.2 | 6.3 | 6.5 | 6.4 | 6.3 | 6.3 |
|  | Average particle size of polymer particles (A) (nm) |  | 101 | 99 | 119 | 112 | 100 | 100 |
| Evaluation results | Continuous ejection properties |  | 5 | 5 | 5 | 4 | 5 | 5 |
|  | Roller transfer properties (2C) |  | 5 | | | 5 | | |
|  | Roller transfer properties (3C) |  | 9 | | | 8 | | |
|  | Intercolor bleeding |  | 5 | | | 5 | | |

|  |  |  | Ink set 4 (Example 4) | | | | Ink set 5 (Example 5) | |
|---|---|---|---|---|---|---|---|---|
|  |  |  | Y | M | C | B | Y | M |
| Ink composition (%) | Pigment-containing polymer particles | Pigment | 4.00 | 5.60 | 4.00 | 5.00 | 4.00 | 5.60 |
|  |  | Polymer (B) | 1.84 | 2.57 | 1.84 | 2.28 | 1.84 | 2.57 |
|  | (A) | Subtotal | 5.84 | 8.17 | 5.84 | 7.28 | 5.84 | 8.17 |
|  | Water-insoluble polymer (B) particles |  | 1.85 | 1.85 | 1.85 | 1.85 | 1.85 | 1.85 |
|  | Organic solvent (c-1) | iPG | — | — | — | — | — | — |
|  |  | iPDG | — | — | — | — | 10.00 | 10.00 |
|  |  | iBDG | — | — | — | — | 2.00 | 2.00 |
|  |  | BDG | 10.00 | 10.00 | 10.00 | 10.00 | — | — |
|  |  | Subtotal | 10.00 | 10.00 | 10.00 | 10.00 | 12.00 | 12.00 |
|  | Organic solvent (c-2) | PG | 22.00 | 18.00 | 22.00 | 18.00 | 23.00 | 18.00 |
|  |  | PPG | 1.00 | 1.00 | 1.00 | 1.00 | 1.00 | 1.00 |
|  |  | Subtotal | 23.00 | 19.00 | 23.00 | 19.00 | 24.00 | 19.00 |
|  | Silicone-based surfactant (d-1) | SAG-005 | 0.05 | 0.05 | 0.05 | 0.05 | 0.05 | 0.05 |
|  |  | Subtotal | 0.05 | 0.05 | 0.05 | 0.05 | 0.05 | 0.05 |
|  |  | [a + b]/[m/n] | 2.24 | 2.24 | 2.24 | 2.24 | 2.24 | 2.24 |
|  | Nonionic surfactant (d-2) | EMULGEN 120 | 1.20 | 1.20 | 1.20 | 1.20 | 1.20 | 1.20 |
|  |  | S-104PG50 | 0.80 | 0.80 | 0.80 | 0.80 | 0.80 | 0.80 |
|  |  | Subtotal | 2.00 | 2.00 | 2.00 | 2.00 | 2.00 | 2.00 |
|  | Neutralizing agent | 1N-NaOH | 0.50 | 0.50 | 0.50 | 0.50 | 0.50 | 0.50 |
|  | Water |  | 56.76 | 58.43 | 56.76 | 59.32 | 53.76 | 56.43 |
|  | Total |  | 100 | 100 | 100 | 100 | 100 | 100 |
| Properties | Static surface tension (mN/m, 20° C.) |  | 29 | 29 | 29 | 29 | 29 | 29 |
|  | Viscosity (mPa · s, 32° C.) |  | 6.6 | 6.4 | 6.3 | 6.3 | 6.6 | 6.4 |
|  | Average particle size of polymer particles (A) (nm) |  | 123 | 115 | 103 | 100 | 120 | 113 |
| Evaluation results | Continuous ejection properties |  | 4 | 3 | 5 | 4 | 5 | 5 |
|  | Roller transfer properties (2C) |  | | | 5 | | | 5 |
|  | Roller transfer properties (3C) |  | | | 7 | | | 9 |
|  | Intercolor bleeding |  | | | 5 | | | 5 |

TABLE 4-continued

|  |  |  | Ink set 5 (Example 5) | | Ink set 6 (Example 6) | | | |
|---|---|---|---|---|---|---|---|---|
|  |  |  | C | B | Y | M | C | B |
| Ink composition (%) | Pigment-containing polymer particles (A) | Pigment | 4.00 | 5.00 | 4.00 | 5.60 | 4.00 | 5.00 |
|  |  | Polymer (B) | 1.84 | 2.28 | 1.84 | 2.57 | 1.84 | 2.28 |
|  |  | Subtotal | 5.84 | 7.28 | 5.84 | 8.17 | 5.84 | 7.28 |
|  | Water-insoluble polymer (B) particles |  | 1.85 | 1.85 | 1.85 | 1.85 | 1.85 | 1.85 |
|  | Organic solvent (c-1) | iPG | — | — | — | — | — | — |
|  |  | iPDG | 10.00 | 10.00 | 10.00 | 10.00 | 10.00 | 10.00 |
|  |  | iBDG | 2.00 | 2.00 | — | — | — | — |
|  |  | BDG | — | — | 2.00 | 2.00 | 2.00 | 2.00 |
|  |  | Subtotal | 12.00 | 12.00 | 12.00 | 12.00 | 12.00 | 12.00 |
|  | Organic solvent (c-2) | PG | 23.00 | 18.00 | 23.00 | 17.00 | 23.00 | 17.00 |
|  |  | PPG | 1.00 | 1.00 | 1.00 | 1.00 | 1.00 | 1.00 |
|  |  | Subtotal | 24.00 | 19.00 | 24.00 | 18.00 | 24.00 | 18.00 |
|  | Silicone-based surfactant (d-1) | SAG-005 | 0.05 | 0.05 | 0.05 | 0.05 | 0.05 | 0.05 |
|  |  | Subtotal | 0.05 | 0.05 | 0.05 | 0.05 | 0.05 | 0.05 |
|  |  | [a + b]/[m/n] | 2.24 | 2.24 | 2.24 | 2.24 | 2.24 | 2.24 |
|  | Nonionic surfactant (d-2) | EMULGEN 120 | 1.20 | 1.20 | 1.20 | 1.20 | 1.20 | 1.20 |
|  |  | S-104PG50 | 0.80 | 0.80 | 0.80 | 0.80 | 0.80 | 0.80 |
|  |  | Subtotal | 2.00 | 2.00 | 2.00 | 2.00 | 2.00 | 2.00 |
|  | Neutralizing agent | 1N-NaOH | 0.50 | 0.50 | 0.50 | 0.50 | 0.50 | 0.50 |
|  | Water |  | 53.76 | 57.32 | 53.76 | 57.43 | 53.76 | 58.32 |
|  | Total |  | 100 | 100 | 100 | 100 | 100 | 100 |
| Properties | Static surface tension (mN/m, 20° C.) |  | 29 | 29 | 29 | 29 | 29 | 29 |
|  | Viscosity (mPa · s, 32° C.) |  | 6.3 | 6.3 | 6.3 | 6.2 | 6.1 | 6.2 |
|  | Average particle size of polymer particles (A) (nm) |  | 102 | 100 | 120 | 114 | 102 | 100 |
| Evaluation results | Continuous ejection properties |  | 5 | 5 | 5 | 4 | 5 | 5 |
|  | Roller transfer properties (2C) |  | 5 | | | 5 | | |
|  | Roller transfer properties (3C) |  | 9 | | | 8 | | |
|  | Intercolor bleeding |  | 5 | | | 5 | | |

TABLE 5

|  |  |  | Ink set 7 (Example 7) | | | | Ink set 8 (Example 8) | | | |
|---|---|---|---|---|---|---|---|---|---|---|
|  |  |  | Y | M | C | B | Y | M | C | B |
| Ink composition (%) | Pigment-containing polymer particles (A) | Pigment | 4.00 | 5.60 | 4.00 | 5.00 | 4.00 | 5.60 | 4.00 | 5.00 |
|  |  | Polymer (B) | 1.84 | 2.57 | 1.84 | 2.28 | 1.84 | 2.57 | 1.84 | 2.28 |
|  |  | Subtotal | 5.84 | 8.17 | 5.84 | 7.28 | 5.84 | 8.17 | 5.84 | 7.28 |
|  | Water-insoluble polymer (B) particles |  | 1.85 | 1.85 | 1.85 | 1.85 | 1.85 | 1.85 | 1.85 | 1.85 |
|  | Organic solvent | iPDG | 2.00 | 2.00 | 2.00 | 2.00 | 6.00 | 6.00 | 6.00 | 6.00 |
|  | (c-1) | Subtotal | 2.00 | 2.00 | 2.00 | 2.00 | 6.00 | 6.00 | 6.00 | 6.00 |
|  | Organic solvent (c-2) | PG | 34.00 | 28.00 | 34.00 | 29.00 | 30.00 | 23.00 | 30.00 | 30.00 |
|  |  | PPG | 1.00 | 1.00 | 1.00 | 1.00 | 1.00 | 1.00 | 1.00 | 1.00 |
|  |  | Subtotal | 35.00 | 29.00 | 35.00 | 30.00 | 31.00 | 24.00 | 31.00 | 31.00 |
|  | Silicone-based surfactant (d-1) | SAG-005 | 0.05 | 0.05 | 0.05 | 0.05 | 0.05 | 0.05 | 0.05 | 0.05 |
|  |  | Subtotal | 0.05 | 0.05 | 0.05 | 0.05 | 0.05 | 0.05 | 0.05 | 0.05 |
|  |  | [a + b]/[m/n] | 2.24 | 2.24 | 2.24 | 2.24 | 2.24 | 2.24 | 2.24 | 2.24 |
|  | Nonionic surfactant (d-2) | EMULGEN 120 | 1.20 | 1.20 | 1.20 | 1.20 | 1.20 | 1.20 | 1.20 | 1.20 |
|  |  | S-104PG50 | 0.80 | 0.80 | 0.80 | 0.80 | 0.80 | 0.80 | 0.80 | 0.80 |
|  |  | Subtotal | 2.00 | 2.00 | 2.00 | 2.00 | 2.00 | 2.00 | 2.00 | 2.00 |
|  | Neutralizing agent | 1N-NaOH | 0.50 | 0.50 | 0.50 | 0.50 | 0.50 | 0.50 | 0.50 | 0.50 |
|  | Water |  | 52.76 | 56.43 | 52.76 | 56.32 | 52.76 | 57.43 | 52.76 | 51.32 |
|  | Total |  | 100 | 100 | 100 | 100 | 100 | 100 | 100 | 100 |
| Properties | Static surface tension (mN/m, 20° C.) |  | 29 | 29 | 29 | 29 | 29 | 29 | 29 | 29 |
|  | Viscosity (mPa · s, 32° C.) |  | 6.3 | 6.4 | 6.3 | 6.3 | 6.2 | 6.3 | 6.2 | 6.2 |
|  | Average particle size of polymer particles (A) (nm) |  | 119 | 115 | 99 | 99 | 117 | 112 | 100 | 100 |
| Evaluation results | Continuous ejection properties |  | 5 | 5 | 5 | 5 | 5 | 5 | 5 | 5 |
|  | Roller transfer properties (2C) |  |  | 5 |  |  |  | 5 |  |  |
|  | Roller transfer properties (3C) |  |  | 6 |  |  |  | 8 |  |  |

TABLE 5-continued

| | Intercolor bleeding | | 4 | | | | 5 | | | |
|---|---|---|---|---|---|---|---|---|---|---|
| | | | Ink set 9 (Example 9) | | | | Ink set 10 (Example 10) | | | |
| | | | Y | M | C | B | Y | M | C | B |
| Ink composition (%) | Pigment-containing polymer particles (A) | Pigment | 4.00 | 5.60 | 4.00 | 5.00 | 4.00 | 5.60 | 4.00 | 5.00 |
| | | Polymer (B) | 1.84 | 2.57 | 1.84 | 2.28 | 1.84 | 2.57 | 1.84 | 2.28 |
| | | Subtotal | 5.84 | 8.17 | 5.84 | 7.28 | 5.84 | 8.17 | 5.84 | 7.28 |
| | Water-insoluble polymer (B) particles | | 1.85 | 1.85 | 1.85 | 1.85 | 1.85 | 1.85 | 1.85 | 1.85 |
| | Organic solvent (c-1) | iPDG | 15.00 | 15.00 | 15.00 | 15.00 | 20.00 | 20.00 | 20.00 | 20.00 |
| | | Subtotal | 15.00 | 15.00 | 15.00 | 15.00 | 20.00 | 20.00 | 20.00 | 20.00 |
| | Organic solvent (c-2) | PG | 20.00 | 17.00 | 20.00 | 17.00 | 15.00 | 12.00 | 15.00 | 12.00 |
| | | PPG | 1.00 | 1.00 | 1.00 | 1.00 | 1.00 | 1.00 | 1.00 | 1.00 |
| | | Subtotal | 21.00 | 18.00 | 21.00 | 18.00 | 16.00 | 13.00 | 16.00 | 13.00 |
| | Silicone-based surfactant (d-1) | SAG-005 | 0.05 | 0.05 | 0.05 | 0.05 | 0.05 | 0.05 | 0.05 | 0.05 |
| | | Subtotal | 0.05 | 0.05 | 0.05 | 0.05 | 0.05 | 0.05 | 0.05 | 0.05 |
| | | [a + b]/[m/n] | 2.24 | 2.24 | 2.24 | 2.24 | 2.24 | 2.24 | 2.24 | 2.24 |
| | Nonionic surfactant (d-2) | EMULGEN 120 | 1.20 | 1.20 | 1.20 | 1.20 | 1.20 | 1.20 | 1.20 | 1.20 |
| | | S-104PG50 | 0.80 | 0.80 | 0.80 | 0.80 | 0.80 | 0.80 | 0.80 | 0.80 |
| | | Subtotal | 2.00 | 2.00 | 2.00 | 2.00 | 2.00 | 2.00 | 2.00 | 2.00 |
| | Neutralizing agent | 1N-NaOH | 0.50 | 0.50 | 0.50 | 0.50 | 0.50 | 0.50 | 0.50 | 0.50 |
| | Water | | 53.76 | 54.43 | 53.76 | 55.32 | 53.76 | 54.43 | 53.76 | 55.32 |
| | Total | | 100 | 100 | 100 | 100 | 100 | 100 | 100 | 100 |
| Properties | Static surface tension (mN/m, 20° C.) | | 29 | 29 | 29 | 29 | 29 | 29 | 29 | 29 |
| | Viscosity (mPa · s, 32° C.) | | 6.3 | 6.4 | 6.3 | 6.3 | 6.3 | 6.4 | 6.3 | 6.2 |
| | Average particle size of polymer particles (A) (nm) | | 122 | 116 | 100 | 102 | 124 | 116 | 105 | 103 |
| Evaluation results | Continuous ejection properties | | 5 | 4 | 5 | 5 | 4 | 3 | 4 | 4 |
| | Roller transfer properties (2C) | | | 5 | | | | 5 | | |
| | Roller transfer properties (3C) | | | 10 | | | | 10 | | |
| | Intercolor bleeding | | | 5 | | | | 5 | | |

TABLE 6

| | | | Ink set 11 (Example 11) | | | | Ink set 12 (Example 12) | | | |
|---|---|---|---|---|---|---|---|---|---|---|
| | | | Y | M | C | B | Y | M | C | B |
| Ink composition (%) | Pigment-containing polymer particles (A) | Pigment | 4.00 | 5.60 | 4.00 | 5.00 | 4.00 | 5.60 | 4.00 | 5.00 |
| | | Polymer (B) | 1.84 | 2.57 | 1.84 | 2.28 | 1.84 | 2.57 | 1.84 | 2.28 |
| | | Subtotal | 5.84 | 8.17 | 5.84 | 7.28 | 5.84 | 8.17 | 5.84 | 7.28 |
| | Water-insoluble polymer (B) particles | | 1.85 | 1.85 | 1.85 | 1.85 | 1.85 | 1.85 | 1.85 | 1.85 |
| | Organic solvent (c-1) | iPG | — | — | — | — | — | — | — | — |
| | | iPDG | 10.00 | 10.00 | 10.00 | 10.00 | 10.00 | 10.00 | 10.00 | 10.00 |
| | | Subtotal | 10.00 | 10.00 | 10.00 | 10.00 | 10.00 | 10.00 | 10.00 | 10.00 |
| | Organic solvent (c-2) | PG | — | — | — | — | 18.00 | 14.00 | 18.00 | 14.00 |
| | | DEG | 25.00 | 20.00 | 25.00 | 20.00 | — | — | — | — |
| | | PPG | 1.00 | 1.00 | 1.00 | 1.00 | 1.00 | 1.00 | 1.00 | 1.00 |
| | | 1,2-HD | — | — | — | — | 6.00 | 6.00 | 6.00 | 6.00 |
| | | Gly | — | — | — | — | — | — | — | — |
| | | Subtotal | 26.00 | 21.00 | 26.00 | 21.00 | 25.00 | 21.00 | 25.00 | 21.00 |
| | Silicone-based surfactant (d-1) | SAG-005 | 0.05 | 0.05 | 0.05 | 0.05 | 0.05 | 0.05 | 0.05 | 0.05 |
| | | Subtotal | 0.05 | 0.05 | 0.05 | 0.05 | 0.05 | 0.05 | 0.05 | 0.05 |
| | | [a + b]/[m/n] | 2.24 | 2.24 | 2.24 | 2.24 | 2.24 | 2.24 | 2.24 | 2.24 |
| | Nonionic surfactant (d-2) | EMULGEN 120 | 1.20 | 1.20 | 1.20 | 1.20 | 1.20 | 1.20 | 1.20 | 1.20 |
| | | S-104PG50 | 0.80 | 0.80 | 0.80 | 0.80 | 0.80 | 0.80 | 0.80 | 0.80 |
| | | Subtotal | 2.00 | 2.00 | 2.00 | 2.00 | 2.00 | 2.00 | 2.00 | 2.00 |
| | Neutralizing agent | 1N-NaOH | 0.50 | 0.50 | 0.50 | 0.50 | 0.50 | 0.50 | 0.50 | 0.50 |
| | Water | | 53.76 | 56.43 | 53.76 | 57.32 | 54.76 | 56.43 | 54.76 | 57.32 |
| | Total | | 100 | 100 | 100 | 100 | 100 | 100 | 100 | 100 |
| Properties | Static surface tension (mN/m, 20° C.) | | 29 | 29 | 29 | 29 | 29 | 29 | 29 | 29 |
| | Viscosity (mPa · s, 32° C.) | | 6.3 | 6.4 | 6.3 | 6.2 | 6.2 | 6.2 | 6.2 | 6.1 |
| | Average particle size of polymer particles (A) (nm) | | 120 | 113 | 100 | 99 | 119 | 115 | 99 | 99 |

TABLE 6-continued

| | | | | | | | | | | |
|---|---|---|---|---|---|---|---|---|---|---|
| Evaluation results | Continuous ejection properties | | 5 | 5 | 5 | 5 | 5 | 4 | 5 | 4 |
| | Roller transfer properties (2C) | | | 5 | | | | 5 | | |
| | Roller transfer properties (3C) | | | 8 | | | | 6 | | |
| | Intercolor bleeding | | | 5 | | | | 4 | | |

| | | | Ink set 13 (Example 13) | | | | Ink set 14 (Example 14) | | | |
|---|---|---|---|---|---|---|---|---|---|---|
| | | | Y | M | C | B | Y | M | C | B |
| Ink composition | Pigment-containing polymer particles | Pigment | 4.00 | 5.60 | 4.00 | 5.00 | 4.00 | 5.60 | 4.00 | 5.00 |
| | | Polymer (B) | 1.84 | 2.57 | 1.84 | 2.28 | 1.84 | 2.57 | 1.84 | 2.28 |
| (%) | (A) | Subtotal | 5.84 | 8.17 | 5.84 | 7.28 | 5.84 | 8.17 | 5.84 | 7.28 |
| | Water-insoluble polymer (B) particles | | 1.85 | 1.85 | 1.85 | 1.85 | 1.85 | 1.85 | 1.85 | 1.85 |
| | Organic solvent | iPG | 10.00 | 10.00 | 10.00 | 10.00 | — | 10.00 | — | 5.00 |
| | (c-1) | iPDG | — | — | — | — | 10.00 | — | 10.00 | 5.00 |
| | | Subtotal | 10.00 | 10.00 | 10.00 | 10.00 | 10.00 | 10.00 | 10.00 | 10.00 |
| | Organic solvent | PG | 22.00 | 18.00 | 22.00 | 18.00 | 25.00 | 15.00 | 25.00 | 15.00 |
| | (c-2) | DEG | — | — | — | — | — | — | — | — |
| | | PPG | 1.00 | 1.00 | 1.00 | 1.00 | 1.00 | 1.00 | 1.00 | 1.00 |
| | | 1,2-HD | — | — | — | — | — | — | — | — |
| | | Gly | 3.00 | 3.00 | 3.00 | 3.00 | — | 3.00 | — | — |
| | | Subtotal | 26.00 | 22.00 | 26.00 | 22.00 | 26.00 | 19.00 | 26.00 | 16.00 |
| | Silicone-based | SAG-005 | 0.05 | 0.05 | 0.05 | 0.05 | 0.05 | 0.05 | 0.05 | 0.05 |
| | surfactant (d-1) | Subtotal | 0.05 | 0.05 | 0.05 | 0.05 | 0.05 | 0.05 | 0.05 | 0.05 |
| | | [a + b]/[m/n] | 2.24 | 2.24 | 2.24 | 2.24 | 2.24 | 2.24 | 2.24 | 2.24 |
| | Nonionic | EMULGEN 120 | 1.20 | 1.20 | 1.20 | 1.20 | 1.20 | 1.20 | 1.20 | 1.20 |
| | surfactant (d-2) | S-104PG50 | 0.80 | 0.80 | 0.80 | 0.80 | 0.80 | 0.80 | 0.80 | 0.80 |
| | | Subtotal | 2.00 | 2.00 | 2.00 | 2.00 | 2.00 | 2.00 | 2.00 | 2.00 |
| | Neutralizing agent | 1N-NaOH | 0.50 | 0.50 | 0.50 | 0.50 | 0.50 | 0.50 | 0.50 | 0.50 |
| | Water | | 53.76 | 55.43 | 53.76 | 56.32 | 53.76 | 55.43 | 53.76 | 56.32 |
| | Total | | 100 | 100 | 100 | 100 | 100 | 100 | 100 | 100 |
| Properties | Static surface tension (mN/m, 20° C.) | | 29 | 29 | 29 | 29 | 29 | 29 | 29 | 29 |
| | Viscosity (mPa · s, 32° C.) | | 6.2 | 6.2 | 6.2 | 6.1 | 6.3 | 6.4 | 6.2 | 6.3 |
| | Average particle size of polymer particles (A) (nm) | | 119 | 115 | 99 | 99 | 120 | 114 | 101 | 99 |
| Evaluation results | Continuous ejection properties | | 5 | 5 | 5 | 9 | 5 | 5 | 5 | 4 |
| | Roller transfer properties (2C) | | | 4 | | | | 4 | | |
| | Roller transfer properties (3C) | | | 5 | | | | 8 | | |
| | Intercolor bleeding | | | 4 | | | | 5 | | |

TABLE 7

| | | | Ink set 15 (Example 15) | | | | Ink set 16 (Example 16) | |
|---|---|---|---|---|---|---|---|---|
| | | | Y | M | C | B | Y | M |
| Ink composition | Pigment-containing polymer particles | Pigment | 4.00 | 5.60 | 4.00 | 5.00 | 4.00 | 5.60 |
| | | Polymer (B) | 1.84 | 2.57 | 1.84 | 2.28 | 1.84 | 2.57 |
| (%) | (A) | Subtotal | 5.84 | 8.17 | 5.84 | 7.28 | 5.84 | 8.17 |
| | Water-insoluble polymer (B) particles | | 1.85 | 1.85 | 1.85 | 1.85 | 1.85 | 1.85 |
| | Organic solvent | iPDG | 10.00 | 10.00 | 10.00 | 10.00 | 10.00 | 10.00 |
| | (c-1) | Subtotal | 10.00 | 10.00 | 10.00 | 10.00 | 10.00 | 10.00 |
| | Organic solvent | PG | 25.00 | 20.00 | 25.00 | 20.00 | 25.00 | 20.00 |
| | (c-2) | PPG | 1.00 | 1.00 | 1.00 | 1.00 | 1.00 | 1.00 |
| | | Subtotal | 26.00 | 21.00 | 26.00 | 21.00 | 26.00 | 21.00 |
| | Silicone-based | KF-353 | 0.05 | 0.05 | 0.05 | 0.05 | — | — |
| | surfactant (d-1) | KF-642 | — | — | — | — | 0.05 | 0.05 |
| | | KF-355A | — | — | — | — | — | — |
| | | FZ-2191 | — | — | — | — | — | — |
| | | BYK-348 | — | — | — | — | — | — |
| | | KF-351A | — | — | — | — | — | — |
| | | KF-6020 | — | — | — | — | — | — |
| | | Subtotal | 0.05 | 0.05 | 0.05 | 0.05 | 0.05 | 0.05 |
| | | [a + b]/[m/n] | 1.48 | 1.48 | 1.48 | 1.48 | 3.28 | 3.28 |

TABLE 7-continued

|  |  |  | | | | | | |
|---|---|---|---|---|---|---|---|---|
|  | Nonionic surfactant (d-2) | EMULGEN 120 | 1.20 | 1.20 | 1.20 | 1.20 | 1.20 | 1.20 |
|  |  | S-104PG50 | 0.80 | 0.80 | 0.80 | 0.80 | 0.80 | 0.80 |
|  |  | Subtotal | 2.00 | 2.00 | 2.00 | 2.00 | 2.00 | 2.00 |
|  | Neutralizing agent | 1N-NaOH | 0.50 | 0.50 | 0.50 | 0.50 | 0.50 | 0.50 |
|  | Water |  | 53.76 | 56.43 | 53.76 | 57.32 | 53.76 | 56.43 |
|  | Total |  | 100 | 100 | 100 | 100 | 100 | 100 |
| Properties | Static surface tension (mN/m, 20° C.) |  | 29 | 29 | 29 | 29 | 29 | 29 |
|  | Viscosity (mPa · s, 32° C.) |  | 6.3 | 6.4 | 6.3 | 6.2 | 6.2 | 6.4 |
|  | Average particle size of polymer particles (A) (nm) |  | 120 | 113 | 100 | 99 | 118 | 114 |
| Evaluation results | Continuous ejection properties |  | 5 | 5 | 5 | 5 | 5 | 5 |
|  | Roller transfer properties (2C) |  |  | 5 |  |  |  | 5 |
|  | Roller transfer properties (3C) |  |  | 9 |  |  |  | 9 |
|  | Intercolor bleeding |  |  | 5 |  |  |  | 3 |

|  |  |  | Ink set 16 (Example 16) | | | Ink set 17 (Example 17) | | |
|---|---|---|---|---|---|---|---|---|
|  |  |  | C | B | Y | M | C | B |
| Ink composition (%) | Pigment-containing polymer particles (A) | Pigment | 4.00 | 5.00 | 4.00 | 5.60 | 4.00 | 5.00 |
|  |  | Polymer (B) | 1.84 | 2.28 | 1.84 | 2.57 | 1.84 | 2.28 |
|  |  | Subtotal | 5.84 | 7.28 | 5.84 | 8.17 | 5.84 | 7.28 |
|  | Water-insoluble polymer (B) particles |  | 1.85 | 1.85 | 1.85 | 1.85 | 1.85 | 1.85 |
|  | Organic solvent (c-1) | iPDG | 10.00 | 10.00 | 10.00 | 10.00 | 10.00 | 10.00 |
|  |  | Subtotal | 10.00 | 10.00 | 10.00 | 10.00 | 10.00 | 10.00 |
|  | Organic solvent (c-2) | PG | 25.00 | 20.00 | 25.00 | 20.00 | 25.00 | 20.00 |
|  |  | PPG | 1.00 | 1.00 | 1.00 | 1.00 | 1.00 | 1.00 |
|  |  | Subtotal | 26.00 | 21.00 | 26.00 | 21.00 | 26.00 | 21.00 |
|  | Silicone-based surfactant (d-1) | KF-353 | — | — | — | — | — | — |
|  |  | KF-642 | 0.05 | 0.05 | — | — | — | — |
|  |  | KF-355A | — | — | 0.05 | 0.05 | 0.05 | 0.05 |
|  |  | FZ-2191 | — | — | — | — | — | — |
|  |  | BYK-348 | — | — | — | — | — | — |
|  |  | KF-351A | — | — | — | — | — | — |
|  |  | KF-6020 | — | — | — | — | — | — |
|  |  | Subtotal | 0.05 | 0.05 | 0.05 | 0.05 | 0.05 | 0.05 |
|  | [a + b]/[m/n] |  | 3.28 | 3.28 | 5.43 | 5.43 | 5.43 | 5.43 |
|  | Nonionic surfactant (d-2) | EMULGEN 120 | 1.20 | 1.20 | 1.20 | 1.20 | 1.20 | 1.20 |
|  |  | S-104PG50 | 0.80 | 0.80 | 0.80 | 0.80 | 0.80 | 0.80 |
|  |  | Subtotal | 2.00 | 2.00 | 2.00 | 2.00 | 2.00 | 2.00 |
|  | Neutralizing agent | 1N-NaOH | 0.50 | 0.50 | 0.50 | 0.50 | 0.50 | 0.50 |
|  | Water |  | 53.76 | 57.32 | 53.76 | 56.43 | 53.76 | 57.32 |
|  | Total |  | 100 | 100 | 100 | 100 | 100 | 100 |
| Properties | Static surface tension (mN/m, 20° C.) |  | 29 | 29 | 29 | 29 | 29 | 29 |
|  | Viscosity (mPa · s, 32° C.) |  | 6.3 | 6.3 | 6.3 | 6.4 | 6.3 | 6.2 |
|  | Average particle size of polymer particles (A) (nm) |  | 101 | 99 | 116 | 115 | 100 | 102 |
| Evaluation results | Continuous ejection properties |  | 5 | 5 | 5 | 5 | 5 | 5 |
|  | Roller transfer properties (2C) |  |  | 5 |  |  |  | 5 |
|  | Roller transfer properties (3C) |  |  | 9 |  |  |  | 9 |
|  | Intercolor bleeding |  |  | 3 |  |  |  | 3 |

|  |  |  | Ink set 18 (Example 18) | | | | Ink set 19 (Example 19) | |
|---|---|---|---|---|---|---|---|---|
|  |  |  | Y | M | C | B | Y | M |
| Ink composition (%) | Pigment-containing polymer particles (A) | Pigment | 4.00 | 5.60 | 4.00 | 5.00 | 4.00 | 5.60 |
|  |  | Polymer (B) | 1.84 | 2.57 | 1.84 | 2.28 | 1.84 | 2.57 |
|  |  | Subtotal | 5.84 | 8.17 | 5.84 | 7.28 | 5.84 | 8.17 |
|  | Water-insoluble polymer (B) particles |  | 1.85 | 1.85 | 1.85 | 1.85 | 1.85 | 1.85 |
|  | Organic solvent (c-1) | iPDG | 10.00 | 10.00 | 10.00 | 10.00 | 10.00 | 10.00 |
|  |  | Subtotal | 10.00 | 10.00 | 10.00 | 10.00 | 10.00 | 10.00 |
|  | Organic solvent (c-2) | PG | 25.00 | 20.00 | 25.00 | 20.00 | 25.00 | 20.00 |
|  |  | PPG | 1.00 | 1.00 | 1.00 | 1.00 | 1.00 | 1.00 |
|  |  | Subtotal | 26.00 | 21.00 | 26.00 | 21.00 | 26.00 | 21.00 |
|  | Silicone-based surfactant (d-1) | KF-353 | — | — | — | — | — | — |
|  |  | KF-642 | — | — | — | — | — | — |
|  |  | KF-355A | — | — | — | — | — | — |
|  |  | FZ-2191 | 0.05 | 0.05 | 0.05 | 0.05 | — | — |

TABLE 7-continued

|  |  |  |  |  |  |  |  |  |
|---|---|---|---|---|---|---|---|---|
|  |  | BYK-348 | — | — | — | — | — | — |
|  |  | KF-351A | — | — | — | — | 0.05 | 0.05 |
|  |  | KF-6020 | — | — | — | — | — | — |
|  |  | Subtotal | 0.05 | 0.05 | 0.05 | 0.05 | 0.05 | 0.05 |
|  |  | [a + b]/[m/n] | 0.74 | 0.74 | 0.74 | 0.74 | 8.42 | 8.42 |
|  | Nonionic | EMULGEN 120 | 1.20 | 1.20 | 1.20 | 1.20 | 1.20 | 1.20 |
|  | surfactant (d-2) | S-104PG50 | 0.80 | 0.80 | 0.80 | 0.80 | 0.80 | 0.80 |
|  |  | Subtotal | 2.00 | 2.00 | 2.00 | 2.00 | 2.00 | 2.00 |
|  | Neutralizing agent | 1N-NaOH | 0.50 | 0.50 | 0.50 | 0.50 | 0.50 | 0.50 |
|  | Water |  | 53.76 | 56.43 | 53.76 | 57.32 | 53.76 | 56.43 |
|  | Total |  | 100 | 100 | 100 | 100 | 100 | 100 |
| Properties | Static surface tension (mN/m, 20° C.) |  | 29 | 29 | 29 | 29 | 29 | 29 |
|  | Viscosity (mPa · s, 32° C.) |  | 6.2 | 6.4 | 6.3 | 6.3 | 6.3 | 6.4 |
|  | Average particle size of polymer particles (A) (nm) |  | 118 | 115 | 100 | 100 | 119 | 115 |
| Evaluation results | Continuous ejection properties |  | 5 | 5 | 5 | 5 | 4 | 4 |
|  | Roller transfer properties (2C) |  |  | 5 |  |  | 5 |  |
|  | Roller transfer properties (3C) |  |  | 9 |  |  | 9 |  |
|  | Intercolor bleeding |  |  | 5 |  |  | 2 |  |

|  |  |  | Ink set 19 (Example 19) | | Ink set 20 (Example 20) | | | |
|---|---|---|---|---|---|---|---|---|
|  |  |  | C | B | Y | M | C | B |
| Ink composition (%) | Pigment-containing polymer particles (A) | Pigment | 4.00 | 5.00 | 4.00 | 5.60 | 4.00 | 5.00 |
|  |  | Polymer (B) | 1.84 | 2.28 | 1.84 | 2.57 | 1.84 | 2.28 |
|  |  | Subtotal | 5.84 | 7.28 | 5.84 | 8.17 | 5.84 | 7.28 |
|  | Water-insoluble polymer (B) particles |  | 1.85 | 1.85 | 1.85 | 1.85 | 1.85 | 1.85 |
|  | Organic solvent (c-1) | iPDG | 10.00 | 10.00 | 10.00 | 10.00 | 10.00 | 10.00 |
|  |  | Subtotal | 10.00 | 10.00 | 10.00 | 10.00 | 10.00 | 10.00 |
|  | Organic solvent (c-2) | PG | 25.00 | 20.00 | 25.00 | 20.00 | 25.00 | 20.00 |
|  |  | PPG | 1.00 | 1.00 | 1.00 | 1.00 | 1.00 | 1.00 |
|  |  | Subtotal | 26.00 | 21.00 | 26.00 | 21.00 | 26.00 | 21.00 |
|  | Silicone-based surfactant (d-1) | KF-353 | — | — | — | — | — | — |
|  |  | KF-642 | — | — | — | — | — | — |
|  |  | KF-355A | — | — | — | — | — | — |
|  |  | FZ-2191 | — | — | — | — | — | — |
|  |  | BYK-348 | — | — | — | — | — | — |
|  |  | KF-351A | 0.05 | 0.05 | — | — | — | — |
|  |  | KF-6020 | — | — | 0.05 | 0.05 | 0.05 | 0.05 |
|  |  | Subtotal | 0.05 | 0.05 | 0.05 | 0.05 | 0.05 | 0.05 |
|  |  | [a + b]/[m/n] | 8.42 | 8.42 | 0.44 | 0.44 | 0.44 | 0.44 |
|  | Nonionic surfactant (d-2) | EMULGEN 120 | 1.20 | 1.20 | 1.20 | 1.20 | 1.20 | 1.20 |
|  |  | S-104PG50 | 0.80 | 0.80 | 0.80 | 0.80 | 0.80 | 0.80 |
|  |  | Subtotal | 2.00 | 2.00 | 2.00 | 2.00 | 2.00 | 2.00 |
|  | Neutralizing agent | 1N-NaOH | 0.50 | 0.50 | 0.50 | 0.50 | 0.50 | 0.50 |
|  | Water |  | 53.76 | 57.32 | 53.76 | 56.43 | 53.76 | 57.32 |
|  | Total |  | 100 | 100 | 100 | 100 | 100 | 100 |
| Properties | Static surface tension (mN/m, 20° C.) |  | 29 | 29 | 31 | 31 | 31 | 31 |
|  | Viscosity (mPa · s, 32° C.) |  | 6.3 | 6.3 | 6.3 | 6.4 | 6.3 | 6.3 |
|  | Average particle size of polymer particles (A) (nm) |  | 99 | 99 | 117 | 117 | 102 | 101 |
| Evaluation results | Continuous ejection properties |  | 4 | 4 | 4 | 4 | 4 | 4 |
|  | Roller transfer properties (2C) |  |  | 5 |  |  | 5 |  |
|  | Roller transfer properties (3C) |  |  | 9 |  |  | 9 |  |
|  | Intercolor bleeding |  |  | 2 |  |  | 2 |  |

TABLE 8

|  |  |  | Ink set 21 (Example 21) | | | | Ink set 22 (Example 22) | | | |
|---|---|---|---|---|---|---|---|---|---|---|
|  |  |  | Y | M | C | B | Y | M | C | B |
| Ink composition (%) | Pigment-containing polymer particles | Pigment | 4.00 | 5.60 | 4.00 | 5.00 | 4.00 | 5.60 | 4.00 | 5.00 |
|  |  | Polymer (B) | 1.84 | 2.57 | 1.84 | 2.28 | 1.84 | 2.57 | 1.84 | 2.28 |
|  | (A) | Subtotal | 5.84 | 8.17 | 5.84 | 7.28 | 5.84 | 8.17 | 5.84 | 7.28 |
|  | Water-insoluble polymer (B) particles |  | 1.85 | 1.85 | 1.85 | 1.85 | 1.85 | 1.85 | 1.85 | 1.85 |
|  | Organic solvent (c-1) | iPDG | 10.00 | 10.00 | 10.00 | 10.00 | 10.00 | 10.00 | 10.00 | 10.00 |
|  |  | Subtotal | 10.00 | 10.00 | 10.00 | 10.00 | 10.00 | 10.00 | 10.00 | 10.00 |
|  | Organic solvent (c-2) | PG | 25.00 | 20.00 | 25.00 | 20.00 | 25.00 | 20.00 | 25.00 | 20.00 |
|  |  | PPG | 1.00 | 1.00 | 1.00 | 1.00 | 1.00 | 1.00 | 1.00 | 1.00 |
|  |  | Subtotal | 26.00 | 21.00 | 26.00 | 21.00 | 26.00 | 21.00 | 26.00 | 21.00 |
|  | Silicone-based surfactant (d-1) | SAG-005 | 0.60 | 0.60 | 0.60 | 0.60 | 0.30 | 0.30 | 0.30 | 0.30 |
|  |  | KF-642 | — | — | — | — | — | — | — | — |
|  |  | BYK-348 | — | — | — | — | — | — | — | — |
|  |  | Subtotal | 0.60 | 0.60 | 0.60 | 0.60 | 0.30 | 0.30 | 0.30 | 0.30 |
|  |  | [a + b]/[m/n] | 2.24 | 2.24 | 2.24 | 2.24 | 2.24 | 2.24 | 2.24 | 2.24 |
|  | Nonionic surfactant (d-2) | EMULGEN 120 | 1.20 | 1.20 | 1.20 | 1.20 | 1.20 | 1.20 | 1.20 | 1.20 |
|  |  | S-104PG50 | 0.80 | 0.80 | 0.80 | 0.80 | 0.80 | 0.80 | 0.80 | 0.80 |
|  |  | Subtotal | 2.00 | 2.00 | 2.00 | 2.00 | 2.00 | 2.00 | 2.00 | 2.00 |
|  |  | 1N-NaOH | 0.50 | 0.50 | 0.50 | 0.50 | 0.50 | 0.50 | 0.50 | 0.50 |
|  | Water |  | 53.21 | 55.88 | 53.21 | 56.77 | 53.51 | 56.18 | 53.51 | 57.07 |
|  | Total |  | 100 | 100 | 100 | 100 | 100 | 100 | 100 | 100 |
| Properties | Static surface tension (mN/m, 20° C.) |  | 24 | 24 | 24 | 24 | 26 | 26 | 26 | 26 |
|  | Viscosity (mPa · s, 32° C.) |  | 6.7 | 6.8 | 6.7 | 6.7 | 6.5 | 6.6 | 6.4 | 6.5 |
|  | Average particle size of polymer particles (A) (nm) |  | 117 | 116 | 100 | 99 | 118 | 115 | 100 | 100 |
| Evaluation results | Continuous ejection properties |  | 4 | 3 | 4 | 3 | 5 | 4 | 5 | 4 |
|  | Roller transfer properties (2C) |  | 5 | | | | 5 | | | |
|  | Roller transfer properties (3C) |  | 9 | | | | 9 | | | |
|  | Intercolor bleeding |  | 4 | | | | 5 | | | |

|  |  |  | Ink set 23 (Example 23) | | | | Ink set 24 (Example 24) | | | |
|---|---|---|---|---|---|---|---|---|---|---|
|  |  |  | Y | M | C | B | Y | M | C | B |
| Ink composition (%) | Pigment-containing polymer particles | Pigment | 4.00 | 5.60 | 4.00 | 5.00 | 4.00 | 5.60 | 4.00 | 5.00 |
|  |  | Polymer (B) | 1.84 | 2.57 | 1.84 | 2.28 | 1.84 | 2.57 | 1.84 | 2.28 |
|  | (A) | Subtotal | 5.84 | 8.17 | 5.84 | 7.28 | 5.84 | 8.17 | 5.84 | 7.28 |
|  | Water-insoluble polymer (B) particles |  | 1.85 | 1.85 | 1.85 | 1.85 | 1.85 | 1.85 | 1.85 | 1.85 |
|  | Organic solvent (c-1) | iPDG | 10.00 | 10.00 | 10.00 | 10.00 | 10.00 | 10.00 | 10.00 | 10.00 |
|  |  | Subtotal | 10.00 | 10.00 | 10.00 | 10.00 | 10.00 | 10.00 | 10.00 | 10.00 |
|  | Organic solvent (c-2) | PG | 25.00 | 20.00 | 25.00 | 20.00 | 25.00 | 20.00 | 25.00 | 20.00 |
|  |  | PPG | 1.00 | 1.00 | 1.00 | 1.00 | 1.00 | 1.00 | 1.00 | 1.00 |
|  |  | Subtotal | 26.00 | 21.00 | 26.00 | 21.00 | 26.00 | 21.00 | 26.00 | 21.00 |
|  | Silicone-based surfactant (d-1) | SAG-005 | — | — | — | — | 0.05 | 0.05 | — | — |
|  |  | KF-642 | — | — | — | — | — | — | 0.05 | — |
|  |  | BYK-348 | 0.05 | 0.05 | 0.05 | 0.05 | — | — | — | 0.05 |
|  |  | Subtotal | 0.05 | 0.05 | 0.05 | 0.05 | 0.05 | 0.05 | 0.05 | 0.05 |
|  |  | [a + b]/[m/n] | 4.16 | 4.16 | 4.16 | 4.16 | 2.24 | 2.24 | 3.28 | 4.16 |
|  | Nonionic surfactant (d-2) | EMULGEN 120 | 1.20 | 1.20 | 1.20 | 1.20 | 1.20 | 1.20 | 1.20 | 1.20 |
|  |  | S-104PG50 | 0.80 | 0.80 | 0.80 | 0.80 | 0.80 | 0.80 | 0.80 | 0.80 |
|  |  | Subtotal | 2.00 | 2.00 | 2.00 | 2.00 | 2.00 | 2.00 | 2.00 | 2.00 |
|  |  | 1N-NaOH | 0.50 | 0.50 | 0.50 | 0.50 | 0.50 | 0.50 | 0.50 | 0.50 |
|  | Water |  | 53.76 | 56.43 | 53.76 | 57.32 | 53.76 | 56.43 | 53.76 | 57.32 |
|  | Total |  | 100 | 100 | 100 | 100 | 100 | 100 | 100 | 100 |
| Properties | Static surface tension (mN/m, 20° C.) |  | 29 | 29 | 29 | 29 | 29 | 29 | 29 | 29 |
|  | Viscosity (mPa · s, 32° C.) |  | 6.3 | 6.4 | 6.3 | 6.3 | 6.3 | 6.4 | 6.2 | 6.3 |
|  | Average particle size of polymer particles (A) (nm) |  | 120 | 114 | 100 | 100 | 120 | 114 | 101 | 99 |
| Evaluation results | Continuous ejection properties |  | 5 | 5 | 5 | 5 | 5 | 5 | 5 | 5 |
|  | Roller transfer properties (2C) |  | 5 | | | | 5 | | | |
|  | Roller transfer properties (3C) |  | 9 | | | | 9 | | | |
|  | Intercolor bleeding |  | 4 | | | | 5 | | | |

TABLE 9

|  |  |  | Ink set 25 (Comparative Example 1) | | | | Ink set 26 (Comparative Example 2) | | | |
| --- | --- | --- | --- | --- | --- | --- | --- | --- | --- | --- |
|  |  |  | Y | M | C | B | Y | M | C | B |
| Ink composition (%) | Pigment-containing polymer particles (A) | Pigment | 4.00 | 5.60 | 4.00 | 5.00 | 4.00 | 5.60 | 4.00 | 5.00 |
|  |  | Polymer (B) | 1.84 | 2.57 | 1.84 | 2.28 | 1.84 | 2.57 | 1.84 | 2.28 |
|  |  | Subtotal | 5.84 | 8.17 | 5.84 | 7.28 | 5.84 | 8.17 | 5.84 | 7.28 |
|  | Water-insoluble polymer (B) particles |  | 1.85 | 1.85 | 1.85 | 1.85 | 1.85 | 1.85 | 1.85 | 1.85 |
|  | Organic solvent (c-1) | iPDG | — | — | — | — | — | — | — | — |
|  |  | Subtotal | 0.00 | 0.00 | 0.00 | 0.00 | 0.00 | 0.00 | 0.00 | 0.00 |
|  | Organic solvent (c-2) | BTG | — | — | — | — | — | — | — | — |
|  |  | DPGME | — | — | — | — | 10.00 | 10.00 | 10.00 | 10.00 |
|  |  | PG | 37.00 | 32.00 | 37.00 | 32.00 | 25.00 | 20.00 | 25.00 | 20.00 |
|  |  | PPG | 1.00 | 1.00 | 1.00 | 1.00 | 1.00 | 1.00 | 1.00 | 1.00 |
|  |  | Gly | — | — | — | — | — | — | — | — |
|  |  | Subtotal | 38.00 | 33.00 | 38.00 | 33.00 | 36.00 | 31.00 | 36.00 | 31.00 |
|  | Silicone-based surfactant (d-1) | SAG-005 | 0.05 | 0.05 | 0.05 | 0.05 | 0.05 | 0.05 | 0.05 | 0.05 |
|  |  | Subtotal | 0.05 | 0.05 | 0.05 | 0.05 | 0.05 | 0.05 | 0.05 | 0.05 |
|  |  | [a + b]/[m/n] | 2.24 | 2.24 | 2.24 | 2.24 | 2.24 | 2.24 | 2.24 | 2.24 |
|  | Nonionic surfactant (d-2) | EMULGEN 120 | 1.20 | 1.20 | 1.20 | 1.20 | 1.20 | 1.20 | 1.20 | 1.20 |
|  |  | S-104PG50 | 0.80 | 0.80 | 0.80 | 0.80 | 0.80 | 0.80 | 0.80 | 0.80 |
|  |  | Subtotal | 2.00 | 2.00 | 2.00 | 2.00 | 2.00 | 2.00 | 2.00 | 2.00 |
|  | Neutralizing agent | 1N-NaOH | 0.50 | 0.50 | 0.50 | 0.50 | 0.50 | 0.50 | 0.50 | 0.50 |
|  | Water |  | 51.76 | 54.43 | 51.76 | 55.32 | 53.76 | 56.43 | 53.76 | 57.32 |
|  | Total |  | 100 | 100 | 100 | 100 | 100 | 100 | 100 | 100 |
| Properties | Static surface tension (mN/m, 20° C.) |  | 29 | 29 | 29 | 29 | 29 | 29 | 29 | 29 |
|  | Viscosity (mPa · s, 32° C.) |  | 6.2 | 6.3 | 6.2 | 6.2 | 6.1 | 6.2 | 6.1 | 6.1 |
|  | Average particle size of polymer particles (A) (nm) |  | 124 | 122 | 105 | 103 | 124 | 122 | 105 | 103 |
| Evaluation results | Continuous ejection properties |  | 5 | 5 | 5 | 5 | 2 | 1 | 3 | 1 |
|  | Roller transfer properties (2C) |  | 4 | | | | 5 | | | |
|  | Roller transfer properties (3C) |  | 4 | | | | 10 | | | |
|  | Intercolor bleeding |  | 4 | | | | 5 | | | |

|  |  |  | Ink set 27 (Comparative Example 3) | | | | Ink set 28 (Comparative Example 4) | | | |
| --- | --- | --- | --- | --- | --- | --- | --- | --- | --- | --- |
|  |  |  | Y | M | C | B | Y | M | C | B |
| Ink composition (%) | Pigment-containing polymer particles (A) | Pigment | 4.00 | 5.60 | 4.00 | 5.00 | 4.00 | 5.60 | 4.00 | 5.00 |
|  |  | Polymer (B) | 1.84 | 2.57 | 1.84 | 2.28 | 1.84 | 2.57 | 1.84 | 2.28 |
|  |  | Subtotal | 5.84 | 8.17 | 5.84 | 7.28 | 5.84 | 8.17 | 5.84 | 7.28 |
|  | Water-insoluble polymer (B) particles |  | 1.85 | 1.85 | 1.85 | 1.85 | 1.85 | 1.85 | 1.85 | 1.85 |
|  | Organic solvent (c-1) | iPDG | — | — | — | — | 10.00 | 10.00 | 10.00 | 10.00 |
|  |  | Subtotal | 0.00 | 0.00 | 0.00 | 0.00 | 10.00 | 10.00 | 10.00 | 10.00 |
|  | Organic solvent (c-2) | BTG | 10.00 | 10.00 | 10.00 | 10.00 | — | — | — | — |
|  |  | DPGME | — | — | — | — | — | — | — | — |
|  |  | PG | 25.00 | 20.00 | 25.00 | 20.00 | 18.00 | 15.00 | 18.00 | 15.00 |
|  |  | PPG | 1.00 | 1.00 | 1.00 | 1.00 | 1.00 | 1.00 | 1.00 | 1.00 |
|  |  | Gly | — | — | — | — | 6.00 | 6.00 | 6.00 | 6.00 |
|  |  | Subtotal | 36.00 | 31.00 | 36.00 | 31.00 | 25.00 | 22.00 | 25.00 | 22.00 |
|  | Silicone-based surfactant (d-1) | SAG-005 | 0.05 | 0.05 | 0.05 | 0.05 | 0.05 | 0.05 | 0.05 | 0.05 |
|  |  | Subtotal | 0.05 | 0.05 | 0.05 | 0.05 | 0.05 | 0.05 | 0.05 | 0.05 |
|  |  | [a + b]/[m/n] | 2.24 | 2.24 | 2.24 | 2.24 | 2.24 | 2.24 | 2.24 | 2.24 |
|  | Nonionic surfactant (d-2) | EMULGEN 120 | 1.20 | 1.20 | 1.20 | 1.20 | 1.20 | 1.20 | 1.20 | 1.20 |
|  |  | S-104PG50 | 0.80 | 0.80 | 0.80 | 0.80 | 0.80 | 0.80 | 0.80 | 0.80 |
|  |  | Subtotal | 2.00 | 2.00 | 2.00 | 2.00 | 2.00 | 2.00 | 2.00 | 2.00 |
|  | Neutralizing agent | 1N-NaOH | 0.50 | 0.50 | 0.50 | 0.50 | 0.50 | 0.50 | 0.50 | 0.50 |
|  | Water |  | 53.76 | 56.43 | 53.76 | 57.32 | 54.76 | 55.43 | 54.76 | 56.32 |
|  | Total |  | 100 | 100 | 100 | 100 | 100 | 100 | 100 | 100 |
| Properties | Static surface tension (mN/m, 20° C.) |  | 29 | 29 | 29 | 29 | 29 | 29 | 29 | 29 |
|  | Viscosity (mPa · s, 32° C.) |  | 6.7 | 6.7 | 6.5 | 6.6 | 6.2 | 6.2 | 6.2 | 6.1 |
|  | Average particle size of polymer particles (A) (nm) |  | 124 | 122 | 105 | 103 | 119 | 115 | 99 | 99 |
| Evaluation results | Continuous ejection properties |  | 5 | 4 | 5 | 5 | 5 | 5 | 5 | 5 |
|  | Roller transfer properties (2C) |  | 5 | | | | 1 | | | |
|  | Roller transfer properties (3C) |  | 3 | | | | 2 | | | |
|  | Intercolor bleeding |  | 4 | | | | 4 | | | |

TABLE 9-continued

|  |  |  | Ink set 29 (Comparative Example 5) | | | | Ink set 30 (Comparative Example 6) | | | |
| --- | --- | --- | --- | --- | --- | --- | --- | --- | --- | --- |
|  |  |  | Y | M | C | B | Y | M | C | B |
| Ink composition (%) | Pigment-containing polymer particles | Pigment | 4.00 | 5.60 | 4.00 | 5.00 | 4.00 | 5.60 | 4.00 | 5.00 |
|  |  | Polymer (B) | 1.84 | 2.57 | 1.84 | 2.28 | 1.84 | 2.57 | 1.84 | 2.28 |
|  | (A) | Subtotal | 5.84 | 8.17 | 5.84 | 7.28 | 5.84 | 8.17 | 5.84 | 7.28 |
|  | Water-insoluble polymer (B) particles |  | 1.85 | 1.85 | 1.85 | 1.85 | 1.85 | 1.85 | 1.85 | 1.85 |
|  | Organic solvent (c-1) | iPDG | 10.00 | 10.00 | 10.00 | 10.00 | 20.00 | 20.00 | 20.00 | 20.00 |
|  |  | Subtotal | 10.00 | 10.00 | 10.00 | 10.00 | 20.00 | 20.00 | 20.00 | 20.00 |
|  | Organic solvent (c-2) | BTG | — | — | — | — | — | — | — | — |
|  |  | DPGME | — | — | — | — | — | — | — | — |
|  |  | PG | 13.00 | 11.00 | 13.00 | 11.00 | 36.00 | 34.00 | 36.00 | 34.00 |
|  |  | PPG | 1.00 | 1.00 | 1.00 | 1.00 | 1.00 | 1.00 | 1.00 | 1.00 |
|  |  | Gly | — | — | — | — | — | — | — | — |
|  |  | Subtotal | 14.00 | 12.00 | 14.00 | 12.00 | 37.00 | 35.00 | 37.00 | 35.00 |
|  | Silicone-based surfactant (d-1) | SAG-005 | 0.05 | 0.05 | 0.05 | 0.05 | 0.05 | 0.05 | 0.05 | 0.05 |
|  |  | Subtotal | 0.05 | 0.05 | 0.05 | 0.05 | 0.05 | 0.05 | 0.05 | 0.05 |
|  |  | $[a + b]/[m/n]$ | 2.24 | 2.24 | 2.24 | 2.24 | 2.24 | 2.24 | 2.24 | 2.24 |
|  | Nonionic surfactant (d-2) | EMULGEN 120 | 1.20 | 1.20 | 1.20 | 1.20 | 1.20 | 1.20 | 1.20 | 1.20 |
|  |  | S-104PG50 | 0.80 | 0.80 | 0.80 | 0.80 | 0.80 | 0.80 | 0.80 | 0.80 |
|  |  | Subtotal | 2.00 | 2.00 | 2.00 | 2.00 | 2.00 | 2.00 | 2.00 | 2.00 |
|  | Neutralizing agent | 1N-NaOH | 0.50 | 0.50 | 0.50 | 0.50 | 0.50 | 0.50 | 0.50 | 0.50 |
|  | Water |  | 65.76 | 65.43 | 65.76 | 66.32 | 32.76 | 32.43 | 32.76 | 33.32 |
|  | Total |  | 100 | 100 | 100 | 100 | 100 | 100 | 100 | 100 |
| Properties | Static surface tension (mN/m, 20° C.) |  | 29 | 29 | 29 | 29 | 29 | 29 | 29 | 29 |
|  | Viscosity (mPa · s, 32° C.) |  | 4.8 | 4.9 | 4.8 | 4.8 | 6.9 | 6.9 | 6.9 | 6.9 |
|  | Average particle size of polymer particles (A) (nm) |  | 120 | 114 | 101 | 99 | 120 | 114 | 101 | 99 |
| Evaluation results | Continuous ejection properties |  | 2 | 1 | 2 | 1 | 5 | 5 | 5 | 5 |
|  | Roller transfer properties (2C) |  | 5 | | | | 3 | | | |
|  | Roller transfer properties (3C) |  | 10 | | | | 4 | | | |
|  | Intercolor bleeding |  | 5 | | | | 5 | | | |

|  |  |  | Ink set 31 (Comparative Example 7) | | | |
| --- | --- | --- | --- | --- | --- | --- |
|  |  |  | Y | M | C | B |
| Ink composition (%) | Pigment-containing polymer particles | Pigment | 4.00 | 5.60 | 4.00 | 5.00 |
|  |  | Polymer (B) | 1.84 | 2.57 | 1.84 | 2.28 |
|  | (A) | Subtotal | 5.84 | 8.17 | 5.84 | 7.28 |
|  | Water-insoluble polymer (B) particles |  | 1.85 | 1.85 | 1.85 | 1.85 |
|  | Organic solvent (c-1) | iPDG | 10.00 | 10.00 | 10.00 | 10.00 |
|  |  | Subtotal | 10.00 | 10.00 | 10.00 | 10.00 |
|  | Organic solvent (c-2) | BTG | — | — | — | — |
|  |  | DPGME | — | — | — | — |
|  |  | PG | 25.00 | 20.00 | 25.00 | 20.00 |
|  |  | PPG | 1.00 | 1.00 | 1.00 | 1.00 |
|  |  | Gly | — | — | — | — |
|  |  | Subtotal | 26.00 | 21.00 | 26.00 | 21.00 |
|  | Silicone-based surfactant (d-1) | SAG-005 | — | — | — | — |
|  |  | Subtotal | 0.00 | 0.00 | 0.00 | 0.00 |
|  |  | $[a + b]/[m/n]$ | 2.24 | 2.24 | 2.24 | 2.24 |
|  | Nonionic surfactant (d-2) | EMULGEN 120 | 1.20 | 1.20 | 1.20 | 1.20 |
|  |  | S-104PG50 | 0.80 | 0.80 | 0.80 | 0.80 |
|  |  | Subtotal | 2.00 | 2.00 | 2.00 | 2.00 |
|  | Neutralizing agent | 1N-NaOH | 0.50 | 0.50 | 0.50 | 0.50 |
|  | Water |  | 53.81 | 56.48 | 53.81 | 57.37 |
|  | Total |  | 100 | 100 | 100 | 100 |
| Properties | Static surface tension (mN/m, 20° C.) |  | 30 | 30 | 30 | 30 |
|  | Viscosity (mPa · s, 32° C.) |  | 6.1 | 6.2 | 6.1 | 6.2 |
|  | Average particle size of polymer particles (A) (nm) |  | 119 | 113 | 99 | 99 |
| Evaluation results | Continuous ejection properties |  | 5 | 5 | 5 | 5 |
|  | Roller transfer properties (2C) |  | 5 | | | |
|  | Roller transfer properties (3C) |  | 9 | | | |
|  | Intercolor bleeding |  | 1 | | | |

From Tables 4 to 9, it was confirmed that the ink sets obtained in Examples 1 to 24 were excellent in continuous ejection properties and also free of obstacles or defects upon practical use owing to roller transfer contamination and intercolor bleeding, and therefore exhibited excellent printing performance, as compared to the ink sets obtained in Comparative Examples 1 to 7.

Also, from Table 4, it was confirmed that the ink sets obtained in Examples 1 to 3, 5 and 6 in which the content of the glycol ether having a viscosity of not less than 6.0 mPa·s as measured at 20° C. as a component of the glycol ether (c-1) in the water-based ink was not more than 5% by mass were excellent in roller transfer properties (3C) as compared to the ink set obtained in Example 4 (Reference Example) in which the ink set had the same ink composition as those of Examples 1 to 3, 5 and 6 except for the glycol ether (c-1), and the content of the glycol ether having a viscosity of not less than 6.0 mPa·s as measured at 20° C. as a component of the glycol ether (c-1) in the water-based ink was more than 5% by mass.

From Tables 4 and 8, it was confirmed that the ink sets obtained in Examples 2 and 22 in which the content of the silicone-based surfactant (d-1) in the water-based ink was not more than 0.3% by mass were excellent in continuous ejection properties as compared to the ink set obtained in Example 21 (Reference Example) in which the ink set had the same ink composition as those of Examples 2 and 22 except for the contents of the silicone-based surfactant (d-1) and water, and the content of the silicone-based surfactant (d-1) in the water-based ink was more than 0.3% by mass.

Furthermore, using the ink sets obtained in Example 2 and Comparative Examples 1 and 3, the ink-jet printed materials were produced under the same printing conditions as described above except that the evaluation printing speed (transportation speed of the printing medium) was changed from 25 m/min to 75 m/min to thereby evaluate continuous ejection properties, roller transfer properties and intercolor bleeding of the ink sets. The results are shown in Table 10.

Meanwhile, the ink sets obtained in Comparative Examples 1 and 3 had such an ink composition that iPDG [glycol ether (c-1)] contained in the respective water-based inks of the ink set obtained in Example 2 was replaced with the organic solvent (c-2).

remained at the same level without deterioration. On the other hand, it was confirmed that in the aforementioned case, the ink sets obtained in Comparative Examples 1 and 3 showed the evaluation rating for roller transfer properties which was lower by 1 or 2 score points than that in the case where the evaluation printing speed was 25 m/min, and also showed the evaluation rating for intercolor bleeding which was lower by 2 score points than that in the case where the evaluation printing speed was 25 m/min. More specifically, it was confirmed that the ink set obtained in Example 2 was less deteriorated in roller transfer properties and intercolor bleeding as compared to the ink sets obtained in Comparative Examples 1 and 3.

INDUSTRIAL APPLICABILITY

According to the water-based ink and ink set for ink-jet printing of the present invention, it is possible to provide the water-based ink and ink set capable of exhibiting excellent continuous ejection properties even upon high-speed printing, and obtain good printed material that are free of not only roller transfer contamination but also intercolor bleeding owing to overstriking of the inks even when printed on a non-water absorbing printing medium.

<10> The water-based ink according to any one of the aspects <1> to <9>, wherein a viscosity of the glycol ether (c-1) as measured at 20° C. is preferably not less than 2.2 mPa·s, more preferably not less than 2.4 mPa·s and even more preferably not less than 2.6 mPa·s, and is also preferably not more than 6.8 mPa·s, more preferably not more than 6.0 mPa·s and even more preferably not more than 5.5 mPa·s.

<11> The water-based ink according to any one of the aspects <1> to <10>, wherein a vapor pressure of the glycol ether (c-1) as measured at 20° C. is preferably not less than 0.04 hPa, more preferably not less than 0.06 hPa and even more preferably not less than 0.07 hPa, and is also preferably not more than 6.0 hPa, more preferably not more than 5.5 hPa and even more preferably not more than 4.0 hPa.

<12> The water-based ink according to any one of the aspects <1> to <11>, wherein a boiling point of the glycol ether (c-1) is preferably not lower than 130° C., more preferably not lower than 135° C. and even more preferably

TABLE 10

| | | Ink set 2 (Example 2) | | | | Ink set 25 (Comparative Example 1) | | | | Ink set 27 (Comparative Example 3) | | | |
|---|---|---|---|---|---|---|---|---|---|---|---|---|---|
| | | Y | M | C | B | Y | M | C | B | Y | M | C | B |
| Properties | Static surface tension (mN/m, 20° C.) | 29 | 29 | 29 | 29 | 29 | 29 | 29 | 29 | 29 | 29 | 29 | 29 |
| | Viscosity (mPa · s, 32° C.) | 6.3 | 6.4 | 6.2 | 6.3 | 6.2 | 6.3 | 6.2 | 6.2 | 6.7 | 6.7 | 6.5 | 6.6 |
| | Average particle size of polymer particles (A) (nm) | 120 | 114 | 101 | 99 | 124 | 122 | 105 | 103 | 124 | 122 | 105 | 103 |
| Evaluation results | printing speed (m/min) | 25→75 | | | | 25→75 | | | | 25→75 | | | |
| Evaluation results | Continuous ejection properties | 5→5 | 5→4 | 5→5 | 5→5 | 5→5 | 5→4 | 5→5 | 5→5 | 5→5 | 4→3 | 5→5 | 5→4 |
| | Roller transfer properties (2C) | 5→5 | | | | 4→3 | | | | 5→3 | | | |
| | Roller transfer properties (3C) | 9→8 | | | | 4→2 | | | | 3→2 | | | |
| | Intercolor bleeding | 5→5 | | | | 4→2 | | | | 4→2 | | | |

From Table 10, it was confirmed that in the case where the evaluation printing speed was increased from 25 m/min to 75 m/min, the ink set obtained in Example 2 showed the evaluation rating for roller transfer properties which was identical to or lower by 1 score point than that in the case where the evaluation printing speed was 25 m/min, but showed the evaluation rating for intercolor bleeding which not lower than 138° C., and is also preferably not higher than 240° C., more preferably not higher than 230° C. and even more preferably not higher than 225° C.

<13> The water-based ink according to any one of the aspects <1> to <12>, wherein the glycol ether (c-1) is at least one compound selected from the group consisting of ethylene glycol isopropyl ether, ethylene glycol propyl ether, diethylene glycol methyl ether, diethylene glycol isopropyl ether and diethylene glycol isobutyl ether.

The invention claimed is:

1. An ink set for ink-jet printing comprising two or more kinds of water-based inks which are each constituted of a water-based ink comprising a pigment (A), a water-insoluble polymer (B), an organic solvent (C), a surfactant (D) and water, wherein pigment (A) in each kind of water-based ink differs in color from pigment (A) in every other kind of water-based ink in said ink set, in which:
the pigment (A) is present in the water-based ink in the form of pigment-containing water-insoluble polymer particles;
the organic solvent (C) comprises at least a glycol ether (c-1) which has a viscosity of not less than 2.0 mPa·s and not more than 7.0 mPa·s as measured at 20° C. and a vapor pressure of not less than 0.01 hPa and not more than 7.0 hPa as measured at 20° C., and a content of a glycol ether having a viscosity of not less than 6.0 mPa·s as measured at 20° C. as a component of the glycol ether (c-1) in the water-based ink is not less than 0% by mass and not more than 5% by mass, a content of the organic solvent (C) in the water-based ink is not less than 25% by mass and not more than 45% by mass, a content of water in said water-based inks is 40% to 85% by mass, and a content of a high-boiling organic solvent having a boiling point of not lower than 250° C. in the water-based ink is not more than 5% by mass; and
the surfactant (D) comprises a silicone-based surfactant (d-1), and a content of the silicone-based surfactant (d-1) in the water-based ink is not less than 0.005% by mass and not more than 0.3% by mass, wherein a kinematic viscosity of the silicone-based surfactant (d-1) as measured at 25° C. is not less than 40 mm$^2$/s and not more than 1000 mm$^2$/s, and wherein a HLB value of the silicone-based surfactant (d-1) is not less than 2.0,
wherein the glycol ether (c-1) is at least one compound selected from the group consisting of ethylene glycol isopropyl ether, ethylene glycol propyl ether, diethylene glycol isopropyl ether and diethylene glycol isobutyl ether,
wherein the set consists of three of the water based inks, one of which contains yellow pigment, one of which contains magenta pigment, and one of which contains cyan pigment,
wherein water has a largest content among components of a medium contained in said water-based inks;
wherein the organic solvent (C) further comprises an organic solvent (c-2) other than the glycol ether (c-1), and the organic solvent (c-2) further comprises an alkanediol having not less than 2 and not more than 6 carbon atoms, and
wherein a content of the glycol ether (c-1) in the organic solvent (C) is not less than 30% by mass and not more than 90% by mass;
wherein the silicone-based surfactant (d-1) is a polyether-modified silicone-based surfactant represented by the following general formula (1):

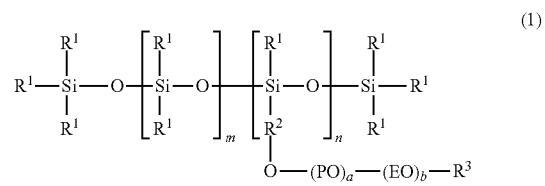

wherein R$^1$ is an alkyl group having 1 to 3 carbon atoms or a hydroxy group; R$^2$ is an alkanediyl group having 2 to 5 carbon atoms: R$^3$ is a hydrogen atom, an alkyl group having 1 to 3 carbon atoms or a hydroxy group; PO is a propyleneoxy group; EO is an ethyleneoxy group; a, b, m and n represent average molar numbers of addition of the respective constitutional units, and a is a number of 0 to 10, b is a number of 1 to 50, m is a number of 1 to 500 and n is a number of 1 to 50; and a plurality of the R$^1$ groups may be the same or different from each other; and in the general formula (1), a, b, m and n have the following ranges:
[a+b] is not less than 5 and not more than 35,
[m/n] is not less than 3 and not more than 20, and
[a+b]/[m+n] is not less than 0.5 and not more than 6.

2. The ink set for ink-jet printing according to claim 1, wherein the glycol ether (c-1) has a boiling point of not lower than 130° C. and not higher than 240° C.

3. The ink set for ink-jet printing according to claim 1, wherein a total content of the water-insoluble polymer (B) in the water-based ink is not less than 2.0% by mass and not more than 8.0% by mass.

4. The ink set for ink-jet printing according to claim 1, wherein the surfactant (D) further comprises a surfactant other than the silicone-based surfactant (d-1).

5. The ink set for ink-jet printing according to claim 1, wherein a content of water in the water-based ink is not less than 20% by mass and not more than 85% by mass.

6. The ink set for ink-jet printing according to claim 1, wherein the set contains at least one of C.I. Pigment Yellow, C.I. Pigment Red, C.I. Pigment Orange, C.I. Pigment Violet, C.I. Pigment Blue or C.I. Pigment Green.

7. The ink set for ink-jet printing according to claim 1, wherein the set contains at least one of Pigment Yellow 74, Pigment red 122, Pigment blue 15:3, or Pigment Black 7.

8. The ink set for ink-jet printing according to claim 1, wherein the content of (c-2) in the water-based ink is not less than 10% by mass and not more than 45% by mass.

9. The ink set for ink-jet printing according to claim 1, wherein the total content of propylene glycol and polypropylene glycol in the aqueous ink is not less than 10% by mass and not more than 45% by mass.

10. The ink set for ink-jet printing according to claim 1, wherein the content of propylene glycol in the water-based ink is not less than 12% by mass and not more than 43% by mass.

11. An ink-jet printing method for printing characters or images on a printing medium using an ink-jet printing apparatus equipped with the ink set for ink-jet printing according to claim 1, said method comprising the following steps 1 and 2:
Step 1: ejecting the water-based ink onto the printing medium; and
Step 2: further ejecting the water-based ink onto the printing medium to overstrike the water-based ink onto the water-based ink that has been ejected onto the printing medium in the step 1.

12. The ink-jet printing method according to claim 11, further comprising the following step 3:

Step 3: bringing the overstruck water-based inks obtained on the printing medium in the step 2 into contact with a transportation roller.

13. The ink-jet printing method according to claim 11, wherein the printing medium has a water absorption of not less than 0 g/m$^2$ and not more than 10 g/m$^2$ as measured in a pure water contact time of 100 milliseconds.

14. The ink-jet printing method according to claim 11, wherein a printing speed upon printing the characters or images on the printing medium is not less than 20 m/min in terms of a transportation speed of the printing medium.

15. The ink-jet printing method according to claim 11, wherein a drive frequency of the ink-jet printing apparatus is not less than 10 kHz and not more than 90 kHz.

16. The ink-jet printing method according to claim 11, wherein an amount of droplets of the water-based ink ejected is not less than 0.5 pL and not more than 30 pL as calculated per one droplet of the water-based ink ejected.

\* \* \* \* \*